(12) United States Patent
Itao et al.

(10) Patent No.: US 9,157,998 B2
(45) Date of Patent: Oct. 13, 2015

(54) LASER RADAR DEVICE PLACED ON GLASS SURFACE OF VEHICLE

(71) Applicants: Daisuke Itao, Aichi (JP); Hidenori Miyazaki, Aichi (JP); Tadao Nishiguchi, Aichi (JP); Hideyuki Yasugi, Aichi (JP); Satoshi Hirota, Aichi (JP)

(72) Inventors: Daisuke Itao, Aichi (JP); Hidenori Miyazaki, Aichi (JP); Tadao Nishiguchi, Aichi (JP); Hideyuki Yasugi, Aichi (JP); Satoshi Hirota, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 14/202,941

(22) Filed: Mar. 10, 2014

(65) Prior Publication Data

US 2014/0293267 A1 Oct. 2, 2014

(30) Foreign Application Priority Data

Mar. 27, 2013 (JP) ................................. 2013-066173

(51) Int. Cl.
*G01C 3/08* (2006.01)
*G01S 17/88* (2006.01)
*G01S 17/93* (2006.01)
*G01S 7/481* (2006.01)

(52) U.S. Cl.
CPC ................. *G01S 17/88* (2013.01); *G01S 7/481* (2013.01); *G01S 17/936* (2013.01)

(58) Field of Classification Search
CPC ........... G01S 17/10; G01S 7/497; G01S 7/89; G01S 7/487; G01C 3/08

USPC ........... 356/3.01, 3.09, 4.01, 4.07, 5.01, 5.09, 356/9, 625

See application file for complete search history.

(56) References Cited

U.S. PATENT DOCUMENTS

2012/0314069 A1* 12/2012 Taylor ........................... 348/148

FOREIGN PATENT DOCUMENTS

| DE | 4329983 A1 * | 3/1995 |
| DE | 102009060392 A1 * | 6/2011 |
| JP | H07-020229 A | 1/1995 |

(Continued)

OTHER PUBLICATIONS

Extended European Search Report issued in counterpart European Application No. 14157297.4, mailed on Jun. 27, 2014 (7 pages).
Office Action in counterpart Japanese Patent Application No. 2013-066173, mailed Oct. 16, 2014 (8 pages).

(Continued)

*Primary Examiner* — Isam Alsomiri
*Assistant Examiner* — Samantha K Abraham
(74) *Attorney, Agent, or Firm* — Osha Liang LLP

(57) ABSTRACT

A laser radar device has a light projection part that projects light to a monitoring area outside a vehicle from a vehicle interior through a glass surface, a light receiving part that is placed a given distance away from the light projection part in a substantially horizontal direction to receive reflected light from an object outside the vehicle in the light projected by the light projection part through the glass surface, a measuring part that measures the distance to the object in the monitoring area based on timing when the light projection part projects the light and timing when the light receiving part receives the reflected light, and a light-projection shielding part that shields the light projected to an outside of the monitoring area in the light projected by the light projection part.

1 Claim, 38 Drawing Sheets

(56) References Cited

FOREIGN PATENT DOCUMENTS

| JP | H07-253461 A | 10/1995 |
| JP | H08-160123 A | 6/1996 |
| JP | 2000-230825 A | 8/2000 |
| JP | 2007-333592 A | 12/2007 |
| JP | 2009-019979 A | 1/2009 |
| WO | 2006-063827 A1 | 6/2006 |

OTHER PUBLICATIONS

Patent Abstracts of Japan for Japanese Publication No. 07-020229, Publication Date Jan. 24, 1995 (1 page).

* cited by examiner

FIG. 9
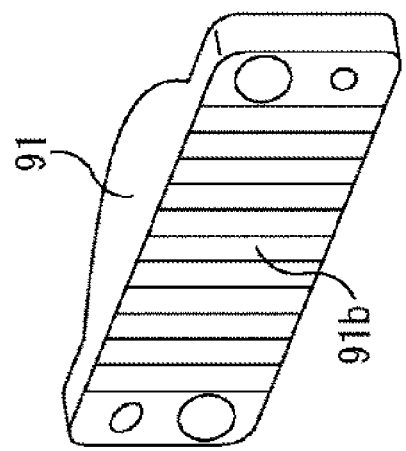
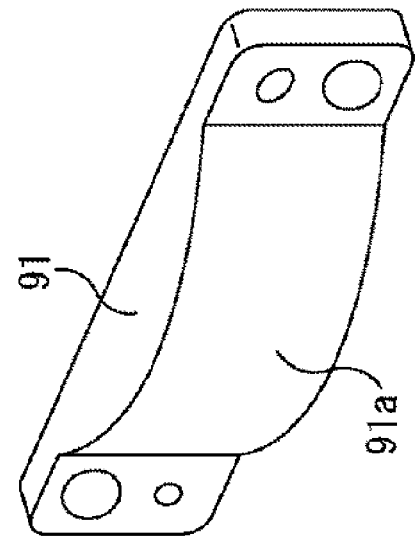

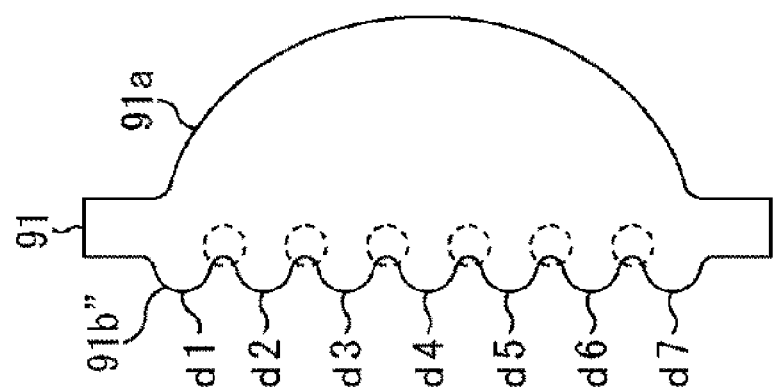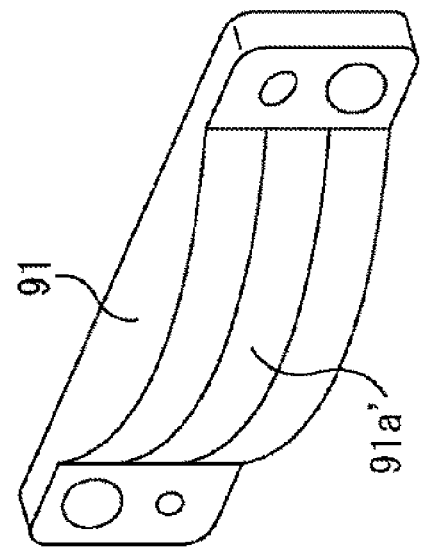
FIG. 18

LASER RADAR DEVICE PLACED ON GLASS SURFACE OF VEHICLE

BACKGROUND OF THE INVENTION

1. Technical Field

The present invention relates to a laser radar device, particularly to a laser radar device that can measure a distance to an object with high accuracy.

2. Related Art

A technology in which a radar device incorporated in a vehicle detects a vehicle in a traveling direction or a passing lane or a distance to an object to control vehicle motion according to the detected distance is becoming widespread.

In a principle of the radar device, light is projected from a light projection part to a monitoring area, the light reflected from an object in the monitoring area is received, and a distance to the object is obtained from light projection timing and light receiving timing.

Conventionally the in-vehicle radar device is frequently placed near a front end of a vehicle body. On the other hand, nowadays the in-vehicle radar device is occasionally placed inside a windshield (see Japanese Unexamined Patent Publication No. 8-160123).

There has been proposed a system in which, in order to cover the wide monitoring area of the object, the light is projected from the light projection part while the projected light is changed in various directions, or the direction of the projected light is widened without changing the light projection direction (see Japanese Unexamined Patent Publication No. 7-253461).

There has been proposed a technology for providing a light shielding wall between the light projection part and light receiving part, which are provided adjacent to each other, to prevent the light projected by the light projection part from being directly received by the light receiving part (see Japanese Unexamined Patent Publication No. 2007-333592).

In the case that the light shielding wall disclosed in Japanese Unexamined Patent Publication No. 2007-333592 is applied to the laser radar device placed inside the windshield, the light reflected from the windshield in the light projected by the light projection part may be projected to a dashboard, and the light projected to the dashboard may be irregularly reflected and possibly received as a noise by the light receiving part.

SUMMARY

One or more embodiments of the present invention enables an accurate measurement of a distance to an object present in a monitoring area by reliably projecting light from a light projection part to the monitoring area, and by properly receiving only the light reflected from the object.

In accordance with one or more embodiments of the present invention, a laser radar device includes: a light projection part that projects light to a monitoring area outside a vehicle from a vehicle interior through a glass surface; a light receiving part that is placed a given distance away from the light projection part in a substantially horizontal direction to receive reflected light from an object outside the vehicle in the light projected by the light projection part through the glass surface; a measuring part that measures the distance to the object in the monitoring area based on timing when the light projection part projects the light and timing when the light receiving part receives the reflected light; a light-projection shielding part that shields the light projected to an outside of the monitoring area in the light projected by the light projection part; and a light-receiving shielding part that shields reflected light that is projected by the light projection part and reflected from the outside of the monitoring area, in the reflected light.

Accordingly, the light is projected only to the monitoring area by the light projection part, and only the light reflected from the object present in the monitoring area is received by the light receiving part, so that a noise that is generated by directly receiving the projected light without reflected by the object present in the monitoring area can be reduced. Therefore, the distance to the object can accurately be measured.

The light-projection shielding part may be a light-projection shielding wall that shields light projected in a direction outside the monitoring area in the projected light.

Accordingly, the noise that is generated by directly receiving the light projected to the outside the monitoring area without going through the monitoring area can be reduced to properly measure the distance to the object.

The light-projection shielding wall may be provided in a direction substantially parallel to the horizontal direction and a direction substantially perpendicular to the horizontal direction, and the light-projection shielding wall may be constructed with a surface parallel to an angle formed by positions corresponding to side edge portions of the light projection part and a surface parallel to an angle formed by positions corresponding to side edge portions of the monitoring area.

Accordingly, the light projection part can properly project the light only to the monitoring area.

An end portion of the light-projection shielding wall constitutes a surface substantially parallel to the glass surface, and the surface may abut on the glass surface.

Accordingly, even if the light projected by the light projection part is reflected from the glass surface, the projection of the light to the outside of the monitoring area is properly suppressed, so that the light can be projected only to the monitoring area.

The light-receiving shielding part may be a light-receiving shielding wall that shields the reflected light received in the direction outside the monitoring area in the reflected light.

Accordingly, for the light received by the light receiving part, the reflected light from the outside of the monitoring area can be suppressed in the reflected light. Therefore, the direct reception of the light projected by the light projection part can be suppressed, and the distance to the object can properly be measured.

The light-receiving shielding wall may be provided in a direction substantially parallel to the horizontal direction and a direction substantially perpendicular to the horizontal direction, and the light-receiving shielding wall is constructed with a surface parallel to an angle formed by positions corresponding to side edge portions of the light receiving part and a surface parallel to an angle formed by positions corresponding to side edge portions of the monitoring area.

Accordingly, only the reflected light from the object present in the monitoring area can properly be received.

An end portion of the light-receiving shielding wall may constitute a surface substantially parallel to the glass surface, and the surface may abut on the glass surface.

Accordingly, even if the light projected by the light projection part is reflected from the glass surface, the reception of the reflected light from the outside of the monitoring area can properly be suppressed.

The laser radar device may further include a raindrop sensor that is placed between the light projection part and the light receiving part to optically detect a raindrop outside the vehicle.

Accordingly, the raindrop sensor constitutes the light shielding wall that prevents the light receiving part from directly receiving the light projected by the light projection part, so that the reception of the light outside the monitoring area by the light receiving part can be suppressed. Additionally, the light projection part, the raindrop sensor, and the light receiving part are horizontally be disposed, so that the device can be installed without obstructing a visual field of a driver.

In a laser radar device according to one or more embodiments of the present invention, the light projection part projects the light to the monitoring area outside the vehicle from the vehicle interior through a glass surface, the light receiving part is placed a given distance away from the light projection part in the substantially horizontal direction to receive reflected light from the object outside the vehicle in the light projected by the light projection part through the glass surface, the measuring part measures the distance to the object in the monitoring area based on the timing when the light projection part projects the light and the timing when the light receiving part receives the reflected light, the light-projection shielding part shields the light projected to the outside of the monitoring area in the light projected by the light projection part; and the light-receiving shielding part shields the reflected light that is projected by the light projection part and reflected from the outside of the monitoring area, in the reflected light.

Accordingly, the distance to the object present in the monitoring area can accurately be measured.

BRIEF DESCRIPTION OF THE DRAWINGS

FIG. 9 shows views illustrating a configuration example of an appearance of a light projection optical system of the laser radar device in FIG. 2;

FIG. 18 shows views illustrating second and third modifications of the light projection optical system in FIG. 2;

DETAILED DESCRIPTION

Embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

[Configuration Example of Laser Radar Device]

Figure 1:
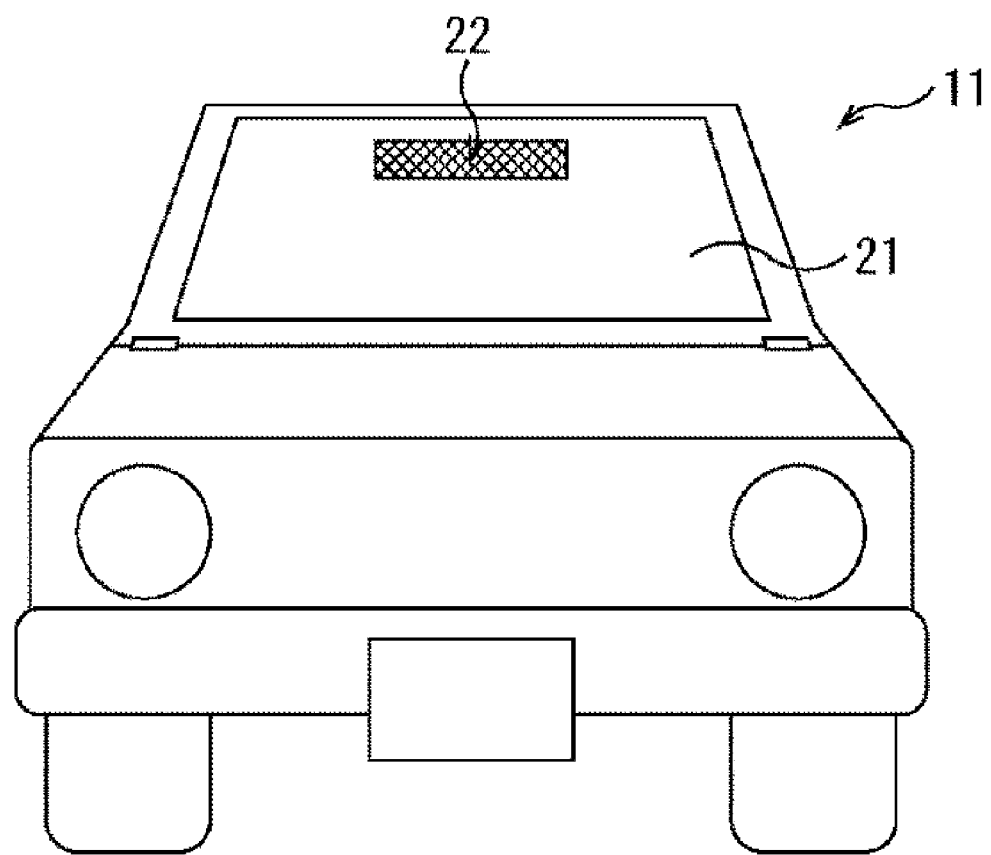
FIG. 1 is a view illustrating a configuration example of an appearance of a vehicle to which a laser radar device according to one or more embodiments of the present invention is applied.

FIG. 1 is a view illustrating a configuration example of an appearance of a vehicle provided with a laser radar device according to one or more embodiments of the present invention. A vehicle 11 in FIG. 1 is provided with a laser radar device 22 that is located on an inside (vehicle interior) of a windshield 21 and a rear side of a rearview mirror (not illustrated). The laser radar device 22 projects light to a monitoring area ahead of the vehicle 11, and receives the light reflected by an object present in the monitoring area. The laser radar device 22 measures a distance to the object from light projection timing and reflected light receiving timing. By way of example, FIG. 1 illustrates the laser radar device 22 that is mounted on the inside of the windshield 21 and the rear side of a rearview mirror (not illustrated). However, instead of the inside of the windshield 21, the laser radar device 22 may be placed in the inside of a rear window glass or a side window glass as long as the place in the vehicle is the inside of a glass surface through which the light can be projected and received to and from the outside.

Figure 2:
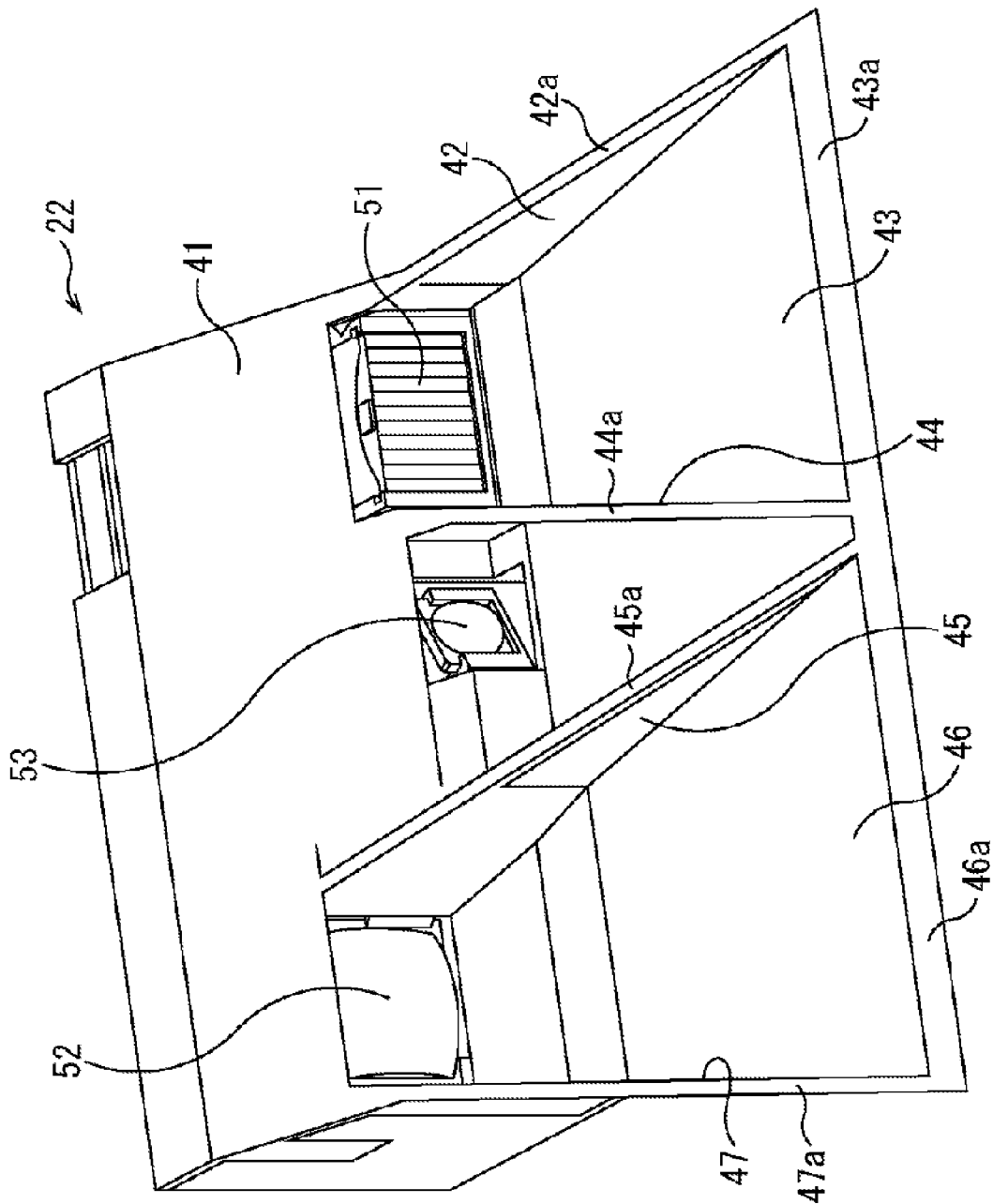
FIG. 2 is a perspective view illustrating an appearance of the laser radar device in FIG. 1 viewed from an upper front.
Figure 3:
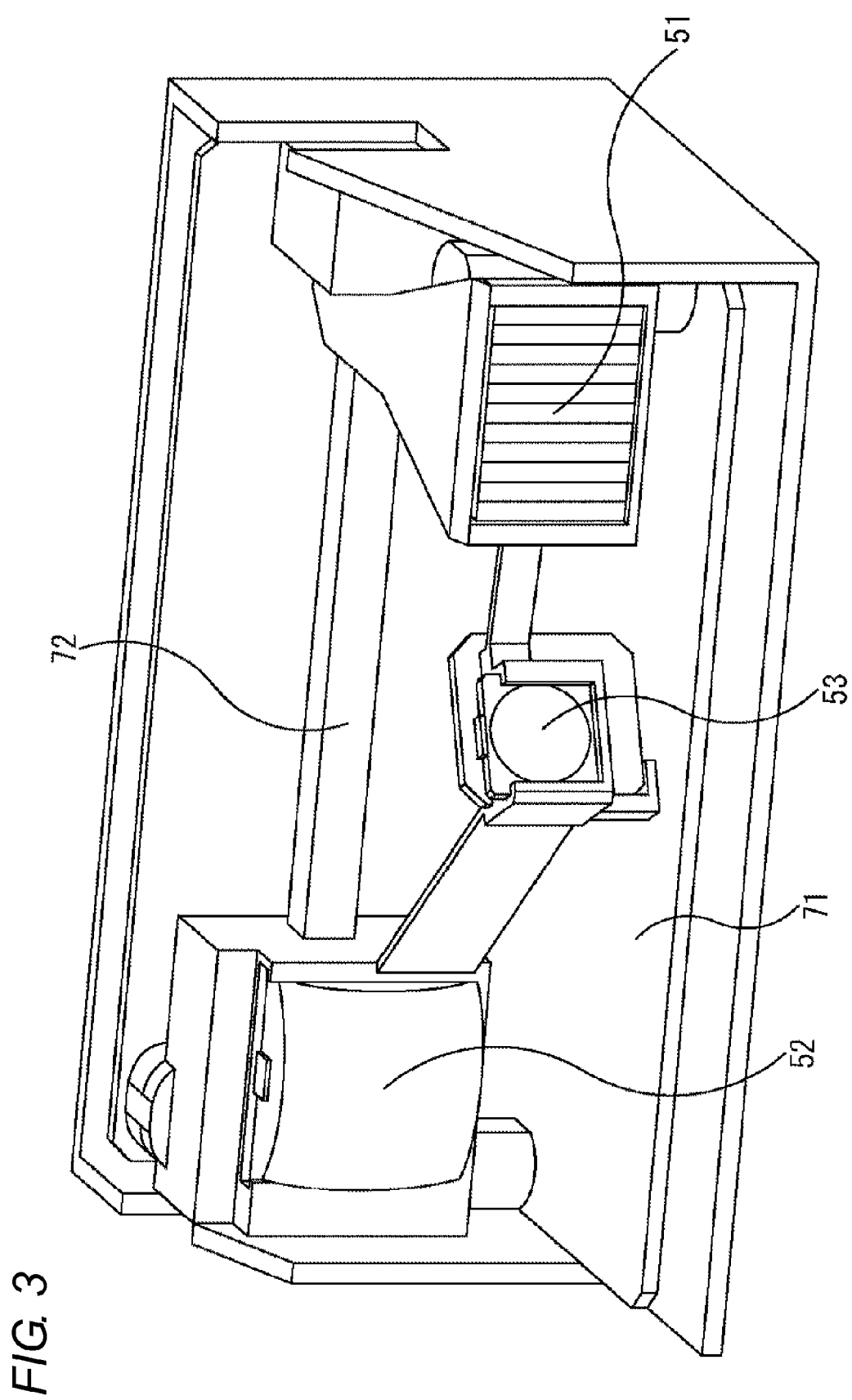
FIG. 3 is a perspective view illustrating the appearance of the laser radar device viewed from an upper front.
Figure 4:
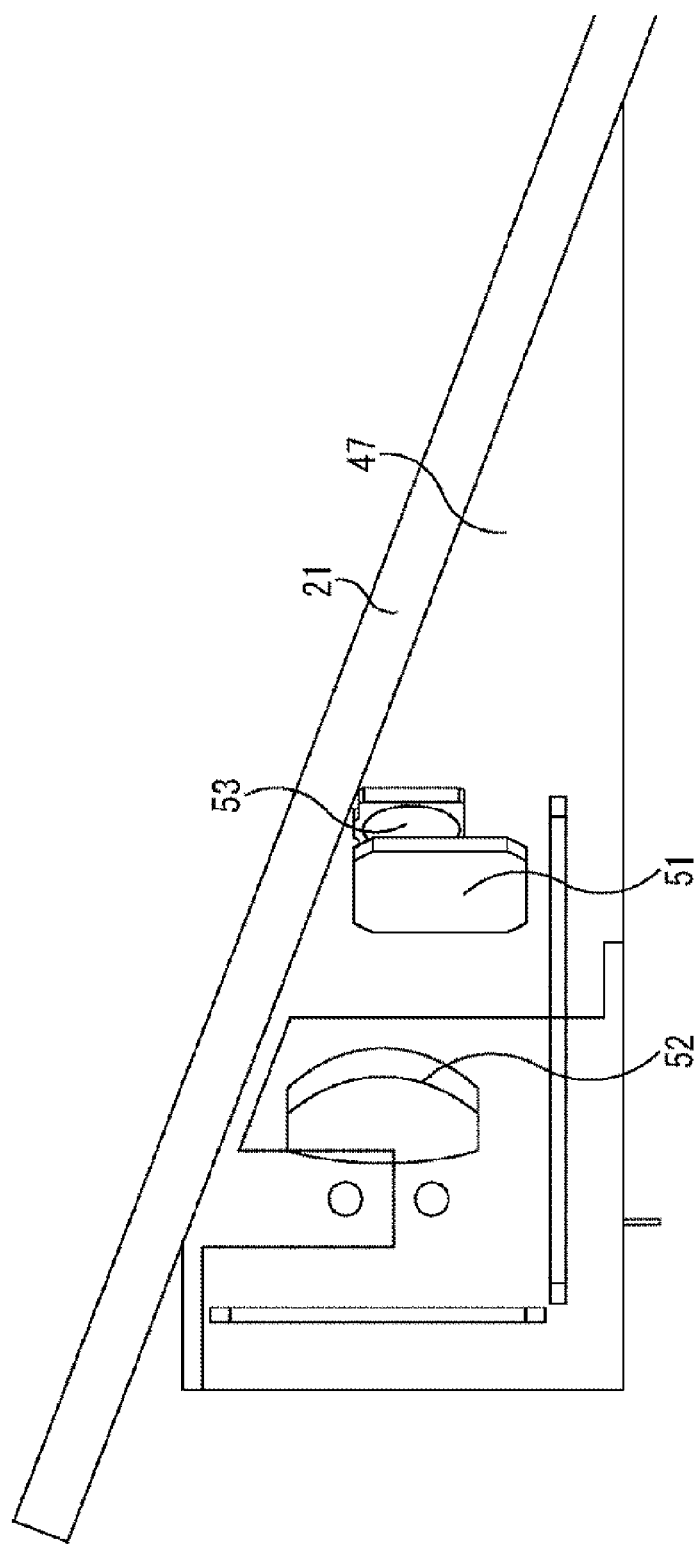
FIG. 4 is a sectional view illustrating a left side surface of the laser radar device in FIG. 2.
Figure 5:
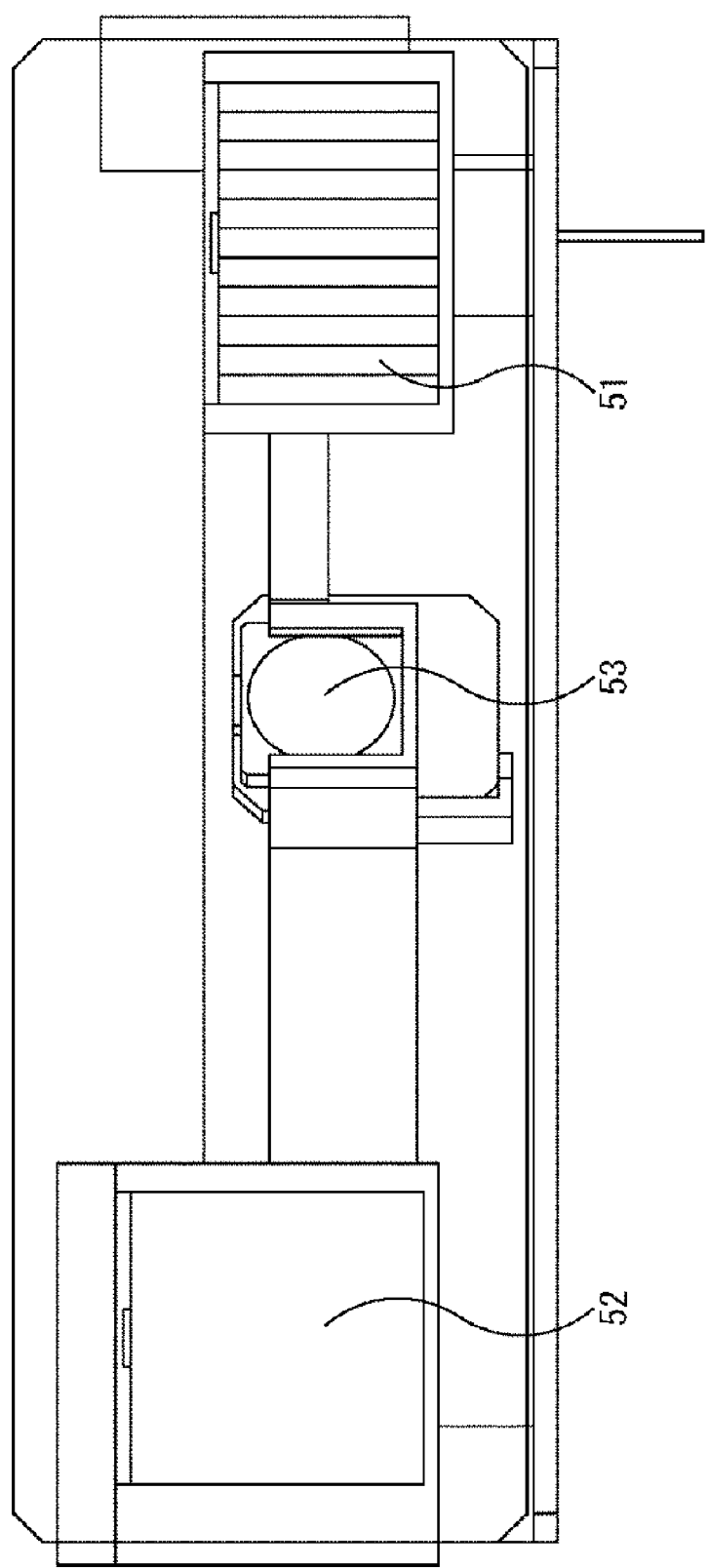
FIG. 5 is a front elevation of the laser radar device.
Figure 6:
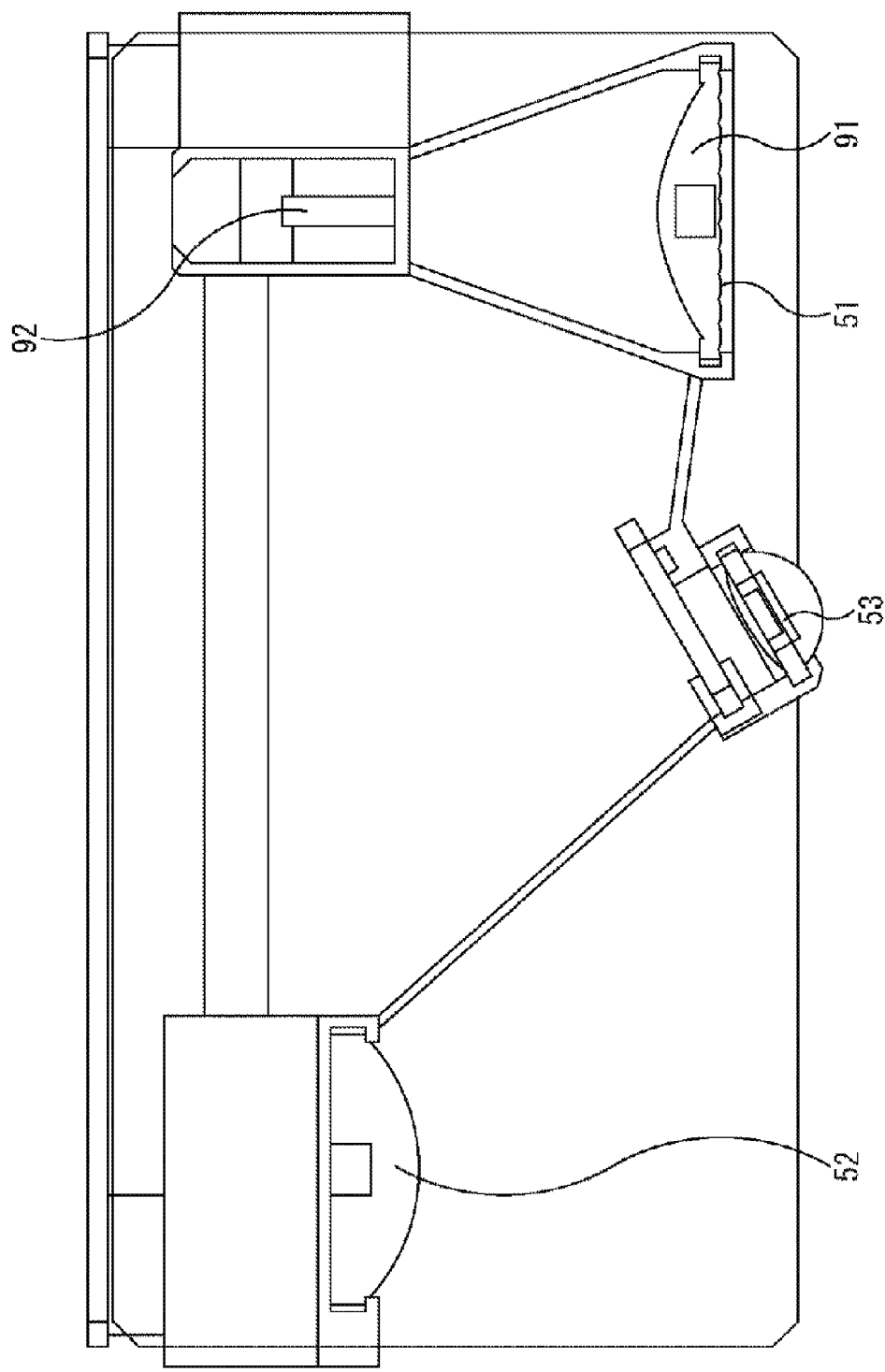
FIG. 6 is a top view illustrating an arrangement of a light projection part, a light receiving part, and a raindrop sensor.
Figure 7:
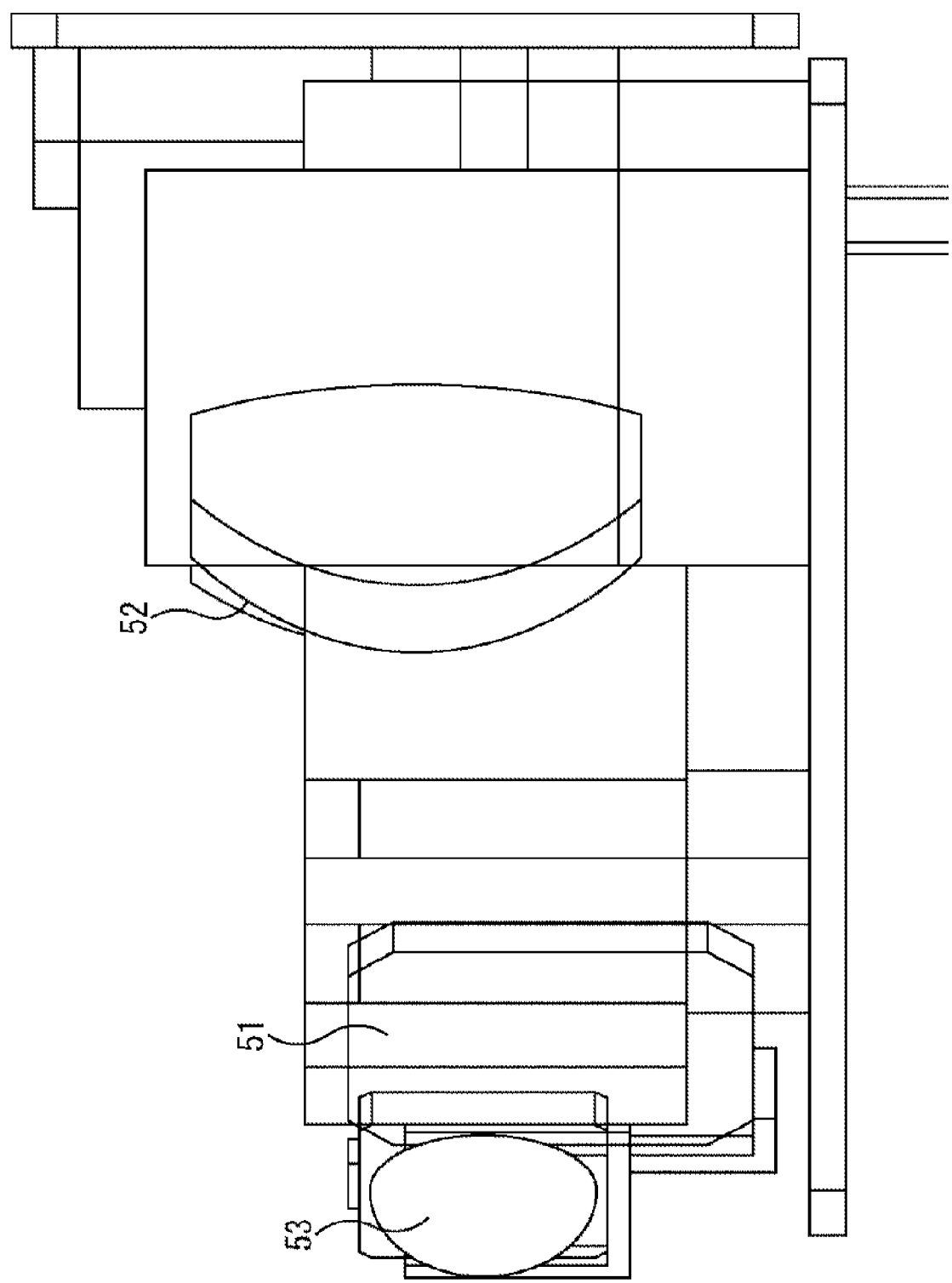
FIG. 7 is an enlarged view illustrating a right side surface of the arrangement of the light projection part, the light receiving part, and the raindrop sensor.
Figure 8:
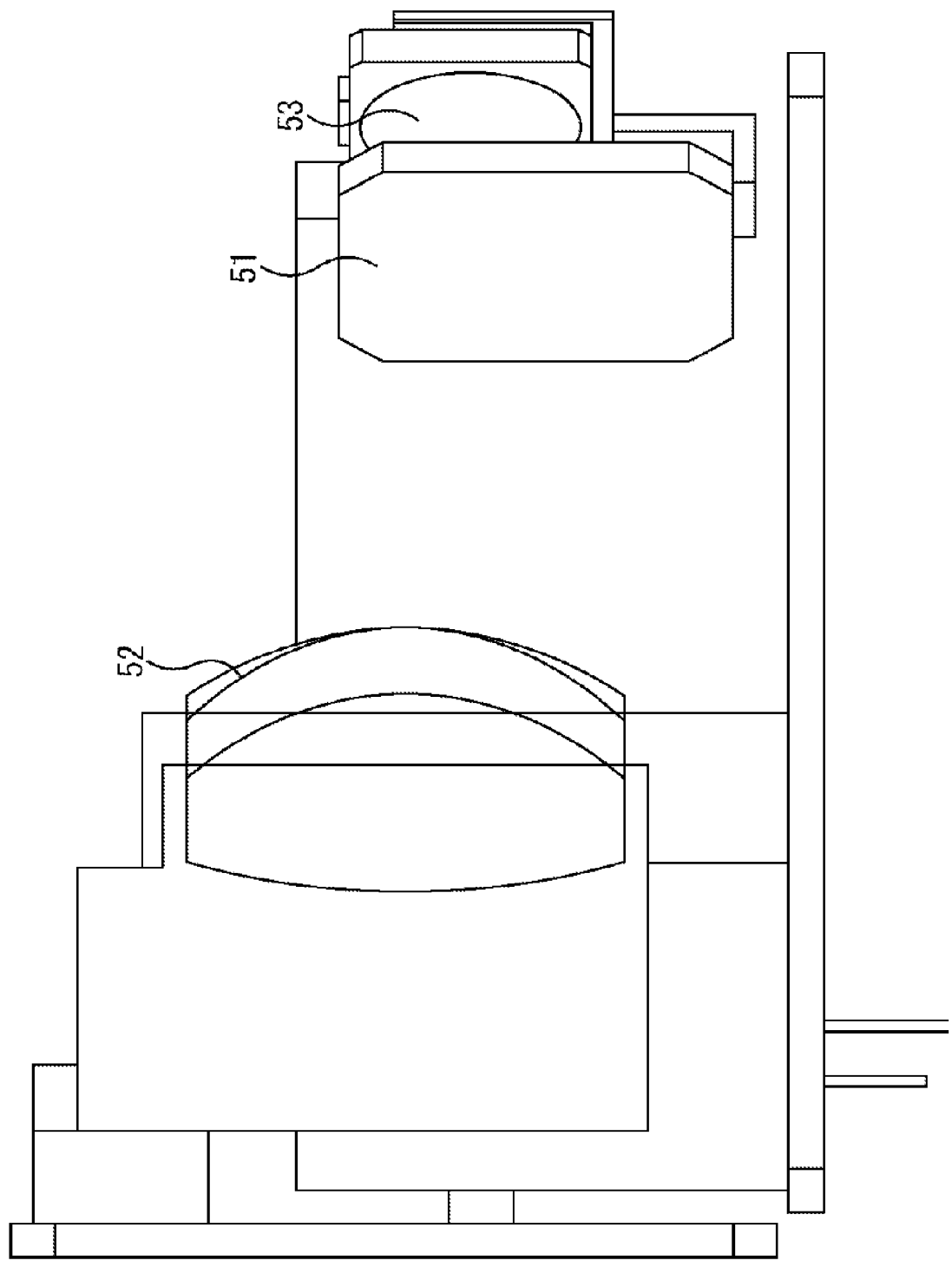
FIG. 8 is an enlarged view illustrating a left side surface of the arrangement of the light projection part, the light receiving part, and the raindrop sensor.

FIGS. 2 to 8 are views illustrating a configuration example of the laser radar device 22. More particularly, FIG. 2 is a perspective view illustrating the appearance of the laser radar device 22 viewed from an upper front, FIG. 3 is a perspective view illustrating an arrangement of a light projection part 51, a light receiving part 52, and a raindrop sensor 53 when a cover 41 of the laser radar device 22 in FIG. 2 is detached, and FIG. 4 is a sectional view illustrating a left side surface of the laser radar device 22 in FIG. 2. FIG. 5 is an enlarged view illustrating a peripheral portion of the raindrop sensor 53 in FIG. 3 viewed from a front side of the raindrop sensor 53, and FIG. 6 is a top view illustrating the arrangement of the light projection part 51, the light receiving part 52, and the raindrop sensor 53. FIGS. 7 and 8 are enlarged views illustrating right and left side surfaces of FIG. 3 of the arrangement of the light projection part 51, the light receiving part 52, and the raindrop sensor 53 shown in FIG. 3.

In the appearance configuration of the laser radar device 22, the light projection part 51, the light receiving part 52, and the raindrop sensor 53 are covered with the cover 41, while only an light projection opening of the light projection part 51, a light receiving opening of the light receiving part 52, and a raindrop sensing opening of the raindrop sensor 53 are opened. The monitoring area of the laser radar device 22 is located in a near side in FIG. 2. Therefore, the light projection part 51 projects the light in a direction toward the near side in FIG. 2, and the light receiving part 52 receives the light reflected by the object present on the near side in the light projected by the light projection part 51. As illustrated in FIG. 3, the light projection part 51, the light receiving part 52, and the raindrop sensor 53 are electrically connected to one another through a board 71. The light projection part 51, the light receiving part 52, and the raindrop sensor 53 are fixed by a frame 72 such that a mutual positional relationship is not changed by a vibration of the vehicle.

For example, the raindrop sensor 53 projects infrared light, and detects a raindrop amount based on the reception of the light reflected by the windshield 21. More particularly, because the infrared light is transmitted through a raindrop on the windshield 21, an amount of the reflected light tends to decrease. The raindrop sensor 53 detects the raindrop amount based on the amount of the projected infrared light reflected by the windshield 21. For example, a drive frequency of a wiper (not illustrated) can be controlled based on the amount of the detected raindrop. In one or more embodiments of the present invention, the raindrop sensor 53 is disposed between the light projection part 51 and the light receiving part 52. Alternatively, instead of the raindrop sensor 53, a camera or a solar radiation sensor may be disposed between the light projection part 51 and the light receiving part 52.

As illustrated in FIGS. 2, 3, 5, and 6, the light projection part 51, the light receiving part 52, and the raindrop sensor 53 are substantially disposed in line with respect to a horizontal direction as viewed in a traveling direction, so that the laser radar device 22 can be thinned in a vertical direction. As a result, the laser radar device 22 can be placed between the rearview mirror and the windshield 21, and an area that obstructs a visual field of a driver is minimized, which allows the wide visual field to be ensured.

As illustrated in FIGS. 2, 3, and 6 to 8, the raindrop sensor 53 is provided while projected most forward, the light projection part 51 is projected forward, and the light receiving part 52 is provided most rearward. In the configuration, a noise caused by the direct reception of the light projected from the light projection part 51 by the light receiving part 52 can be reduced because the light receiving part 52 is not likely to directly receive the light projected from the light projection part 51. A position where the raindrop sensor 53 is present constitutes a partition between the light projection part 51 and the light receiving part 52. Therefore, in the light projected from the light projection part 51, the light that is reflected by the windshield 21 and directly received by the light receiving part 52 is shielded. As a result, the noise caused by the direct reception of the light projected from the light projection part 51 by the light receiving part 52 can be reduced.

A light shielding wall 42 is provided in the left side surface (right side surface in the drawings) along a left end portion when the monitoring area is viewed from the light projection part 51. The light shielding wall 42 shields or reflects scattering light traveling in a left direction (right direction in the drawings) of the side surface (right side surface in the drawings) constructed with a left limit of the monitoring area viewed from the light projection part 51 or the light that is reflected from the windshield 21 by a certain influence to travel to the left of the side surface constructed with the left limit of the monitoring area, in the light projected from the light projection part 51.

A light shielding wall 44 is provided in the right side surface (left side surface in the drawings) along a right end portion when the monitoring area is viewed from the light projection part 51. The light shielding wall 44 shields or reflects the scattering light traveling in the right direction (left direction in the drawings) of the side surface (left side surface in the drawings) constructed with a right limit of the monitoring area viewed from the light projection part 51 or the light that is reflected from the windshield 21 by a certain influence to travel to the right of the side surface constructed with the right limit of the monitoring area in the light projected from the light projection part 51.

A light shielding bottom 43 is provided along the surface of the lower-side end portion when the monitoring area is viewed from the light projection part 51. The light shielding bottom 43 is constructed with the surface constituting the lower-side limit of the monitoring area viewed from the light projection part 51, and reflects or shields the light reflected by the windshield 21 in the light projected from the light projection part 51 toward the direction in which the monitoring area is present. Because the light shielding bottom 43 is constructed with the surface inclined downward with respect to the near side in FIG. 2, the light shielding bottom 43 reflects the light that is reflected by the windshield 21 to impinge to the light shielding bottom 43 in the light projected from the light projection part 51 to the forward direction in which the monitoring area is present. Therefore, the light receiving part 52 can be prevented from directly receiving the light reflected by the windshield 21.

A light shielding wall 45 is provided in the left side surface (right side surface in the drawings) along the left end portion when the monitoring area is viewed from the light receiving part 52. The light shielding wall 45 shields the scattering light that is possibly received by the light receiving part 52 from the left (right in the drawings) of the side surface (right side surface in the drawings) constructed with the left limit of the monitoring area viewed from the light receiving part 52 or the light that is reflected from the windshield 21 by a certain influence and possibly received by the light receiving part 52 from the left side surface of the monitoring area, in the light reflected by the object present in the monitoring area.

A light shielding wall 47 is provided in a right side surface (left side surface in the drawings) along the right end portion when the monitoring area is viewed from the light receiving part 52. The light shielding wall 47 shields the scattering light that is possibly received by the light receiving part 52 from the right (left in the drawings) of the side surface (left side surface in the drawings) constructed with the right limit of the monitoring area viewed from the light receiving part 52 or the reflected light that is reflected from the windshield 21 by a certain influence and possibly received by the light receiving part 52 from the right side surface of the monitoring area, in the light reflected by the object present in the monitoring area.

A light shielding bottom 46 is provided along the surface of the lower-side end portion when the monitoring area is viewed from the light receiving part 52. The light shielding bottom 46 is constructed with a lower limit of the monitoring area viewed from the light receiving part 52, and causes the light receiving part 52 to receive only the reflected light incident from the direction in which the monitoring area is present. Because the light shielding bottom 46 is constructed with the surface inclined downward with respect to the near side in FIG. 2, even if the light that is reflected from the object present in the monitoring area and is incident to the light shielding bottom 46, the light shielding bottom 46 can reflect the light to be received by the light receiving part 52.

That is, the light shielding walls 42 and 44 and the light shielding bottom 43, which shield or reflect the light, are provided into a dustpan shape in front of the opening through which the light projection part 51 projects the light, so that the light from the light projection part 51 can surely be projected only to the monitoring area.

The light shielding walls 45 and 47 and the light shielding bottom 46, which shield the light, are provided into the dustpan shape in front of the opening through which the light receiving part 52 receives the light, so that only the light reflected by the object present in the monitoring area can surely be received in the light projected by the light projection part 51.

As a result, the noise caused by the direct reception of the light projected from the light projection part 51 by the light receiving part 52 can be reduced.

As illustrated in FIGS. 2 and 4, abutting surfaces 42*a*, 44*a*, 45*a*, and 47*a* of the light shielding walls 42, 44, 45, and 47 on the windshield 21 and abutting surfaces 43*a* and 46*a* of the light shielding bottoms 43 and 46 on the windshield 21 are constructed as surfaces substantially parallel to the windshield 21. Therefore, a main body of the laser radar device 22 can be placed on the rear side of the rearview mirror (not illustrated) and inside the windshield 21 while being in tight contact with the windshield 21.

As a result, the light shielding walls 42 and 44 and the light shielding bottom 43 can surely project the light projected from the light projection part 51 only to the monitoring area. Similarly, the light shielding walls 45 and 47 and the light shielding bottom 46 can cause the light receiving part 52 to receive only the light reflected from the object present in the monitoring area in the light projected from the light projection part 51. A combination of these parts can surely project the light projected by the light projection part 51 only to the monitoring area, and cause the light receiving part 52 to receive only the light reflected from the object present in the monitoring area. Therefore, in the light receiving part 52, the noise caused by the direct reception of the light projected from the light projection part 51 can be reduced to properly measure the distance to the object.

As illustrated in FIG. 6, a light projection circuit 92 including a laser diode LD that emits a laser beam and a light projection optical system 91 that converts the laser beam emitted from the light projection circuit 9 into the parallel light in each of a plurality of directions are provided in the light projection part 51.

[Configuration Example of Light Projection Optical System]

In the light projection optical system 91, as illustrated in a left part of FIG. 9, a light incident surface 91*a* for the laser beam emitted from the light projection circuit 92 is formed into a semi-cylindrical shape, and the light incident surface 91*a* acts as a collimator lens with respect to the horizontal direction. A light exit surface 91*b* of the light projection optical system 91 is constructed with a lenticular lens or a lens array with respect to the horizontal direction. The light exit surface 91*b* converts the parallel light, which is generated by the light incident surface 91*a* acting as the collimator lens, into pieces of parallel light in a plurality of directions, and the light exit surface 91*b* outputs the pieces of parallel light in the plurality of directions.

Figure 10:
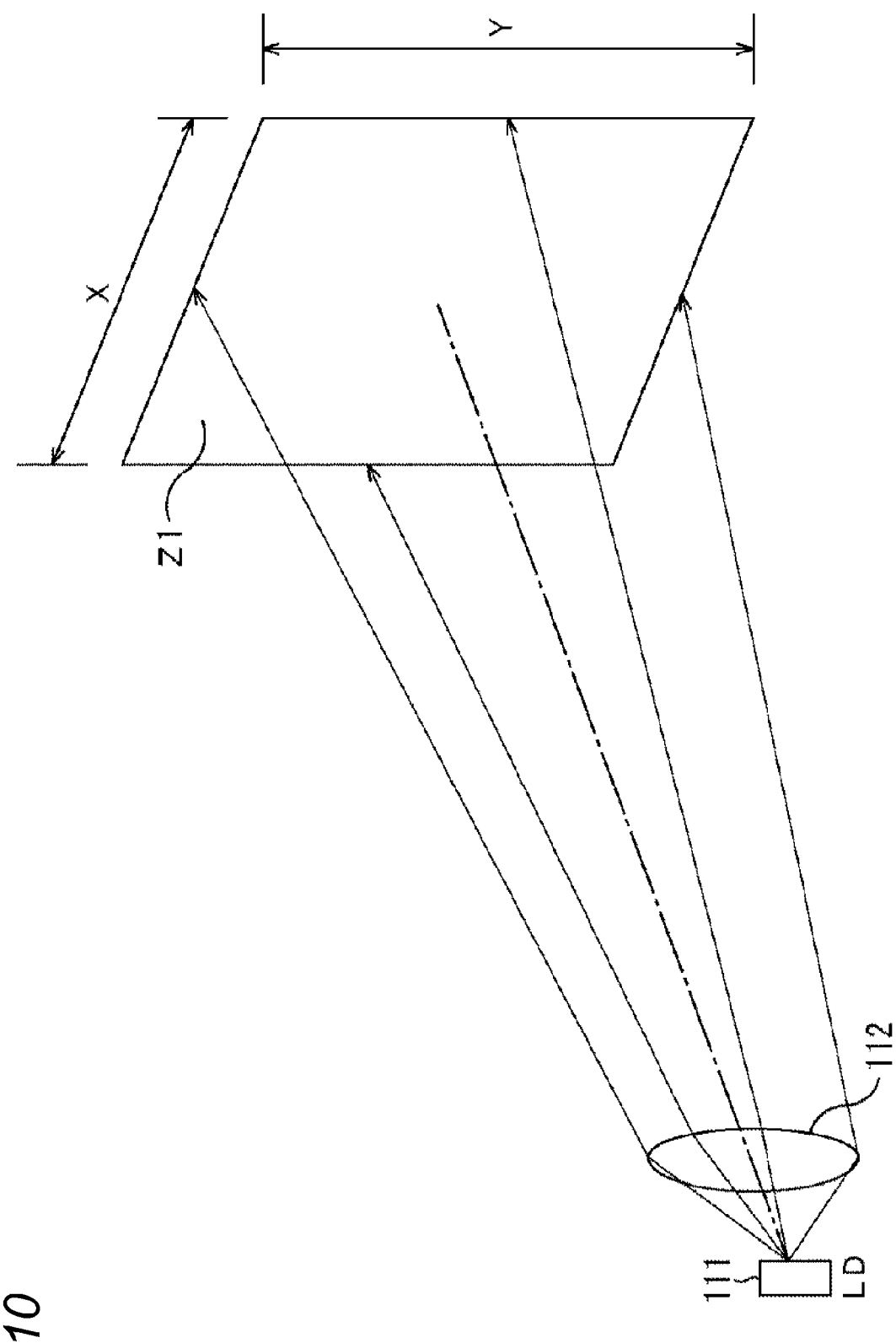
FIG. 10 is a diagram illustrating a light projection optical system of a conventional laser radar device.

Generally, in the conventional light projection optical system, as illustrated in FIG. 10, the monitoring area Z1 is irradiated with the laser beam emitted from a light source LD111 constructed with the laser diode while the laser beam is diffused. Therefore, for example, when viewed from the light source LD111, a light projection optical system 112 projects the light while diffusing the light by X° in the horizontal direction and by Y° in a vertical direction.

Figure 11:
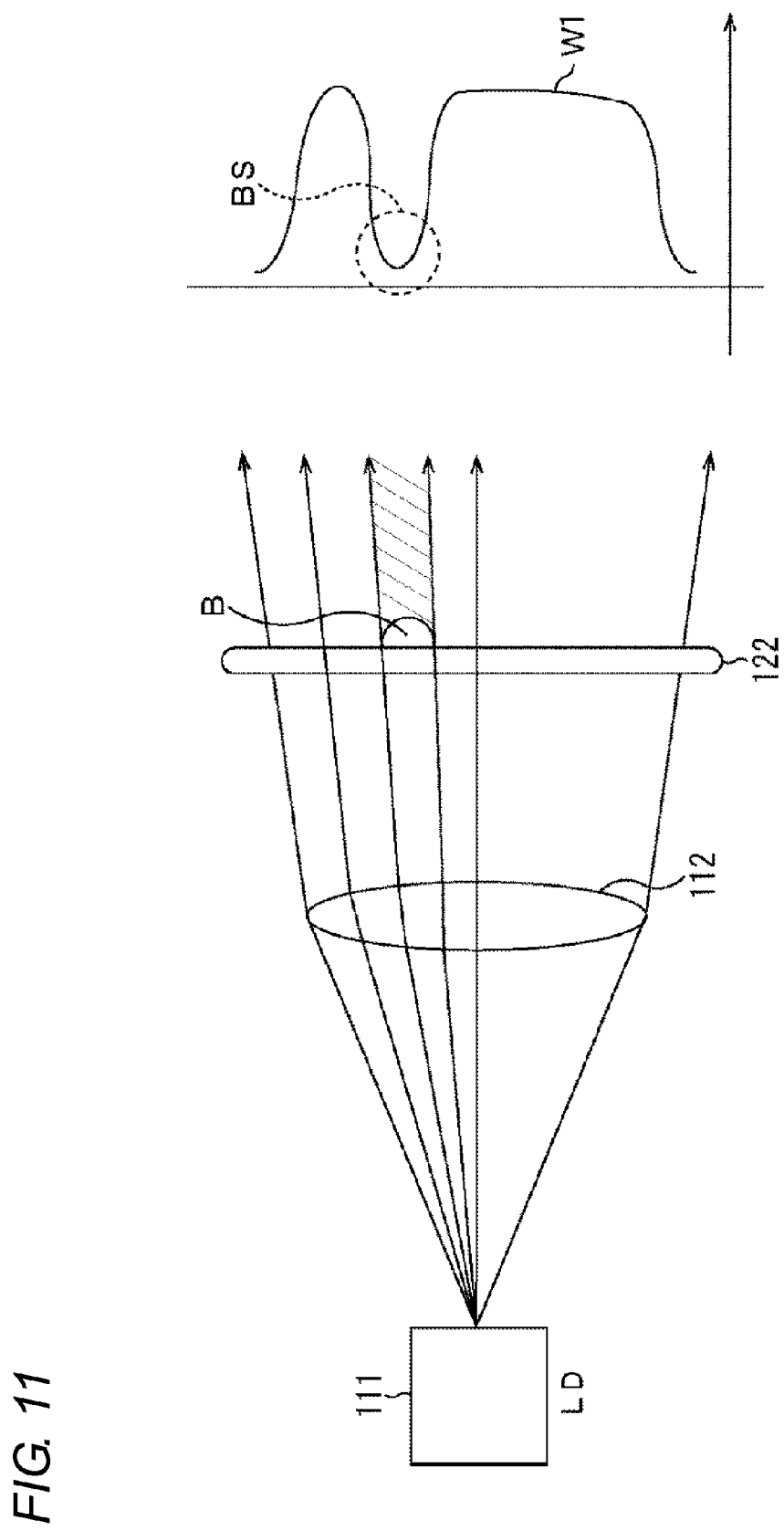
FIG. 11 shows diagrams illustrating the light projection optical system of the conventional laser radar device.

In this case, assuming that the light is projected to the monitoring area from the vehicle interior through the windshield, when dirt adheres to the windshield 122 to generate a shading area B as illustrated in a left part of FIG. 11, the laser beam emitted from the light source LD111 is transmitted through the windshield 122 while diffused by the light projection optical system 112, and the light projection part 111 does not project the light to the area in front of the shading area B. When an intensity distribution W1 in which a vertical axis expresses a coordinate of a vertical direction in the left part of FIG. 11 while a horizontal axis expresses an intensity of the diffused light is plotted as illustrated in a right part FIG. 11, an intensity distribution corresponding to the shading area is generated as a blind spot BS. As a result, the light is not projected to the object (only the extremely weak light is projected) even if the object is present ahead of the shading area B, and the reflected light is not generated (only the extremely weak light is obtained), which results in the generation of a blind angle at which not only the distance to the object but also the presence of the object cannot be detected (hardly detected).

Figure 12:
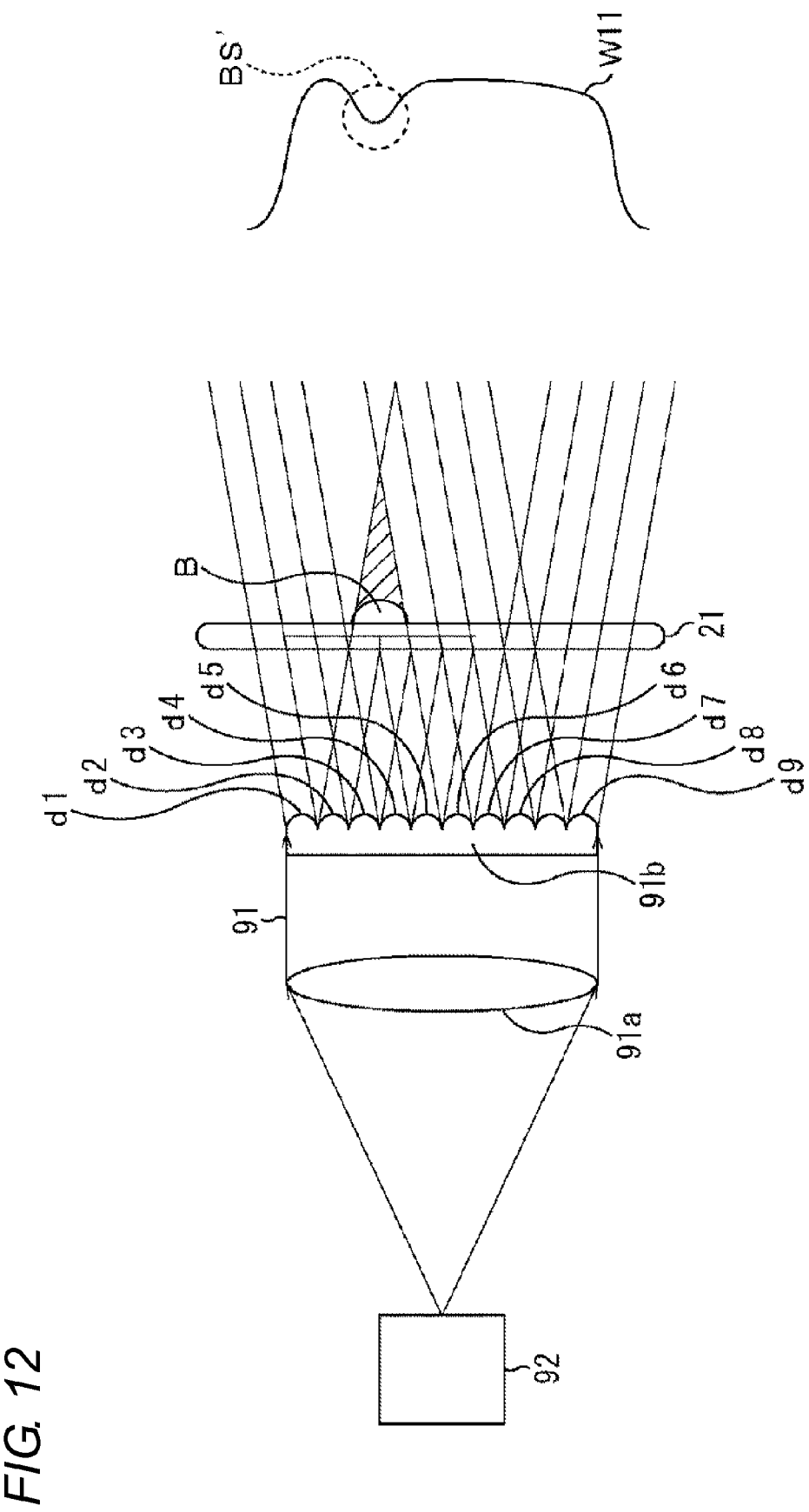
FIG. 12 shows diagrams illustrating an effect of the light projection optical system of the laser radar device in FIG. 2.

On the other hand, in one or more embodiments of the present invention, the light exit surface 91*b* of the light projection optical system 91 in FIG. 9 is constructed with the lenticular lens or lens array, in which the plurality of convex lens regions are horizontally provided, and each of the convex lens regions generates the diffused light. As illustrated in FIG. 12, the pieces of parallel light of the same number as that of lens regions d1 to d9 constructed with the convex lenses can be generated in the plurality of directions. Although FIG. 12 illustrates the nine convex lens regions d1 to d9 by way of example, the number of the lens regions is not limited to nine.

Even if the shading area B is present on the windshield 21 due to the dirt, the diffused light is projected to the monitoring area so as to suppress the generation of the blind spot caused by the shading area B, by use of the parallel light. Therefore, in the case that the intensity distribution similar to that in the right part FIG. 11 is obtained, although a blind spot BS' is generated as illustrated by an intensity distribution W11 in a right part of FIG. 12, a decline of the light intensity is compensated by the surrounding parallel light, so that the decrease in light intensity can be reduced.

As a result, even if the object is present in the monitoring area ahead of the shading area B, the reflected light having the light intensity receivable with the light receiving part 52 is generated although the light intensity is slightly reduced, so that the presence or absence of the object and the distance to the object can properly be detected. In addition, it is not necessary that a movable region be provided to project the light to the monitoring area with the projection direction changing in the monitoring area in order to project the light to the whole range of the monitoring area. Therefore, the laser radar device 22 can be fabricated without being provided with the movable region that makes the device complicated and susceptible to a breakdown. The light can simultaneously be projected to the whole range of the monitoring area, so that a detection delay caused by the movable region changing in the light projection range and light receiving range can be prevented. Because the laser radar device 22 is placed in the vehicle interior, the necessity of the waterproof or dustproof structure is eliminated, and device cost can be reduced. This configuration eliminates the necessity to provide the movable region that can generate a noise. Accordingly, the adverse influence caused by the noise is eliminated when the laser radar device is attached to the vehicle interior.

[First Modification of Light Projection Optical System]

As described above, by way of example, the plurality of convex lens regions constituting the lenticular lens or lens array of the light exit surface 91b of the light projection optical system 91 have the same curvature. Alternatively, the monitoring area can be varied by partially changing the curvatures of the plurality of convex lens regions.

Figure 13:
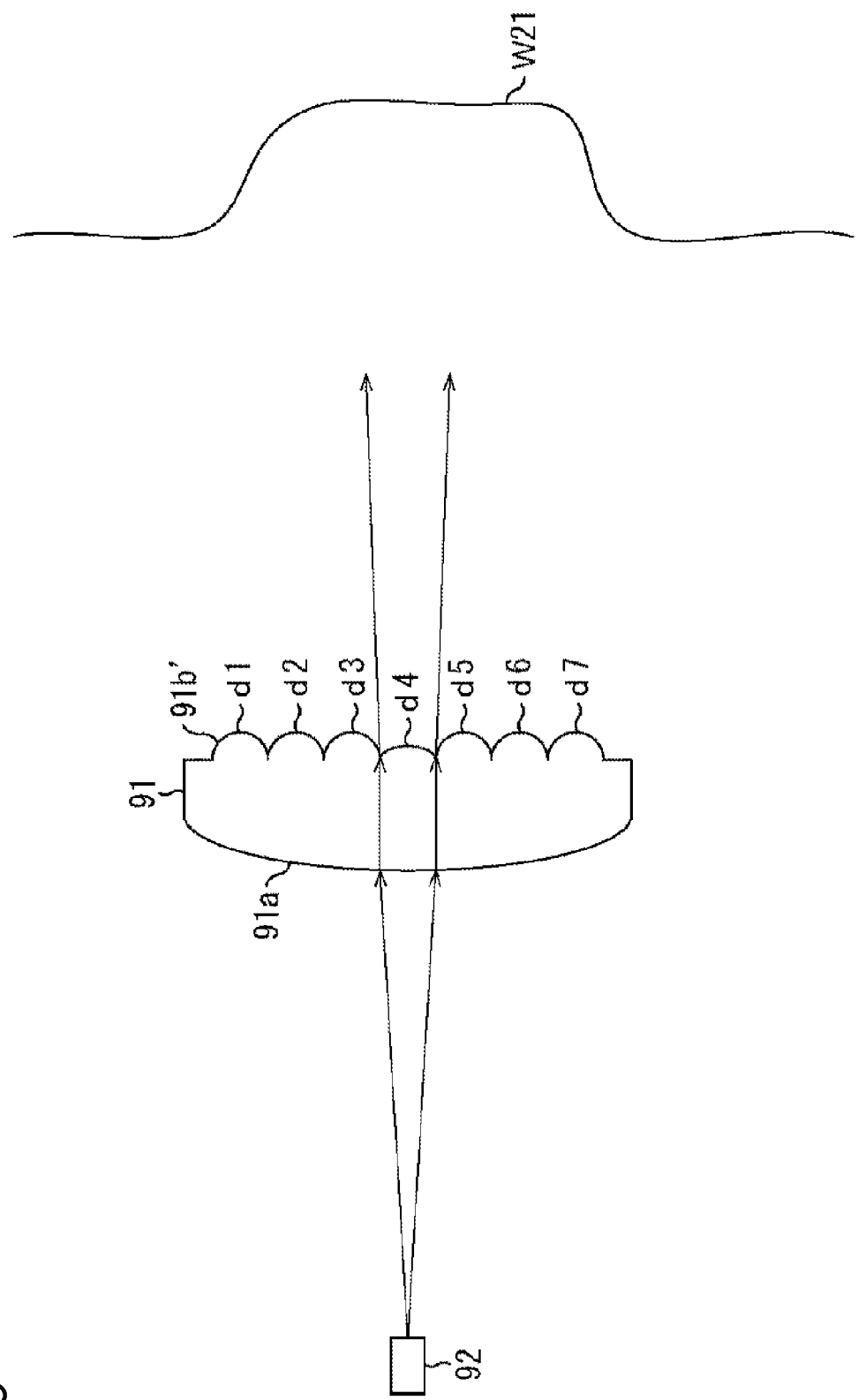
FIG. 13 shows diagrams illustrating a first modification of the light projection optical system of the laser radar device in FIG. 2.

For example, in the case where there are provided with convex lens regions d1 to d7 as illustrated by a light exit surface 91b' in FIG. 13, when the curvature of the lens region d4 is increased while the other lens regions are set to the curvature smaller than that of the lens region d4, the diffused range (angle) can be narrowed in the lens region d4 because of the large curvature. Because the light is not widely diffused in the range where the light is diffused by the lens region d4, the light intensity can be increased near the central portion of the light exit surface 91b' as illustrated by an intensity distribution W21 in a right part of FIG. 13.

Figure 14:
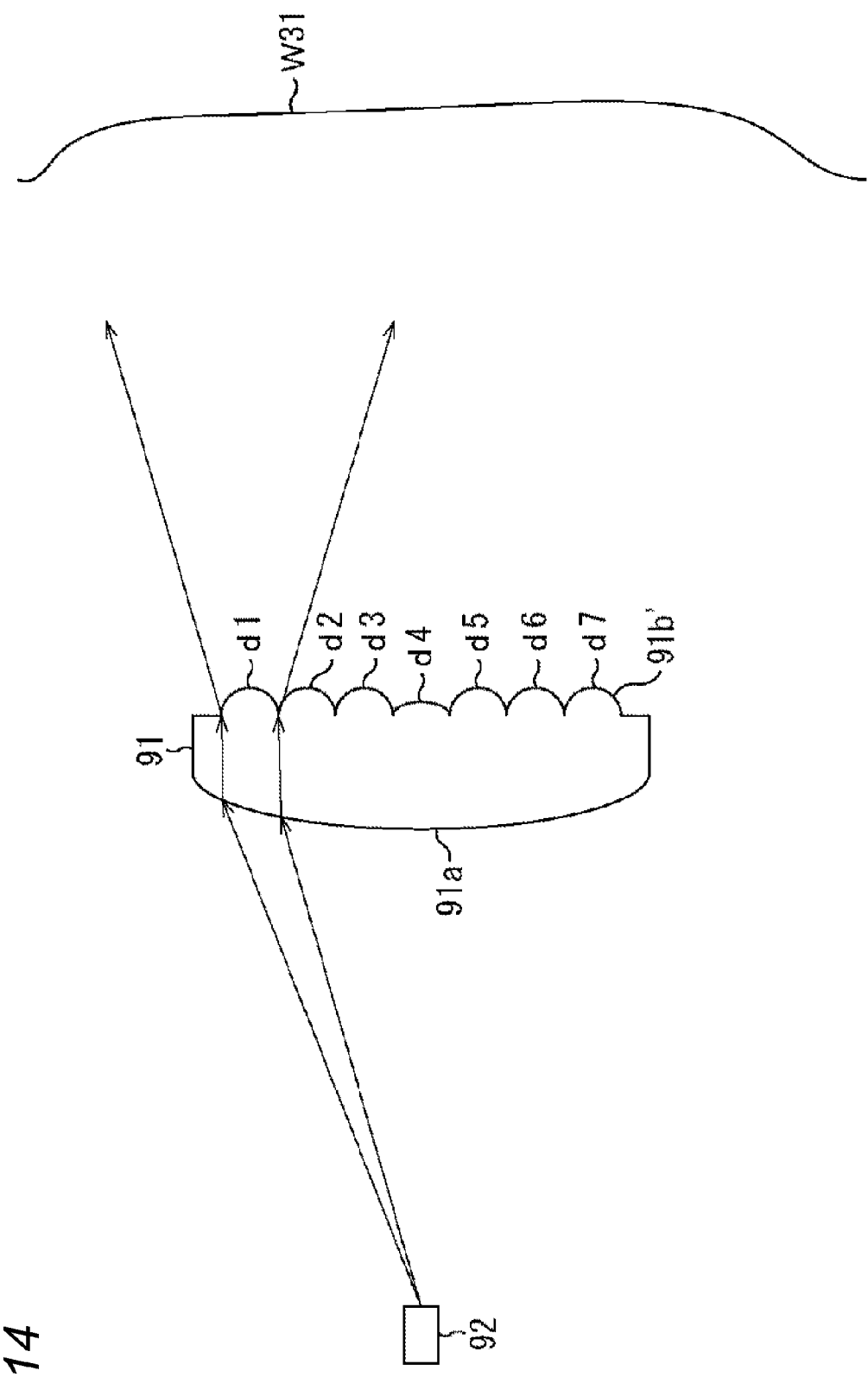
FIG. 14 shows diagrams illustrating the first modification of the light projection optical system of the laser radar device in FIG. 2.

On the other hand, as illustrated by the light exit surface 91b' in FIG. 14, the lens regions d1 to d3 and d5 to d7 have the small curvature so that the diffused range (angle) can be widened. For example, the range where the light is diffused by the lens region d1 is widened, and the light is widely diffused in the range. Thus, as illustrated by an intensity distribution W31 in a right part of FIG. 14, the diffused range can be widened although the light intensity decreases except the central portion of the light exit surface 91b' as the whole of lens regions d1 to d3 and d5 to d7.

Figure 15:
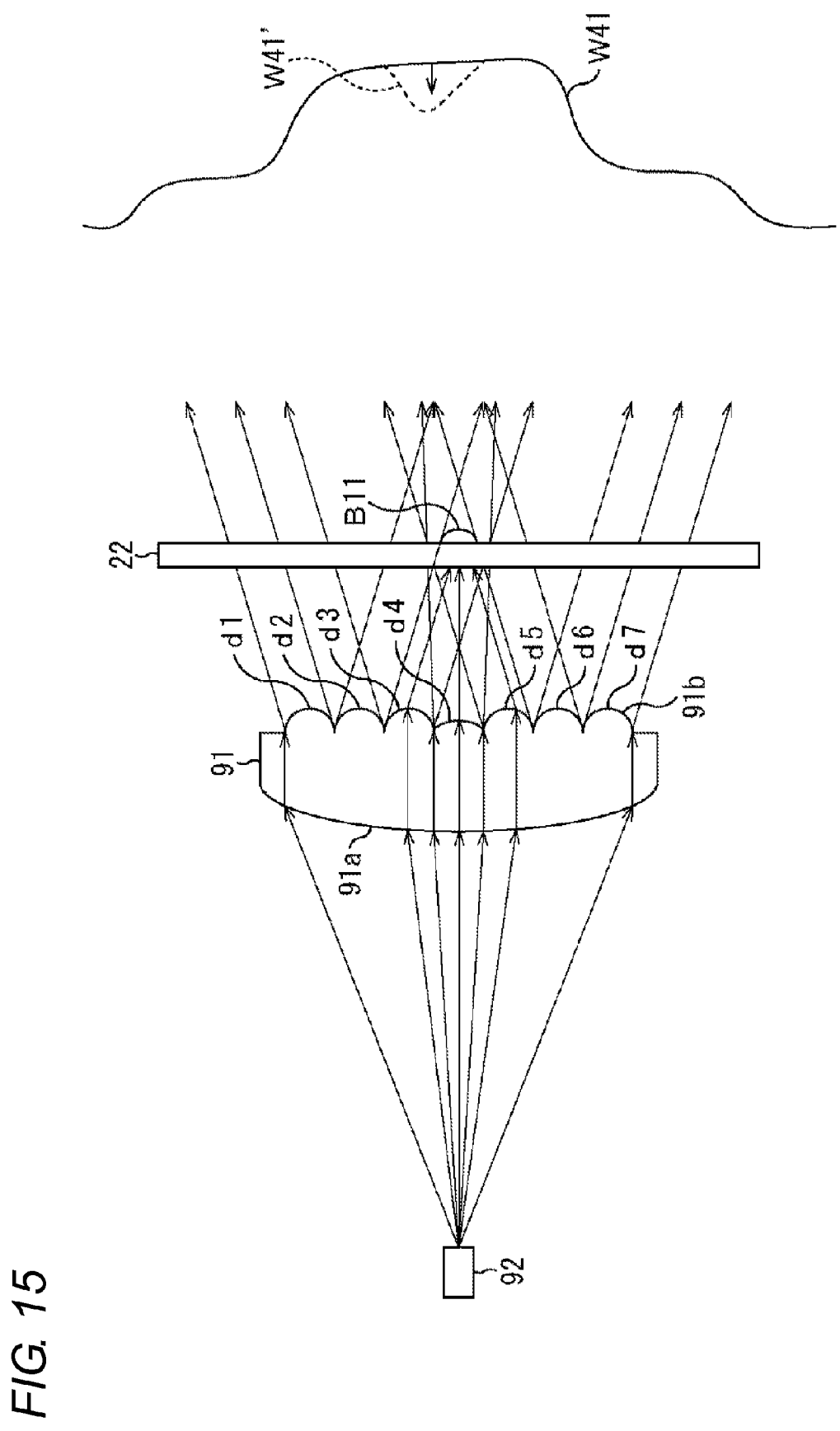
FIG. 15 shows diagrams illustrating an effect of the first modification of the light projection optical system in FIG. 13.

As a result, as illustrated in FIG. 15, the distribution of the light, which is output from the light exit surface 91' and constructed with the plurality of pieces of parallel light, shows the high intensity in the range where the lens region d4 diffuses the light although the range is narrow, and shows the low intensity in the range where the lens regions d1 to d3 and d5 to d7 diffuse the light although the range is wide. In a right part of FIG. 15, a horizontal intensity distribution W41 of the light indicates the case that a shading area B11 such as the dirt is not generated on the windshield 21, and a horizontal intensity distribution W41' indicates the case that the shading area B11 is generated. The change in intensity distribution due to the blind spot generated by the shading area B11 decreases even if the curvature of the lens region is changed.

Figure 16:
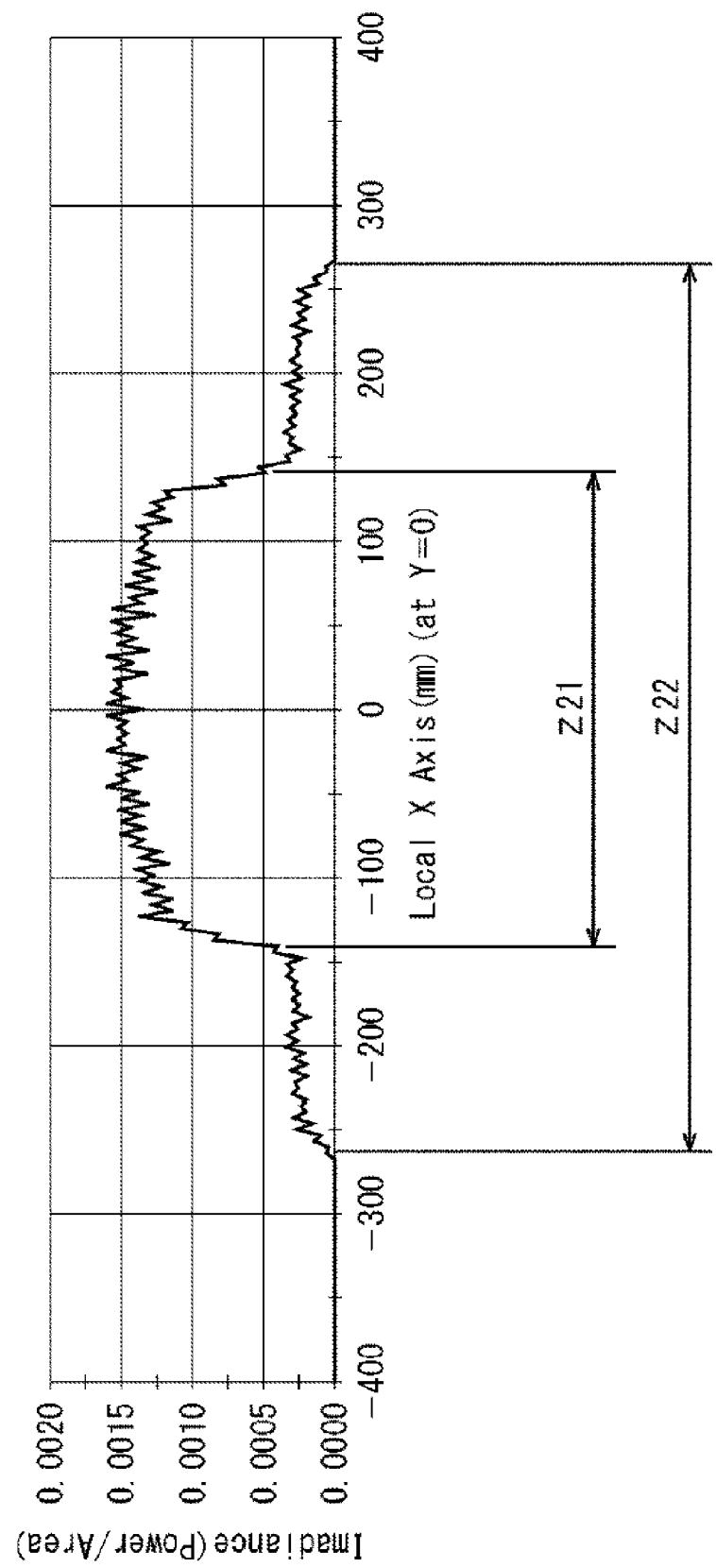
FIG. 16 is a diagram illustrating the effect of the first modification of the light projection optical system in FIG. 13.

FIG. 16 illustrates the intensity distribution based on the measured value obtained with the light projection optical system 91 in FIG. 15. In FIG. 16, a horizontal axis indicates a horizontal position of the projected light, and a vertical axis indicates the light intensity. In a range Z21 in the neighborhood of the center in the horizontal direction of FIG. 16, the intensity distribution indicates that the light diffused by the large-curvature lens region d4 has the relatively narrow diffused range on the light exit surface 91' although the light intensity is high. In a range Z22 except the neighborhood of the center, the intensity distribution indicates that the light diffused by the small-curvature lens regions d1 to d3 and d5 to d7 has the wide diffused range on the light exit surface 91' although the light intensity is relatively low. The range where the range Z22 overlaps with the range Z21 indicates the high light intensity.

For example, the intensity distribution indicates the intensity distribution W41 in the right part of FIG. 15. Even if the dirt adheres to the position corresponding to the lens region d4 in the windshield 21 to generate the shading area B11, the shading area B11 is mutually compensated by the pieces of parallel light constructed with the pieces of light diffused by the surrounding lens regions d2, d3, d5, and d6. Therefore, the light having the sufficient intensity is projected to the object in the monitoring area although the intensity decreases in the shading area B11 as indicated by the intensity distribution W41' in the right part of FIG. 15, so that the presence or absence of the object and the distance to the object can be measured.

Figure 17:
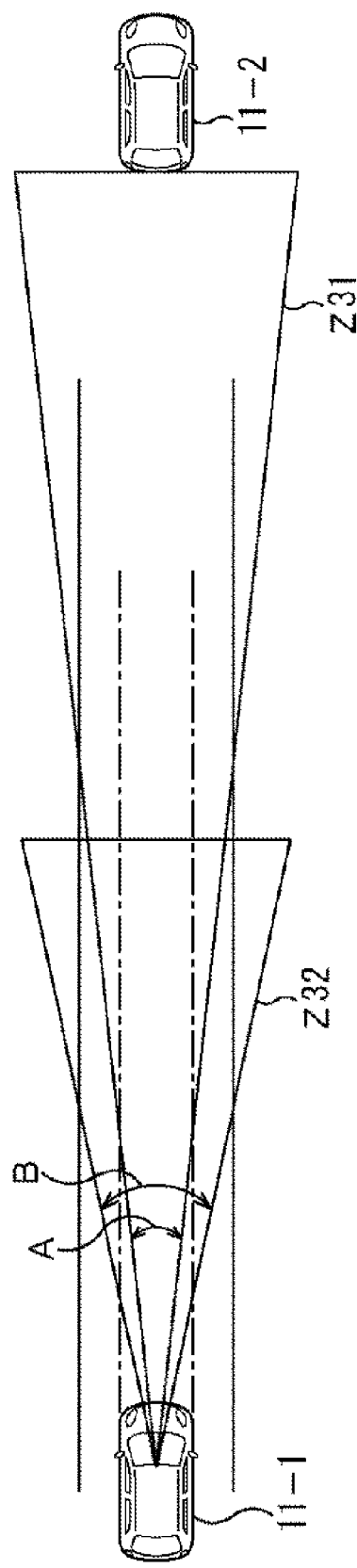
FIG. 17 is a diagram illustrating the effect of the first modification of the light projection optical system in FIG. 13.

The laser beam, which is transmitted through the light projection optical system 91 and generated by the light projection circuit 92, is projected by the light projection part 51 as the light having a characteristic indicated by the intensity distribution W41 (or W41') in FIG. 15. The projection of the light having the intensity distribution can form the monitoring area of the laser radar device 22, where monitoring areas Z31 and Z32 are combined with each other as illustrated in FIG. 17. In FIG. 17, as indicated by the intensity distribution W41 in FIG. 15, because of the high light intensity in the narrow range in the front direction of the light projection optical system 91, the farther range is irradiated with the projected light, and the monitoring area Z31 including the farther area is set to the narrow range, which includes the front direction of a vehicle 11-1 and is indicated by an angle A. On the other hand, as indicated by the intensity distribution W41 in FIG. 15, because of the low light intensity in the wide range except the front direction of the light projection optical system 91, the monitoring area Z32 including the nearer area is set to the wide range, which is located near the vehicle 11-1 and indicated by an angle B in FIG. 17. FIG. 17 illustrates the state that the vehicles 11-1 and 11-2 are traveling toward the right direction, and FIG. 17 is a diagram illustrating a setting example of the monitoring area viewed from above in the case that the laser radar device 22 (not illustrated) incorporated in the vehicle 11-1 measures the distance to the preceding vehicle 11-2.

There is a risk of generating a serious accident when the vehicle 11-1 is in contact with the vehicle 11-2 traveling ahead of the vehicle 11-1. In the light projection part 51 of the laser radar device 22 provided in the vehicle 11-1, the monitoring area is set to the farther area, so that the distance to the preceding vehicle 11-2 can be detected from the farther position to prevent the generation of the serious accident. In the light projection part 51 of the laser radar device 22, the object (a person who runs out or a vehicle in an adjacent lane) that comes possibly close to the traveling direction of the vehicle 11-1 from a lateral direction can be detected in the distance relatively close to the vehicle 11-1 and in the wide range of the angle formed with the traveling direction of the vehicle 11-1.

In the above description, by way of example, assuming that the traveling direction is the forward direction, the monitoring area range in the neighborhood of the central front of the vehicle 11 is set so as to cover the area far away from the vehicle 11, and other monitoring area ranges are set so as to cover the area near the vehicle 11. There is no particular limitation to the setting range of the monitoring area. Alternatively, the monitoring area may be set such that the central front is set to the near range while other ranges are set to the far range, the monitoring area may be set such that the right front is set to the near range while the left front is set to the far range, or the monitoring area may be set such that the right and left ranges are replaced with each other. The replacement of the ranges can be performed by replacing the lens regions having the different curvatures with each other according to the setting of the monitoring area.

[Second and Third Modifications of Light Projection Optical System]

In the above description, by way of example, the light incident surface 91a of the light projection optical system 91 acts as the collimator lens with respect to the horizontal direction. For example, a concave cylindrical lens may be formed as illustrated in a left part of FIG. 18. The concave cylindrical lens is generally used in line illumination, image compression of one-directional light, and surface tilt correction of a laser scanning optical system. The concave cylindrical lens constructed with the light incident surface 91a refracts the laser beam projected by the light projection circuit 92 only in the vertical direction, and causes the laser beam to converge or diverge, while the concave cylindrical lens does not refract the laser beam in the horizontal direction.

In the light projection optical system 91 in a right part of FIG. 18, the neighborhoods at boundaries of the lens regions d1 to d7 are connected by a curved surface in a light exit surface 91b". In the connection area of each of the lens regions d1 to d7 in FIG. 12, because the curved surfaces constituting the lens regions come close to each other in the direction in which the curved surfaces are opposed to each other with decreasing curvature radius of the curved surface, sometimes the light is hardly diffused with the equal intensity in the neighborhood of a valley generated between the lens regions. Therefore, the projected light is not horizontally homogenized, but the spots are possibly generated in the light receiving intensity. On the other hand, as indicated by the light exit surface 91b" in the right part of FIG. 18, the neighborhoods at boundaries of the lens regions d1 to d7 are connected by the smoothed curved surface, which allows the light to be diffused with the equal intensity even in the neighborhood of the valley generated between the lens regions. Therefore, a few spots are generated in the light receiving intensity.

[Configuration Example of Vehicle System Including Laser Radar Device]

Figure 19:
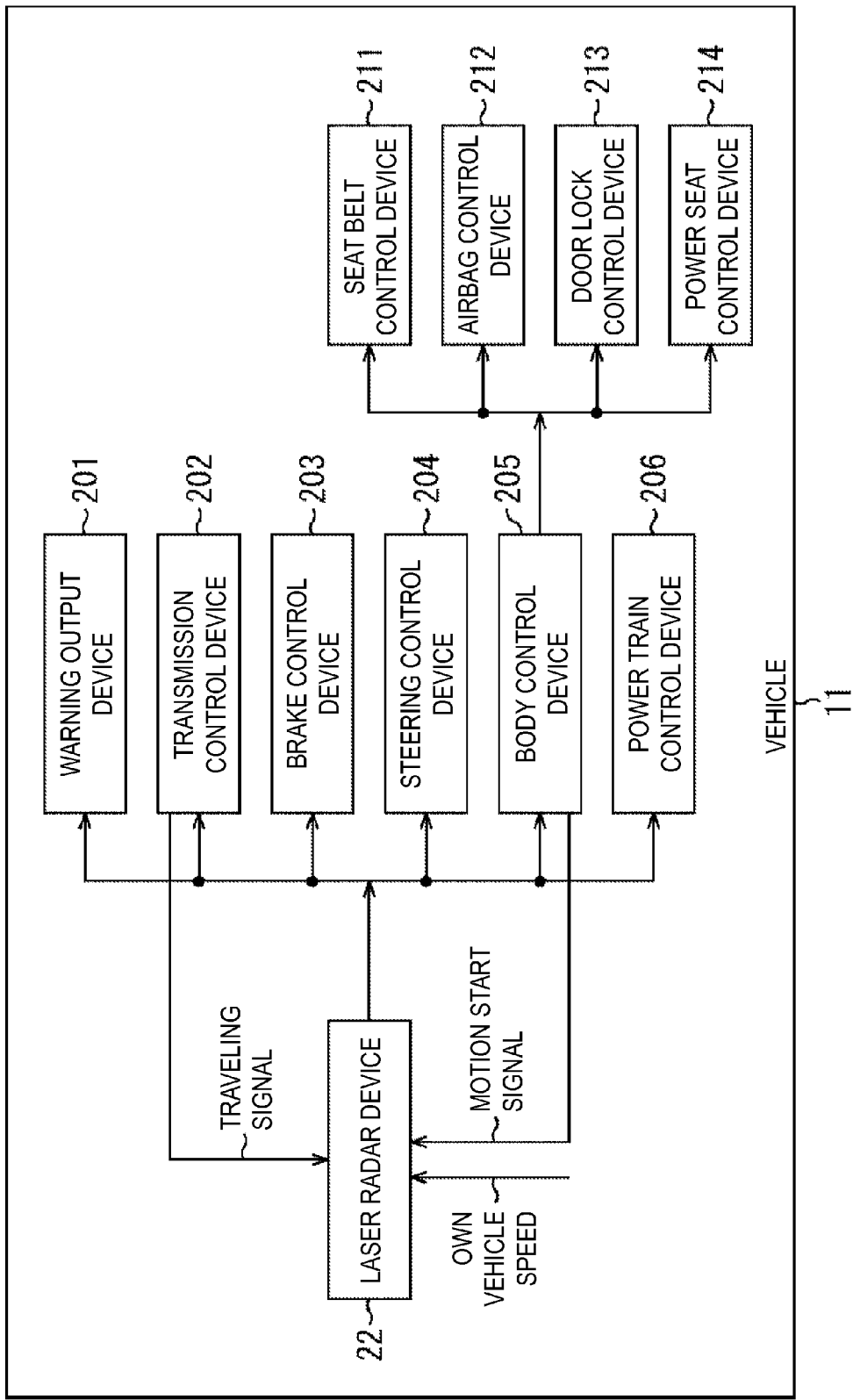
FIG. 19 is a functional block diagram illustrating a system configuration of the vehicle provided with the laser radar device in FIG. 2.

A configuration example of the vehicle 11 (constructed with the vehicle system) including the laser radar device 22 will be described below with reference to FIG. 19. The configuration of the laser radar device 22 is described later with reference to FIG. 20, and the description of the laser radar device 22 is neglected in FIG. 19.

The vehicle 11 includes the laser radar device 22, a warning output device 201, a transmission control device 202, a brake control device 203, a steering control device 204, a body control device 205, a power train control device 206, a seatbelt control device 211, an airbag control device 212, a door lock control device 213, and a power seat control device 214.

Based on warning information from the laser radar device 22, the warning output device 201 outputs the warning information using an image on a display (not illustrated), a sound of a speaker (not illustrated), or lighting of a warning lamp (not illustrated). For example, the laser radar device 22 detects the object (including a preceding vehicle, an obstacle, and a pedestrian) in the monitoring area, probability of generating a danger such as a collision and a contact is predicted to supply the corresponding warning information. At this point, the warning output device 201 outputs the warning corresponding to the warning information to warn a driver using the image on the display (not illustrated), the sound of the speaker (not illustrated), or the lighting of the warning lamp (not illustrated). Through the processing of the warning output device 201, the driver can recognize the possibility of generating the danger such as the collision in advance during vehicle traveling. Therefore, the driver can take action of collision avoidance or an impact reduction measure.

The transmission control device 202 controls a transmission (not illustrated) based on a puddle shift (not illustrated) or a gear shift knob (not illustrated), which is operated by the driver. The transmission control device 202 controls the transmission (not illustrated) based on the information transmitted from the laser radar device 22. In the case that an instruction of cruise control is issued such that the vehicle travels by following the preceding vehicle, for example, the laser radar device 22 detects the preceding vehicle, and the a predetermined distance to the detected preceding vehicle is maintained to supply control information according to the distance to the preceding vehicle. At this point, in conjunction with the brake control device 203 and the power train control device 206, the transmission control device 202 performs the control to put the transmission into the state necessary to accelerate or decelerate the vehicle.

In the case that the instruction of the cruise control is issued such that the vehicle follows the preceding vehicle while the predetermined distance is maintained, the transmission control device 202 controls the transmission to have a gear ratio necessary for the acceleration when the distance to the preceding vehicle is larger than a setting distance. On the other hand, when the distance to the preceding vehicle is smaller than the setting distance, in conjunction with the brake control device 203, the transmission control device 202 controls the transmission into the state necessary for engine brake of the deceleration. As a result, the vehicle can travel while the distance to the preceding vehicle is properly maintained.

The brake control device 203 controls brake motion according to the motion of a brake pedal (not illustrated) operated by the driver. The brake control device 203 also controls the brake motion based on brake control information supplied by the laser radar device 22. That is, when the brake control information controlling a brake (not illustrated) is supplied based on the information on the distance to the object (including a preceding vehicle, an obstacle, and a pedestrian) detected by the laser radar device 22, the brake control device 203 controls the brake motion according to the brake control information. For example, in the case that the laser radar device 22 determines that there is a high probability of the collision with the preceding vehicle based on the distance to the object, the brake control device 203 controls the brake (not illustrated) to decelerate or stop the vehicle when the brake control information necessary for emergency stop. Accordingly, even if the driver gets panics during the collision, the impact is reduced or prevented immediately before the collision is generated.

The steering control device 204 controls a rudder angle of a steering (not illustrated) based on steering control information supplied by the laser radar device 22. For example, in the case that the laser radar device 22 determines that there is a high probability of the collision with the preceding vehicle based on the information on the distance to the object to supply the brake control information operating an emergency brake, the steering control device 204 reads the rudder angle of the steering (not illustrated) of the vehicle 11, determines the probability of spin from a current speed of the vehicle 11 and vehicle body moving direction (detected by an acceleration sensor (not illustrated)) during the operation of the emergency brake, and controls the rudder angle of the steering such that the spin is prevented. Accordingly, even if the emergency brake is operated, the spin of the vehicle 11 can be prevented to safely stop the vehicle.

The body control device 205 determines whether the vehicle 11 is in a motion state based on the operation of an ignition button (not illustrated) or an ignition key, and supplies a motion start signal to the laser radar device 22 when the motion state is detected. Based on body control information supplied by the laser radar device 22, the body control device 205 controls the seatbelt control device 211 that controls winding of a seatbelt (not illustrated), the airbag control device 212 that controls the operation of an airbag (not illustrated), the door lock control device 213 that controls a door lock (not illustrated), and the power seat control device 214 that controls a power seat (not illustrated). For example, in the case that the laser radar device 22 determines that there is a high probability of the collision with the preceding vehicle based on the information on the distance to the object to supply the corresponding body control information, the body control device 205 controls the seatbelt control device 211 to wind up the seatbelt (not illustrated) based on the body control information, and controls the airbag control device 212 to operate the airbag (not illustrated) at proper timing during the collision. At this point, the body control device 205 controls the door lock control device 213 to lock the door (not illustrated) of the vehicle 11 at the proper timing during the collision. Then, based on the current speed of the vehicle 11, the body control device 205 unlocks the door, when the vehicle body does not move (detected by the acceleration sensor (not illustrated)) while the stop of an engine (not illustrated) is detected. The body control device 205 controls the power seat control device 214 to operate the power seat (not illustrated) at the proper timing during the collision, and moves the power seat to a position where the impact applied to a passenger is properly reduced when the airbag (not illustrated) is operated. The body control device 205 operates the power seat (not illustrated) such that the passenger can safely be evacuated from the vehicle 11, when the stop of the engine (not illustrated) is detected.

Accordingly, even if the collision is generated, a load applied to the passenger can be reduced by the operation of the seatbelt (not illustrated), the airbag (not illustrated), and the power seat (not illustrated). The door is locked to prevent the opening of the door in timing of generating the collision accident, so that the passengers including the driver can be prevented from flying out due to the opening of the door of the vehicle 11. Additionally, the door is unlocked and opened after the vehicle 11 stops, so that the passenger can be evacuated or rescued promptly.

The power train control device 206 controls a rotating speed of a power train such as the engine (not illustrated) or a motor (not illustrated) based on power train control information supplied by the laser radar device 22. For example, in the case that the laser radar device 22 determines that there is a high probability of the collision with the preceding vehicle based on the information on the distance to the object to supply the corresponding power train control information, the power train control device 206 decelerates the rotating speed of the power train to reduce the collision impact. Accordingly, even if the driver gets panics during the collision, the impact can be reduced.

[Configuration Example of Laser Radar Device]

Figure 20:
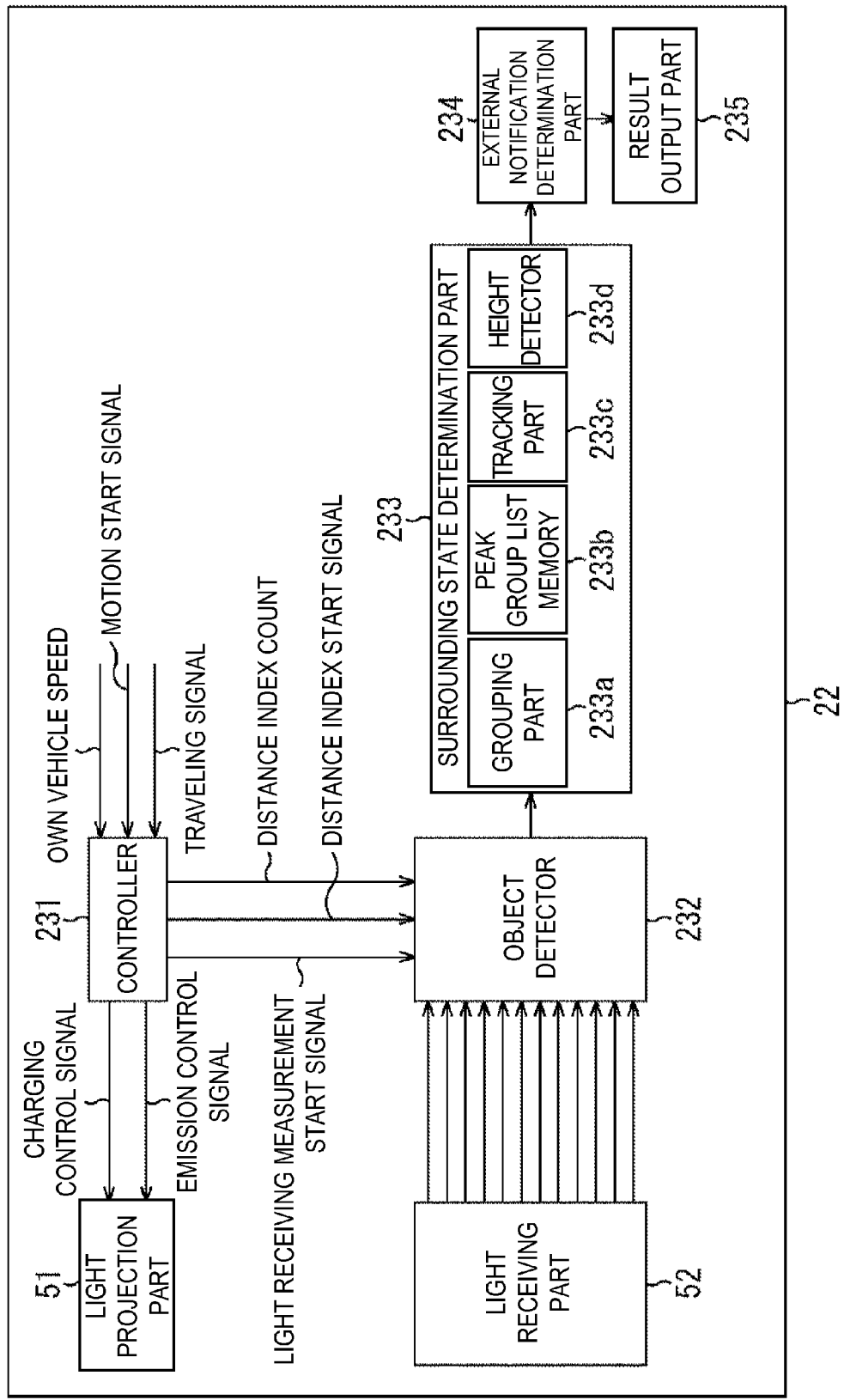
FIG. 20 is a functional block diagram illustrating a configuration example in which the function of the laser radar device in FIG. 2 is implemented.

A configuration example of the laser radar device 22 will be described below with reference to FIG. 20.

The laser radar device 22 includes the light projection part 51, the light receiving part 52, a controller 231, an object detector 232, a surrounding state determination part 233, an external notification determination part 234, and a result output part 235.

The controller 231 control the operation of the light projection part 51 and object detector 232 based on an own vehicle speed supplied from a speed measuring device (not illustrated), a motion start signal corresponding to an operation state of the ignition button or the ignition key, and a traveling signal indicating whether the vehicle is traveling based on the vehicle motion state detected by a motion sensor (not illustrated).

The controller 231 issues an instruction to the light projection part 51 to perform the charging of an electric power necessary for the light projection by generating a charging control signal, and the controller 231 controls emission timing by generating an emission control signal.

The controller 231 supplies a light receiving measurement start signal issuing the instruction to start the detection of the object, a distance index start signal indicating timing of starting a distance index count, and the distance index count to the object detector 232 to control the operation of the object detector 232.

Based on the light receiving measurement start signal, the distance index start signal, and the distance index count from the controller 231, the object detector 232 generates peak information indicating the distance to the object in each direction of the light receiving signal supplied by the light receiving part 52, and supplies the peak information to the surrounding state determination part 233.

The surrounding state determination part 233 includes a grouping part 233a, a peak group list memory 233b, a tracking part 233c, and a height detector 233d. The surrounding state determination part 233 controls the grouping part 233a, groups the peak information indicating the distance to the object in each direction based on the direction and the distance, produces a peak group list, and stores the peak group list in the peak group list memory 233b. The peak group list is constructed with current and preceding lists. The surrounding state determination part 233 controls the tracking part 233c and the height detector 233d to complete a current peak group list based on a preceding peak group list. The peak group list is described in detail later with reference to FIG. 32.

The external notification determination part 234 acquires the peak group list stored in the peak group list memory 233b of the surrounding state determination part 233, and determines whether external devices such as the warning output device 201, the transmission control device 202, the brake control device 203, the steering control device 204, the body control device 205, and the power train control device 206 need to be notified. The external notification determination part 234 issues the instruction to the result output part 235 to make the notification based on a determination result.

The result output part 235 outputs various notifications to various external devices based on the determination result from the external notification determination part 234.

[Configuration Example of Light Projection Part]

Figure 21:
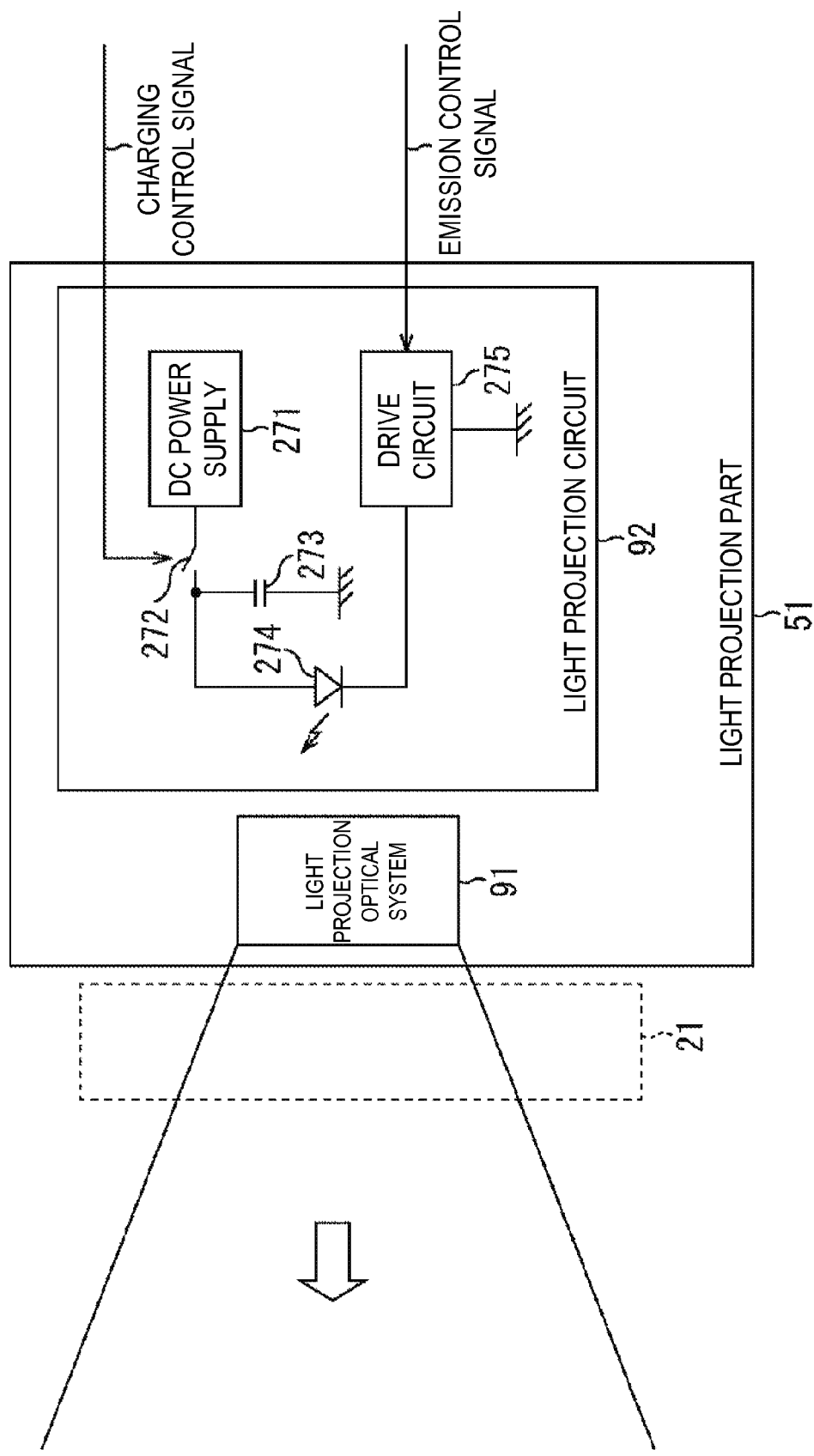
FIG. 21 is a functional block diagram illustrating a configuration example in which the function of a light projection part in FIG. 20 is implemented.

A configuration example of the light projection part 51 will be described below with reference to FIG. 21.

The light projection part 51 includes the light projection circuit 92 that emits the laser beam and the light projection optical system 91 that diffuses the laser beam into the pieces of parallel light in the plurality of directions. The light projection circuit 92 includes a DC power supply 271, a switch 272, a capacitor 273, a laser diode 274, and a drive circuit 275.

The DC power supply 271 generates a DC power supplied to the capacitor 273. The switch 272 puts the DC power supply 271 and the capacitor 273 into the connection state to charge the capacitor 273, when the charging control signal is an on signal issuing the instruction to perform the charging. The switch 272 puts the DC power supply 271 and the capacitor 273 into the non-connection state to stop the charging of the capacitor 273, when the charging control signal is an off signal issuing the instruction to stop the charging.

When the capacitor 273 is charged by the DC power supply 271, the drive circuit 275 controls the capacitor 273 to supply the electric power to the laser diode 274 as needed basis. When the electric power is supplied from the capacitor 273, the laser diode 274 emits the laser beam to project the light to the monitoring area ahead of the vehicle 11 through the light projection optical system 91 and the windshield 21.

When the emission control signal is the on signal issuing the instruction to project the light, the drive circuit 275 controls the operation of the laser diode 274 to apply the electric power accumulated in the capacitor 273 to the laser diode 274, thereby emitting the laser beam. When the emission control signal is the off signal issuing the instruction to stop the light projection, the drive circuit 275 does not apply the electric power accumulated in the capacitor 273 to the laser diode 274, but stops the emission of the laser beam.

[Configuration Example of Light Receiving Part]

Figure 22:
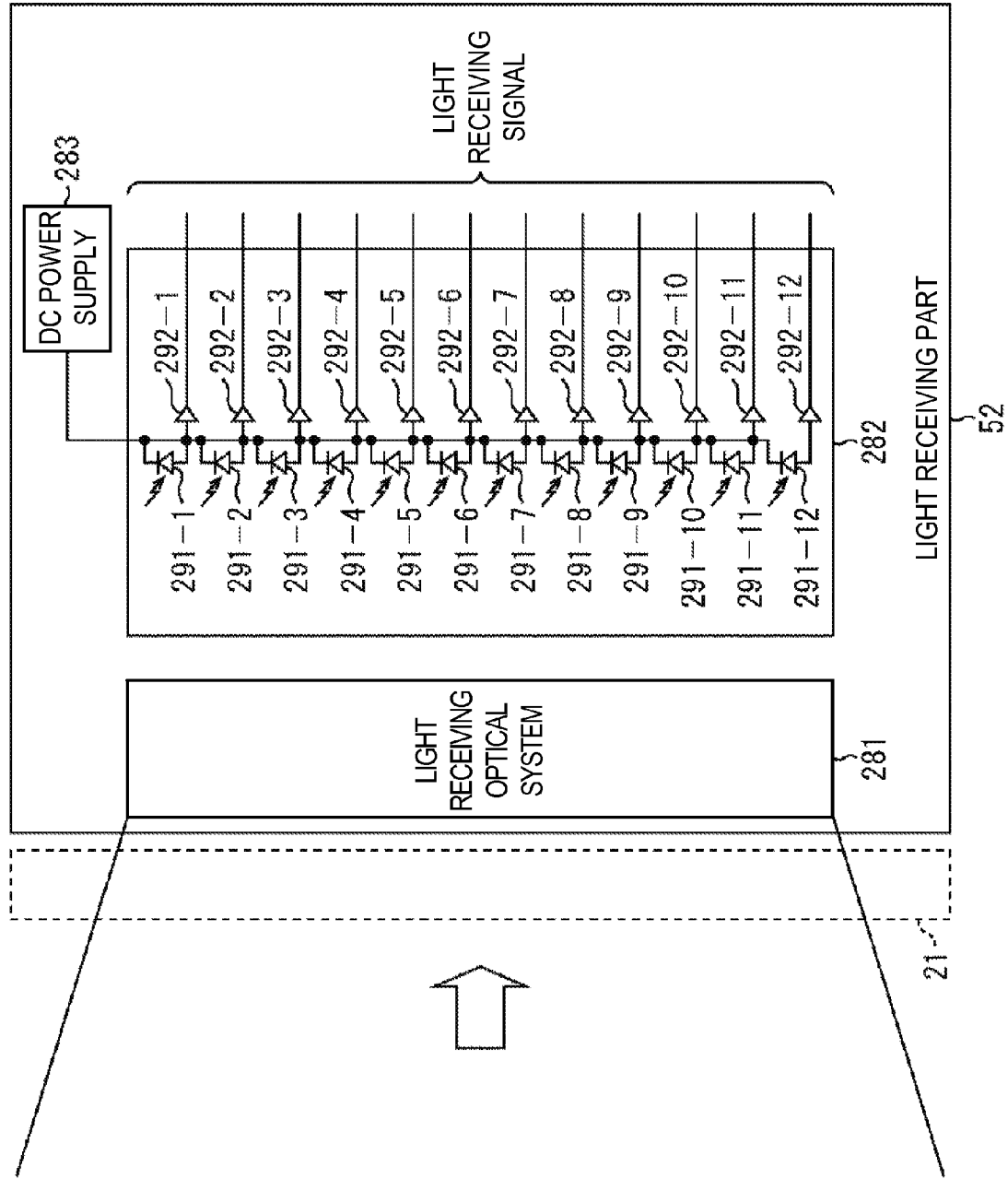
FIG. 22 is a functional block diagram illustrating a configuration example in which the function of a light receiving part in FIG. 20 is implemented.

A configuration example of the light receiving part 52 will be described below with reference to FIG. 22.

The light receiving part 52 includes a light receiving optical system 281, a light receiving circuit 282, and a DC power supply 283.

The light receiving optical system 281 receives the reflected light of the light projected by the light projection part 51 while converting the reflected light to be divided into light receiving elements 291-1 to 291-12 provided in the light receiving circuit 282 in each light incident direction.

The light receiving circuit 282 includes a plurality of light receiving elements 291-1 to 291-12 and a plurality of amplifier circuits 292-1 to 292-12. The light receiving circuit 282 is operated by the electric power supplied from the DC power supply 283. The light receiving circuit 282 receives the light that is incident through the light receiving optical system 281 and reflected from the monitoring area to generate a light receiving signal, and supplies the light receiving signal to the object detector 232. Hereinafter, the light receiving elements 291-1 to 291-12 and the amplifier circuits 292-1 to 292-12 are collectively referred to as a light receiving element 291 and an amplifier circuit 292 unless otherwise indicated. The same holds true for other components. In FIG. 22, by way of example, the 12 light receiving elements 291 and the 12 amplifier circuits 292 are provided in the light receiving circuit 282. However there is no particular limitation to the numbers of light receiving elements 291 and amplifier circuits 292.

The light receiving elements 291-1 to 291-12 are provided in each incident direction of the reflected light, and each light receiving signal is supplied to the amplifier circuit 292 as the signal indicating the incident direction in the monitoring area. The amplifier circuit 292 amplifies the light receiving signal supplied from the light receiving element 291, and outputs the amplified light receiving signal to the object detector 232 as the light receiving signal in each direction.

By way of example, it is conceivable that the light receiving element 291 is formed into a vertically long rectangular shape. In the rectangular light receiving element, the vertical direction Y° in the monitoring area Z1 of FIG. 10 can be increased with increasing vertical length. When the rectangular light receiving elements are horizontally arrayed, the horizontal direction X° in the monitoring area Z1 can be increased as the total of horizontal lengths of the rectangular light receiving elements is increased.

Additionally, all the rectangular light receiving elements can be formed in the same dimension. When the rectangular light receiving elements are horizontally arrayed, the light receiving element having the horizontal length longer than that of other light receiving elements can be used as the light receiving elements 291-1 and 291-12 disposed in end portions. In this case, the pedestrian who is located close to the vehicle can easily be detected at the right or left end of the monitoring area.

[Configuration Example of Controller]

Figure 23:
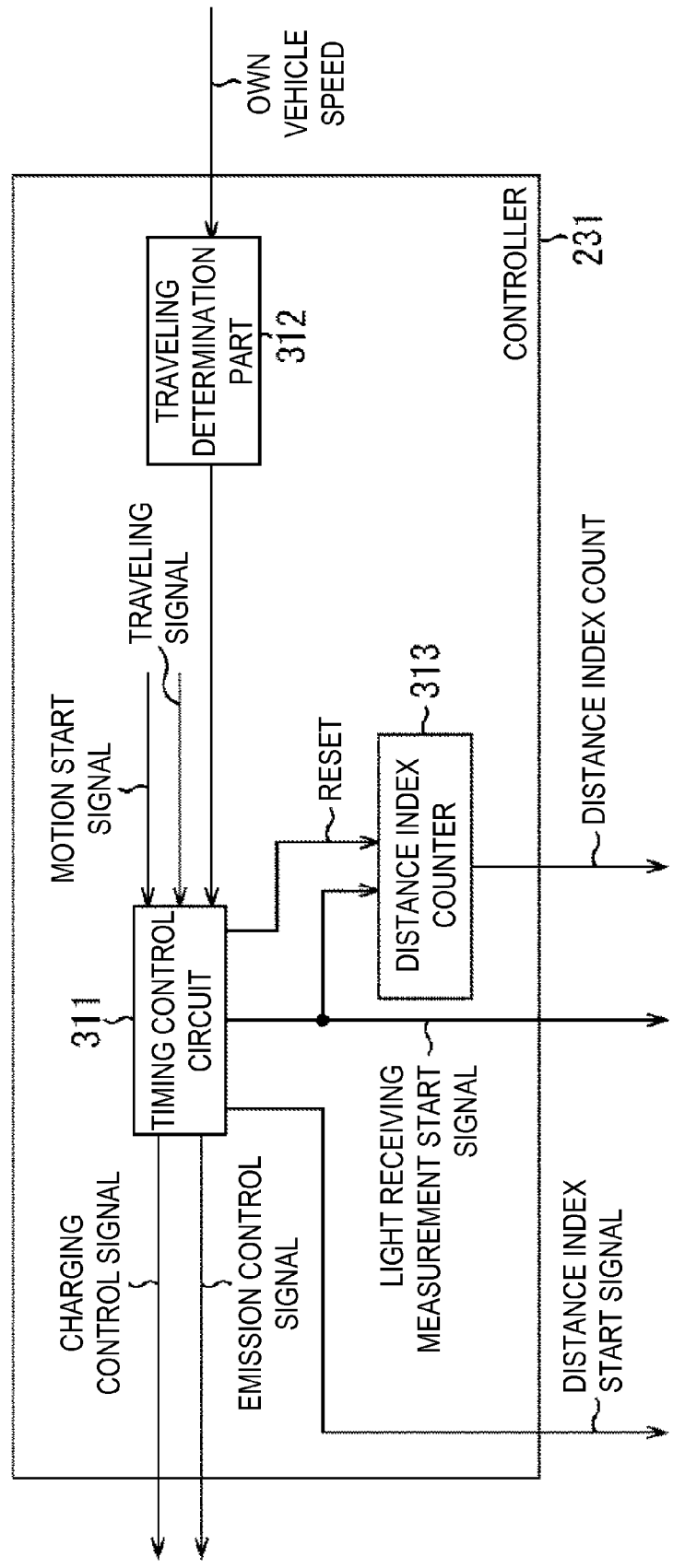
FIG. 23 is a functional block diagram illustrating a configuration example in which the function of a controller in FIG. 20 is implemented.

A configuration example of the controller 231 will be described below with reference to FIG. 23.

The controller 231 includes a timing control circuit 311, a traveling determination part 312, and a distance index counter 313.

Based on the motion start signal, the traveling signal, and a vehicle speed determination result from the traveling determination part 312, the timing control circuit 311 supplies the charging control signal and the emission control signal to the light projection part 51, and supplies a light receiving measurement start signal and the distance index start signal to the object detector 232. The timing control circuit 311 supplies distance index start signal and the light receiving measurement start signal to the distance index counter 313, and supplies a signal indicating the distance index count to the object detector 232.

The traveling determination part 312 acquires the information on the own vehicle speed from the speed measuring device (not illustrated), determines whether the own vehicle speed is substantially zero, namely, whether the vehicle substantially stops or stops, and supplies a determination result to the timing control circuit 311.

[Configuration Example of Object Detector]

Figure 24:
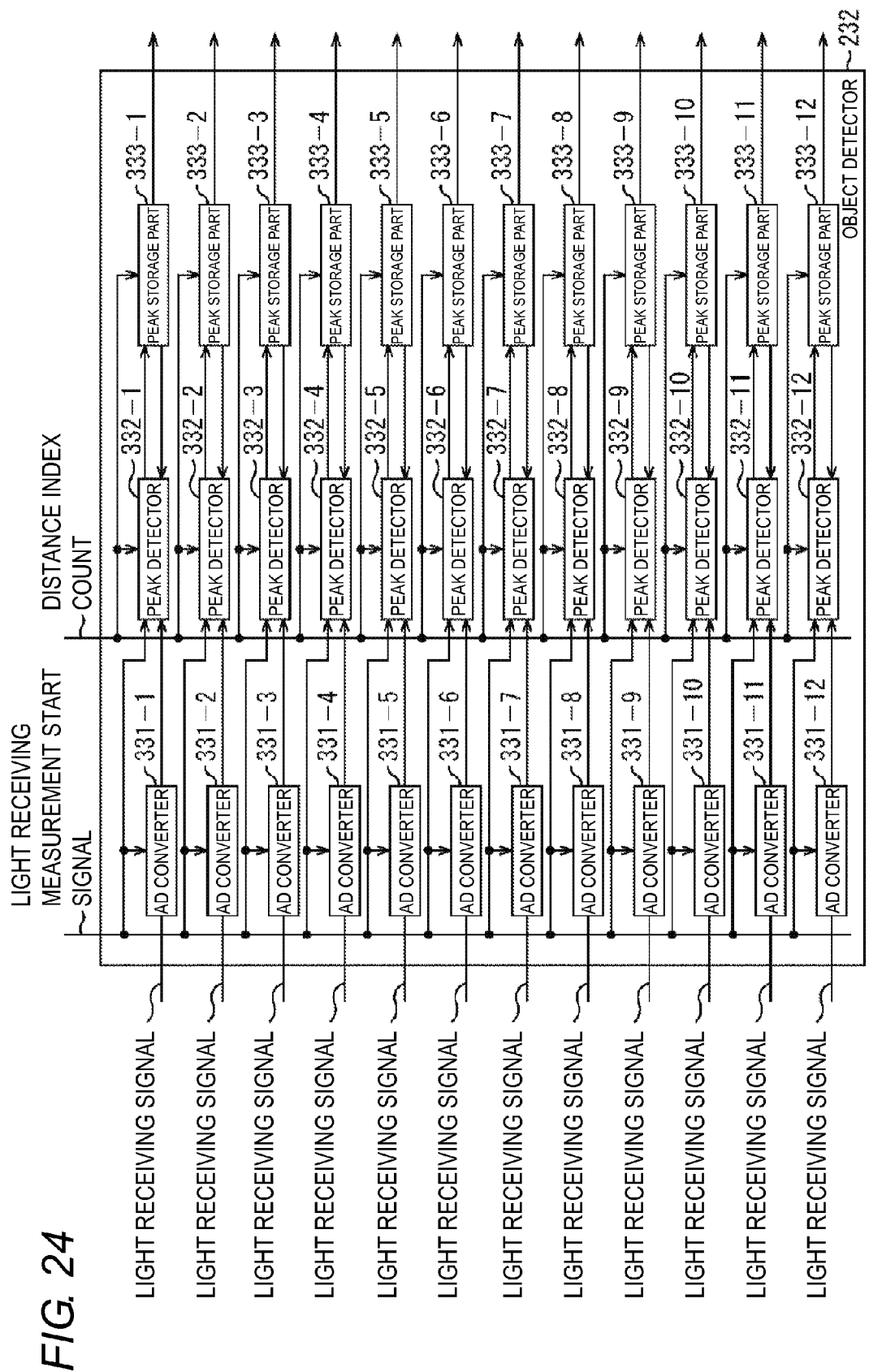
FIG. 24 is a functional block diagram illustrating a configuration example in which the function of an object detector in FIG. 20 is implemented.

A configuration example of the object detector 232 will be described below with reference to FIG. 24.

The object detector 232 includes AD (analog-digital) converters 331-1 to 331-12, peak detectors 332-1 to 332-12, and peak storage parts 333-1 to 333-12.

The AD converters 331-1 to 331-12 are operated based on the light receiving measurement start signal, converts the light receiving signal, which is of an analog signal in each light receiving direction and is supplied by the light receiving part 52, into a digital signal, and supplies the digital signal to the peak detector 332-1 as a light receiving value.

Based on the light receiving value, which is supplied by the AD converter 331 and converted into the digital signal, the peak detectors 332-1 to 332-12 detect the distance index count, and supply detection results to the peak storage parts 333-1 to 333-12. The distance index count indicates the detected distance to the object in each direction in which the reflected light is received, and a light receiving intensity has a peak in the distance index count. The detailed configuration of the peak detector 332 is described later with reference to FIG. 25.

The peak information indicating the distance to the object in each direction in which the reflected light is received in the monitoring area is stored in each of the peak storage parts 333-1 to 333-12, and the peak storage parts 333-1 to 333-12 supply the stored peak information to the surrounding state determination part 233. The peak information is described in detail later with reference to FIG. 30.

[Configuration Example of Peak Detector]

Figure 25:
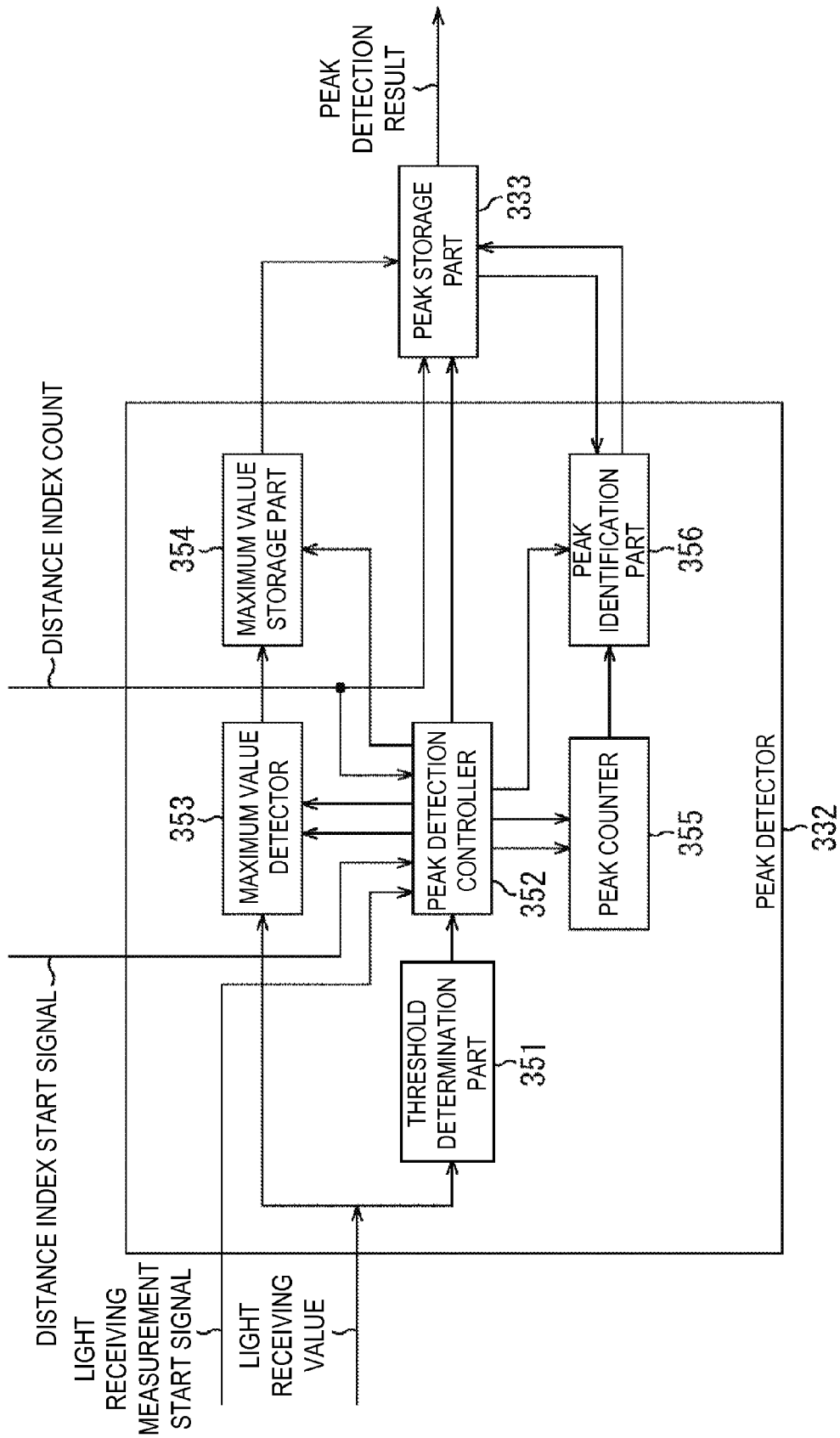
FIG. 25 is a functional block diagram illustrating a configuration example in which the function of a peak detector in FIG. 24 is implemented.

A configuration example of the peak detector 332 will be described below with reference to FIG. 25.

The peak detector 332 includes a threshold determination part 351, a peak detection controller 352, a maximum value detector 353, a maximum value storage part 354, a peak counter 355, and a peak identification part 356.

The threshold determination part 351 determines whether the light receiving value in which the light receiving signal is digitized is a signal that is less than or equal to a predetermined threshold determined to be a noise level. The threshold determination part 351 supplies the light receiving value to the peak detection controller 352 when determining that the signal greater than the predetermined threshold is reflected from the object.

Based on the light receiving measurement start signal and the distance index start signal from the controller 231, the peak detection controller 352 acquires the light receiving value supplied by the threshold determination part 351, and stores the light receiving value while correlating the light receiving value with the distance index count. At this point, based on the distance index count, the peak detection controller 352 causes the maximum value detector 353 to sequentially detect the maximum value of the light receiving value in which the reflected light is detected, and stores the detected maximum value in the maximum value storage part 354. When the threshold determination part 351 does not supply the light receiving value because the signal is determined to be less than the predetermined threshold, the peak detection controller 352 stores the maximum value stored in the maximum value storage part 354 in the peak storage part 333 as the peak information. Then peak detection controller 352 resets the distance index count.

When the light receiving value is supplied from the threshold determination part 351, the peak detection controller 352 supplies the current distance index count to the peak counter 355. The peak counter 355 increments a peak count counting a peak width when the distance index count is supplied. When the threshold determination part 351 stops the supply of the light receiving value, the peak detection controller 352 determines that the light receiving value becomes the predetermined threshold or less, causes the peak counter 355 to supply the peak count to the peak identification part 356, and causes the peak counter 355 to reset the peak count.

When the threshold determination part 351 stops the supply of the light receiving value, the peak detection controller 352 causes the peak identification part 356 to calculate the peak width based on the peak count supplied by the peak counter 355, and causes the peak identification part 356 to register the peak width in the peak storage part 333 as the peak information. Accordingly, peak information including the maximum light receiving value that is maximized when the peak of the light receiving value is detected, the distance index count indicating timing of supplying the light receiving value that becomes the peak, and the peak information including the pulse width of the light receiving value having the peak value is stored in the peak storage part 333.

[Object Sensing Motion Processing of Laser Radar Device]

Figure 26:
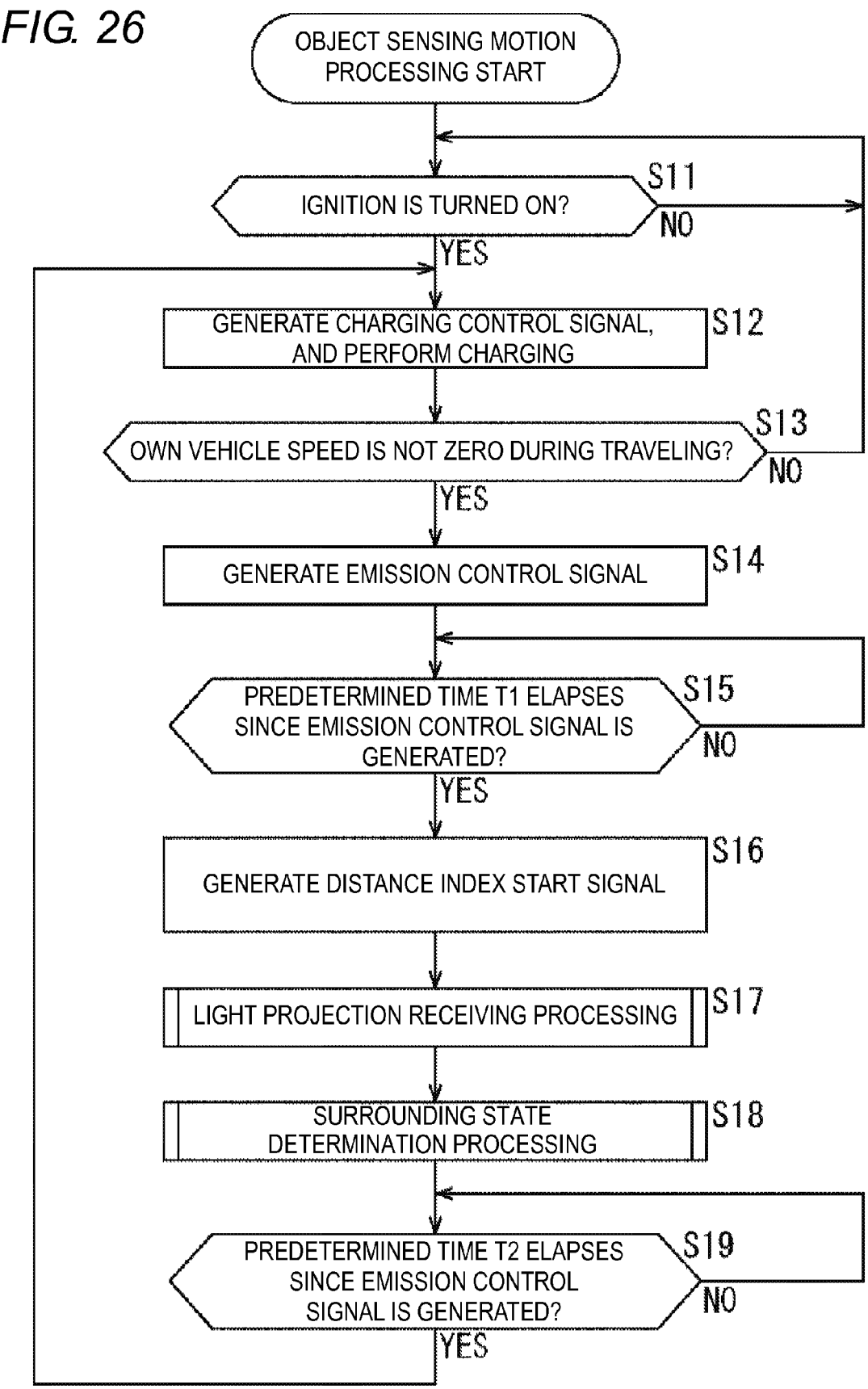
FIG. 26 is a flowchart illustrating object sensing operation processing.

The object sensing motion processing of the laser radar device 22 will be described below with reference a flowchart in FIG. 26.

In Step S11, the timing control circuit 311 of the controller 231 determines whether the vehicle 11 can travel by turning on the ignition based on the motion start signal, and the timing control circuit 311 repeats the same processing until the ignition is determined to be turned on. In Step S11, when the motion start signal becomes a high signal indicating the state of turned on as indicated by clock times t0 to t3 in an uppermost stage of FIG. 27, the timing control circuit 311 determines that the ignition is turned on, and the processing goes to Step S12.

Figure 27:
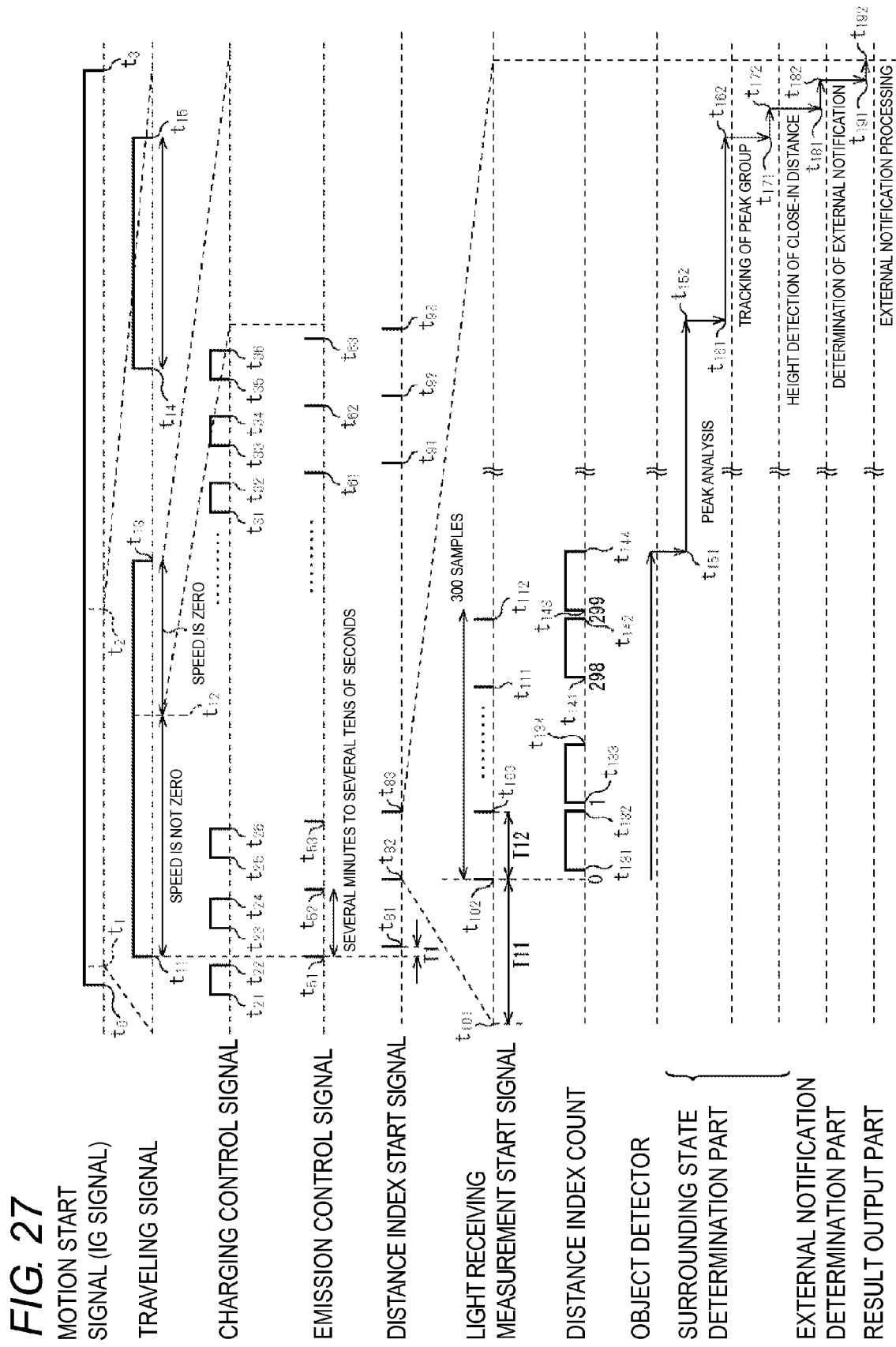
FIG. 27 is a timing chart illustrating the object sensing operation processing.

FIG. 27 illustrates waveforms or operation timing periods of, in order from the above, the motion start signal (IG: ignition signal), the traveling signal, the charging control signal, the emission control signal, the distance index start signal, the light receiving measurement start signal, the distance index count, operation timing in the object detector 232, operation timing of the surrounding state determination part 233, operation timing of the external notification determination part, and operation timing of the result output part 235.

In Step S12, the timing control circuit 311 supplies the charging control signal to the light projection part 51 to turn on the switch 272 of the light projection circuit 92 of the light projection part 51. Accordingly, the DC power supply 271 supplies the electric power to the capacitor 273 to charge the capacitor 273. This charging processing is initially performed, and the charging control signal constructed with the waveform at clock times t21 to t22 is generated after the motion start signal becomes high as indicated by the clock time t0 in the uppermost stage of FIG. 27.

In Step S13, the timing control circuit 311 determines whether the traveling signal indicates that the vehicle is traveling, and whether the traveling determination part 312 determines the current own vehicle speed is not zero based on the vehicle speed information supplied by the vehicle speed detection device (not illustrated). For example, in the case that the vehicle is not traveling because the traveling signal is the low signal indicating that the vehicle is not traveling as indicated by clock times t13 to t14 in a second stage of FIG. 27, or in the case that the own vehicle speed is determined to be zero (the vehicle speed is smaller than a predetermined value and is substantially zero) even if the traveling signal is the high signal indicating that the vehicle is traveling as indicated by clock times t12 to t13, the processing returns to Step S11. In this case, the pieces of processing in Steps S11 to S13 are repeated.

On the other hand, in Step S13, in the case that the own vehicle speed is not zero while the traveling signal is the high signal indicating that the vehicle is traveling as indicated by clock times t11 to t12 in the second stage of FIG. 27, the processing goes to Step S14.

In Step S14, the timing control circuit 311 supplies the emission control signal to the drive circuit 275 of the light projection part 51 to cause the laser diode 274 of the light projection part 51 to emit the light. For example, the drive circuit 275 is operated by generating the emission control signal constructed with a pulse signal indicated by a clock time t51 in a fourth stage of FIG. 27, the laser diode 274 emits the light by passing the electric power accumulated in the capacitor 273 through the laser diode 274, and the laser diode 274 emits the light until the electric power accumulated in the capacitor 273 is wholly discharged. The light emitted from the laser diode 274 is converted into the pieces of parallel light in the plurality of directions by the light projection optical system 91, and the light is projected to the monitoring area ahead the traveling vehicle 11 through the windshield 21. At this point, the projected light is reflected when the object (such as a person and a vehicle) is present in the monitoring area.

In Step S15, the timing control circuit 311 determines whether predetermined time T1 elapses since the emission control signal is generated. In Step S15, the same processing is repeated until the predetermined time T1 elapses at which the optical output of the light projection part 51 is maximized since the emission control signal constructed with the pulse waveform is generated as indicated by a clock time t51 in a fifth stage of FIG. 27. In Step S15, when the timing control circuit 311 determines that the predetermined time T1 elapses, the processing goes to Step S16.

In Step S16, the timing control circuit 311 generates the distance index start signal constructed with the pulse waveform at a clock time t81 in the fifth stage of FIG. 27, at which the predetermined time T1 elapses since the emission control signal is generated at the clock time t51, and the timing control circuit 311 supplies the distance index start signal to the object detector 232 and the distance index counter 313.

In Step S17, when the distance index start signal is supplied, the object detector 232 performs light projection receiving processing to generate the peak information indicating the position (distance) where the object is present in each direction based on the light receiving signal, and supplies the peak information to the surrounding state determination part 233. The light receiving part 52 generates the light receiving signal by receiving the light, which is projected by the light projection part 51 and reflected from the object. The light projection receiving processing is described later with reference to a flowchart in FIG. 28.

In Step S18, based on the peak information indicating the position where the object is present in each direction, the surrounding state determination part 233 performs surrounding state determination processing to produce the peak group list in which the pieces of similar peak information are grouped, and supplies the peak group list to the external notification determination part 234. The surrounding state determination processing is described later with reference to a flowchart in FIG. 29.

In Step S19, the timing control circuit 311 determines whether predetermined time T2 (T2>T1, T2 ranges from several minutes to several tens of seconds) elapses since the emission control signal is generated, and the same processing is repeated until the predetermined time T2 is determined to elapse.

When the predetermined time T2 elapses since the emission control signal is generated in Step S19, the processing returns to Step S12. In the case that the timing when the predetermined time T2 elapses from a clock time t51 in the fourth stage of FIG. 27 is the timing of generating the next emission control signal generating timing indicated by the clock time t52, the next distance index start signal is generated in the timing indicated by a clock time t82 when the predetermined time T1 elapses from the clock time t52 in the fifth stage of FIG. 27. That is, until the predetermined time T2 elapses since the emission control signal is generated, the distance index start signal is repeatedly generated to perform the light projection receiving processing and the surrounding state determination processing at intervals of the predetermined time T2 in the emission control signal after the predetermined time T1 elapses since the emission control signal is generated. Accordingly, the next timing becomes the timing indicated by a clock time t83 in the fifth stage of FIG. 27. Thereafter, similarly the distance index start signal is repeatedly generated at intervals of the predetermined time T2 that is of the generation interval of the emission control signal.

In the case of the third stage of FIG. 27, the charging control signal constructed with the pulse waveform at clock times t23 to t24 is generated through the processing in Step S12 to charge the capacitor 273 of the light projection circuit 92. The emission control signal constructed with the pulse waveform at clock time t52 is generated through the processing in Step S14, and the electric power accumulated in the capacitor 273 by the drive circuit 275 is discharged, whereby the laser diode 274 emits the light. Thereafter, the pieces of processing in Steps S12 to S19 are repeatedly performed at intervals of the predetermined time T2, and the charging control signal and the emission control signal are repeatedly generated as the signals constructed with the pulse waveform indicated by clock times t25 to t26 and the pulse waveform indicated by a clock time t53.

Accordingly, the light projection receiving processing and the surrounding state determination processing are repeatedly performed at predetermined intervals, and the peak group list can be produced through the light projection receiving processing of the object detector 232 and the surrounding state determination processing of the surrounding state determination part 233 while updated at predetermined time intervals.

[Light Projection Receiving Processing]

Figure 28:
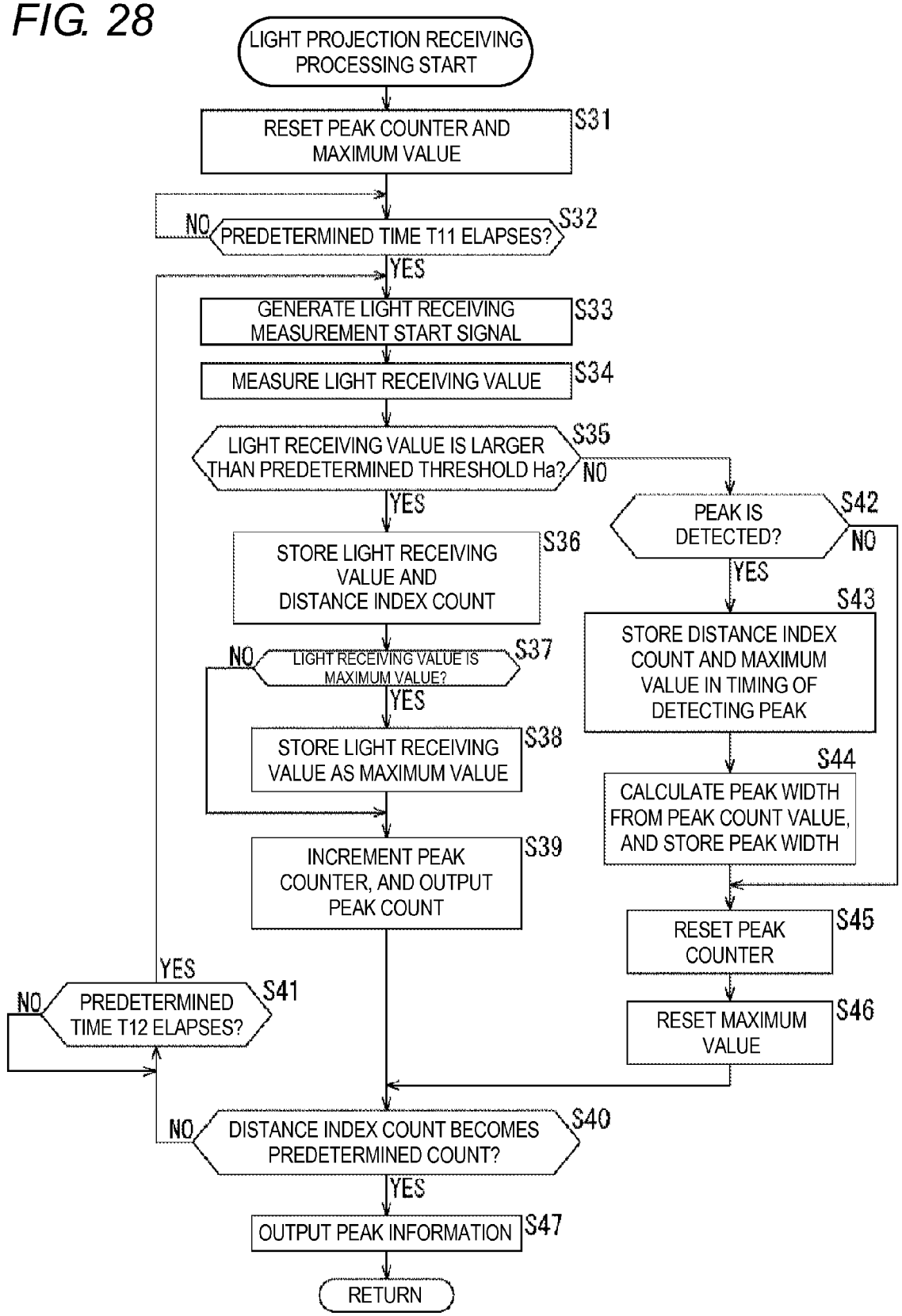
FIG. 28 is a flowchart illustrating light projection receiving processing.

The light projection receiving processing will be described below with reference a flowchart in FIG. 28.

In Step S31, the peak detection controller 352 initializes the maximum value stored in the maximum value storage part 354 and the peak counter value stored in the peak counter 355 to set the maximum value and the peak counter value to zero.

In Step S32, the timing control circuit 311 determines whether predetermined time T11 (from when the distance index start signal is generated to when the light projected by the light projection part 51 passes through the distance on the hood of the vehicle 11 (for example, about 3.3 ns when a hood length is set to about 50 cm)) elapses, and the timing control circuit 311 repeats the processing in Step S31 until the predetermined time T11 elapses. Because the light receiving value based on the light receiving signal generated by the light received as the reflected light during the predetermined time T11 is considered to be a noise, the predetermined time T11 is the time during which the processing is not performed for ignoring the light receiving signal. The predetermined time T11 is set depending on the position where the laser radar device 22 is placed in the vehicle 11 and the length of the front part of the vehicle, and the predetermined time T11 is set in various ways according to the shape of the vehicle. For the predetermined time T11, letting the predetermined time T1=0 leads to T11=T1+T11, and the emission control signal may also be used as the distance index start signal.

When the predetermined time T11 is determined to elapse in Step S32, the processing goes to Step S33.

In Step S33, the timing control circuit 311 generates the light receiving measurement start signal, and supplies the light receiving measurement start signal to the object detector 232. The light receiving measurement start signal constructed with the pulse waveform is generated at a clock time t102 when the predetermined time T11 elapses after the distance index start signal is generated at the clock time t83 corresponding to a clock time t101 in a sixth stage of FIG. 27.

In Step S34, the object detector 232 acquires the light receiving signal that is received by the light receiving part 52 as the light reflected from the monitoring area. In the light receiving part 52, the light receiving element 291 of the light receiving circuit 282 receives the reflected light incident through the light receiving optical system 281 to output the signal to the amplifier circuit 292, and the amplifier circuit 292 amplifies the signal and outputs the amplified signal as the light receiving signal. The AD converter 331 of the object detector 232 converts the light receiving signal into the light receiving value constructed with the digital signal, and supplies the light receiving value to the peak detector 332. The processing in Step S34 is performed in each direction of the reflected light incident to the light receiving part 52, and the light receiving value is generated in each of 12 directions in the configuration example of the light receiving part 52 in FIG. 22.

In Step S35, the threshold determination part 351 of the peak detector 332 determines whether the light receiving value is larger than a predetermined threshold Ha. For example, in the case that the light receiving value is larger than the predetermined threshold Ha in Step S35, the processing goes to Step S36.

In Step S36, the threshold determination part 351 outputs the information on the light receiving value to the peak detection controller 352. The peak detection controller 352 stores the light receiving value output from the threshold determination part 351 and the distance index counter value at this timing. As indicated in a seventh stage of FIG. 27, the distance index counter 313 of the timing control circuit 311 generates the distance index counter value when the timing control circuit 311 supplies the light receiving measurement start signal to the distance index counter 313. The distance index counter value is output as the pulse signal having the pulse width corresponding to the traveling distance of the light. For example, in the case of FIG. 7, the distance index counter value is output as the pulse signal having the pulse width of about 0.6 ns. As differential time between the timing of the preceding emission control signal and the timing of receiving the reflected light can be obtained from the distance index start signal generated at predetermined time intervals and the distance index count generated based on the distance index start signal, and an optical path distance in which the light projected by the light projection part 51 is reflected from the object and received as the reflected light is obtained from a relationship between the differential time and the speed of light, so that the distance to the object from the measuring position can be obtained.

In Step S37, the peak detector 332 controls the maximum value detector 353 to compare the supplied light receiving value to the maximum value stored in the maximum value storage part 354 in order to determine whether the light receiving value is the maximum value. When the light receiving value is determined to be the maximum value in Step S37, the maximum value detector 353 updates and stores the maximum value stored in the maximum value storage part 354 in Step S38. On the other hand, when the light receiving value is determined not to be the maximum value in Step S37, the processing in Step S38 is skipped.

In Step S39, the peak detection controller 352 controls the peak counter 355 to increment the peak count, and the peak count is output to and stored in the peak identification part 356.

In Step S40, the timing control circuit 311 determines whether the value of the distance index counter 313 is a predetermined count, and the processing goes to Step S41 when the value of the distance index counter 313 is not the predetermined count.

In Step S41, the timing control circuit 311 determines whether predetermined time T12 (>T11) elapses, and repeats the same processing until the predetermined time T12 elapses. When the predetermined time T12 elapses in Step S43, the processing returns to Step S33. That is, the pieces of processing in Steps S33 to S41 are repeated until the value output from the distance index counter 313 reaches the predetermined count.

In the value generated by the distance index counter 313, the value corresponding to the distance to the monitoring area is set as an upper limit. For example, in the case that the monitoring area ranges up to 30 m from the laser radar device 22, the light receiving measurement start signal is repeatedly generated 300 times when the light receiving measurement start signal is generated at time intervals during which the light reciprocates in the distance of 10 cm. Accordingly, in this case, the timing control circuit 311 generates the light receiving measurement start signal at time intervals of 0.66 ns (=predetermined time T12), namely, at clock times t102, t103, . . . , t111, and t112 as indicated in the sixth stage of FIG. 27. At this point, based on the light receiving measurement start signal, the distance index counter 313 increments the value from 0 to 299 at the same time intervals as indicated by clock times t131 to t132, t133 to t134, . . . , t141 to t142, and t143 to t144 in the seventh stage of FIG. 27. In this case, the upper limit of the distance index counter 313, namely, the predetermined threshold is set to 299. Assuming that all the light receiving values are larger than the predetermined threshold Ha, the light receiving values of 300 samples are stored together with the distance index counts, and the peak is detected based on these pieces of information. Accordingly, the predetermined time T12 can be said to be the time that defines the generation interval of the light receiving measurement start signal.

On the other hand, when the light receiving value is determined not to be larger than the predetermined threshold in Step S35, the processing goes to Step S42.

In Step S42, the threshold determination part 351 does not output the information on the input light receiving value. At this point, the distance index counter 313 supplies the count to the peak detection controller 352 although the information on the light receiving value is not supplied. In such cases, the peak detection controller 352 can recognize that the current timing is out of the period during which the peak is detected because the light receiving value is smaller than the predetermined threshold. Therefore, the peak detection controller 352 determines whether the peak is detected by detecting the maximum value based on the stored light receiving value and distance index count.

The peak identification part 356 may perform processing of distinguishing the light reflected from the reflector from other pieces of light, for example, the light reflected from a road surface to exclude the other pieces of light. The light reflected from the road surface differs from the light reflected from the reflector in a ratio between the peak height and the peak width of the light receiving value. The light reflected from the road surface has a gentle peak waveform. The light reflected from the reflector can be distinguished from the light reflected from the road surface using a predetermined threshold with respect to the ratio between the peak height and the peak width of the light receiving value.

The peak detection is not limited to the method of the above embodiments. Alternatively, the peak may be detected by another method such that the distance index counter value in which the light receiving value becomes the neighborhood of the maximum value, the value near the maximum value of the peak, and the width of the waveform near the peak are stored.

For the peak width, the influence of the noise can be reduced using not the fixed threshold but a variable threshold.

Figure 29:
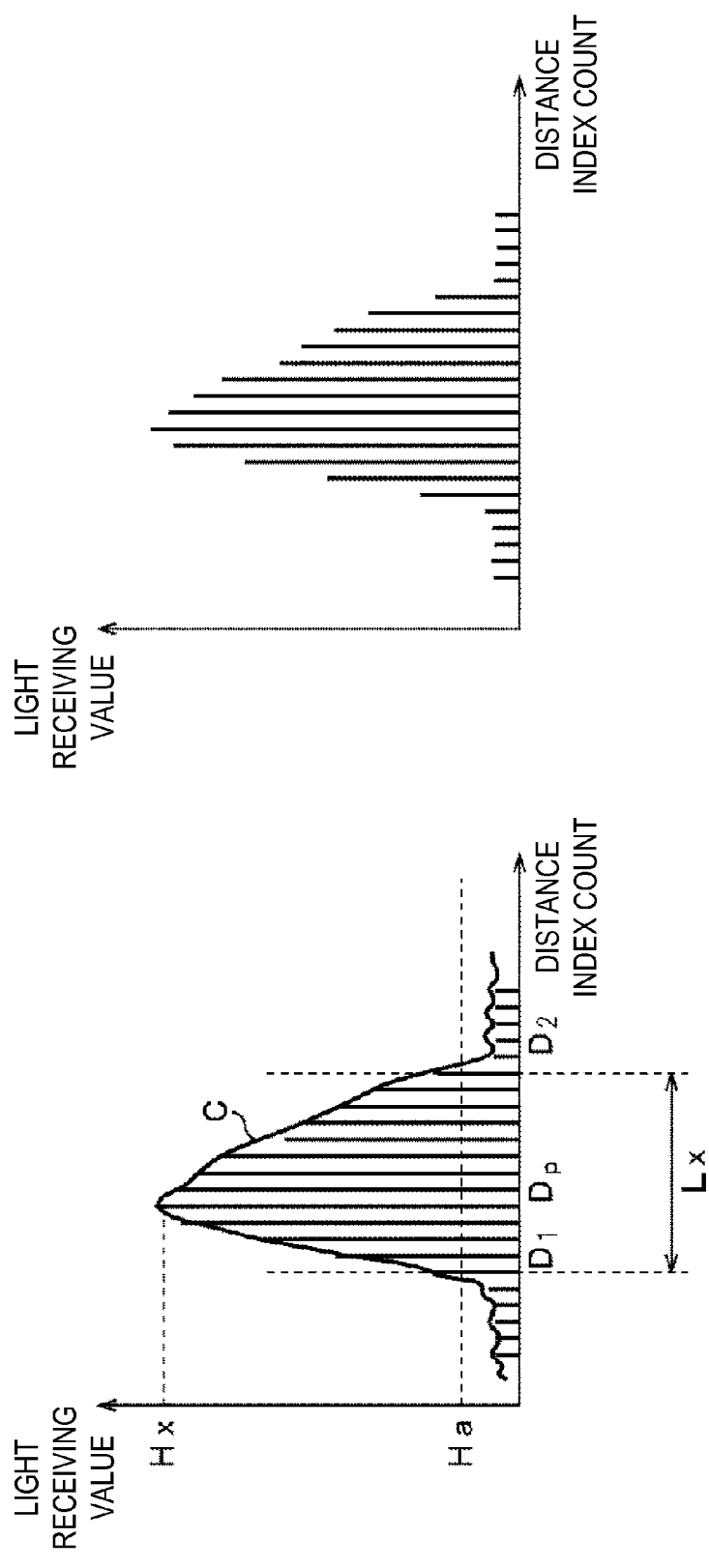
FIG. 29 shows diagrams illustrating the light projection receiving processing.

Generally the peak is defined by the waveform as illustrated in FIG. 29. In a right part of FIG. 29, a vertical axis indicates the light receiving value, a horizontal axis indicates the distance index count, and a bar graph indicates the light receiving value in the timing specified by each distance index count. A waveform C in a left part of FIG. 29 is one in which the bar graph in the right part of FIG. 29 is subjected to spline processing. In the waveform C, the generally-defined peak is a light receiving value Hx that is of the maximum value, and the distance index counter at the light receiving value Hx is timing Dp.

Only in the case that the light receiving value is larger than the predetermined threshold Ha, the threshold determination part 351 processes the light receiving value through the pieces of processing in Steps S35 and S36, and outputs the light receiving value to the peak detection controller 352. Therefore, the light receiving value in the period of the distance index counts D1 and D2 in the left part of FIG. 29 is actually used in the peak detection. In the period of the distance index counts D1 and D2, through later-described processing, the peak counter 355 increments the value every time the light receiving value is output, whereby the peak identification part 356 can obtain a peak width Lx based on the peak count of the peak counter 355. That is, the light receiving value that is smaller than the predetermined threshold Ha in Step S35 means that the light receiving value is out of the period of the distance index counts D1 and D2 that becomes the peak width, which allows the peak detection controller 352 to recognize that the peak is located out of the detection period.

When the peak is determined to be detected in Step S42, the peak detection controller 352 stores the distance index count in the peak detection timing in the peak storage part 333, and controls the maximum value storage part 354 to store the stored maximum value in the peak storage part 333 in Step S43.

In Step S44, based on the stored peak counter value, the peak identification part 356 calculates the peak width, and stores the peak width in the peak storage part 333.

In Step S45, the peak detection controller 352 controls the peak counter 355 to reset the peak count to zero.

In Step S46, the maximum value stored in the maximum value storage part 354 is reset to zero.

Figure 30:
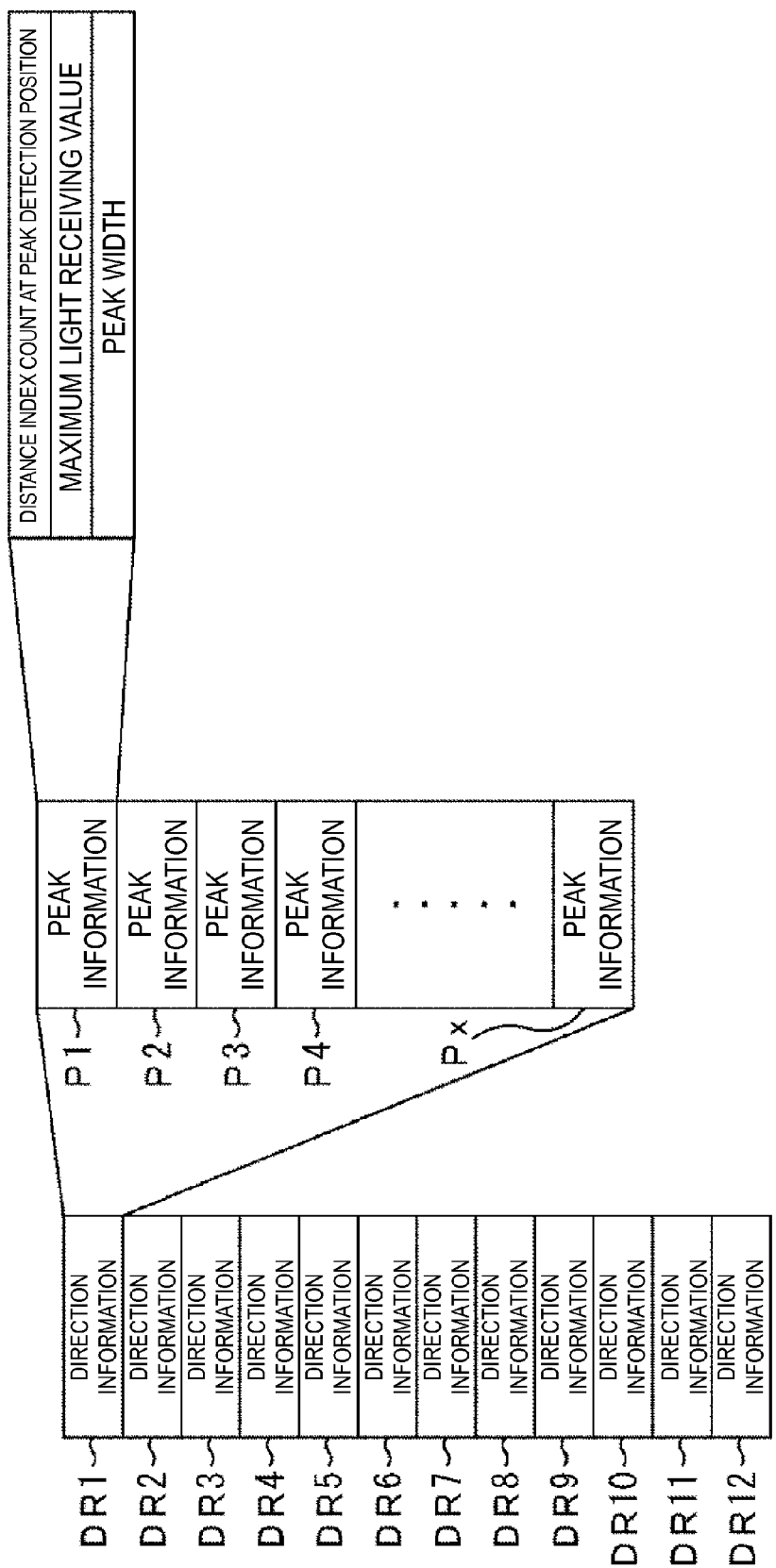
FIG. 30 is a diagram illustrating a configuration example of information stored in a peak storage part.

Accordingly, for example, the peak information is stored in the peak storage part 333 with a structure in FIG. 30. A plurality of pieces of peak information P1 to Px (x is arbitrary) are stored in the peak storage parts 333-1 to 333-12, the pieces of peak information P1 to Px are stored while correlated with each of pieces of direction information DR1 to DR12 specifying the direction in which the pieces of peak information P1 to Px are allocated. The peak information Px includes the distance index count, the maximum value that becomes the peak value, and the peak width.

In Step S47, the peak storage part 333 outputs the stored peak information to the surrounding state determination part 233, and the processing is ended.

Through the above pieces of processing, the pieces of information on the peak value (maximum value) and the peak width are stored in the peak storage part 333 as the peak information while correlated with the distance index count in each direction, and the stored peak information is supplied to the surrounding state determination part 233.

[Surrounding State Determination Processing]

The surrounding state determination processing will be described below with reference a flowchart in FIG. 31.

In Step S61, the surrounding state determination part 233 determines whether the peak is detected based on the peak information that is of the output result of the object detector 232. When one piece of peak information exists in at least one of the directions, the peak is determined to be detected, and the processing goes to Step S62.

In Step S62, the surrounding state determination part 233 sets one of the pieces of peak information to processing target peak information.

In Step S63, the surrounding state determination part 233 controls the grouping part 233a to perform the grouping processing in order to group the peak information, in which the direction is close to that of the processing target peak information and the distance index count approximates that of the processing target peak information (the distance in which the object is detected approximates that of the processing target peak information), causes the grouping part 233a to produce the peak group list that is of a list of the pieces of grouped peak information, and causes the grouping part 233a to store the peak group list in the peak group list memory 233b. Hereinafter, when the specific peak information is close to another piece of peak information in the direction, and when the specific peak information is close to another piece of peak information in the distance index count, one piece of peak information is said to be similar to the other piece of peak information, and the other piece of peak information is said to be similar peak information of one piece of peak information.

[Peak Group List]

The peak group list will be described below with reference to FIG. 32. The peak group list is one in which the pieces of peak information, in which the directions are close to each other and the distance index counts approximate each other, are grouped. The peak group list is updated every time the distance index start signal is generated. The peak group list includes a peak group list that is produced based on the peak information obtained in generating the latest distance index start signal that is of current information GC, and a peak group list that is produced based on the peak information obtained in generating the preceding distance index start signal that is of preceding information GP. When the new distance index start signal is generated, the current information GC is overwritten in the storage area for the preceding information GP, and the information stored in the storage area of the current information GC is updated to the preceding information GP.

In the peak group list, the plurality of pieces of similar peak information are grouped. Specifically, as indicated by the central portion in FIG. 32, the peak group list includes a plurality of peak groups G1 to Gx (x is arbitrary), each of the peak groups G1 to Gx includes identification number information, peak list information, stationary object/moving object information, relative moving speed information, identification result information, risk determination target information, and height information. The identification number information is used to identify the peak group. The peak list information is a list in which each piece of the plurality of pieces of peak information constituting the specific group is recorded as indicated by the pieces of peak information P11 to P14 in the right portion of FIG. 32. The peak list information includes a peak detection direction, the distance index count at the peak detection position, the maximum light receiving value, and the peak width of the peak information. As used herein, the peak information means one in which the direction information is substantially added to the peak information described with reference to FIG. 30.

The stationary object/moving object information indicates that the object specified by the grouped peak information is the stationary object or the moving object. The relative moving speed information indicates a relative moving speed between the object detected by the grouped peak information and the vehicle 11 in which the laser radar device 22 is placed. The relative moving speed information includes the speed in a front-back direction and a crosswise direction with respect to the traveling direction of the vehicle 11. The identification result information is used to identify the detected object based on the number of pieces of grouped peak information and the relative moving speed. The risk determination target information indicates whether the object specified by the grouped peak information is a target for which a risk should be determined. For example, it is assumed that the object specified by the grouped peak information comes close to the vehicle 11 at high speed, or is coming close to the vehicle 11 within a predetermined range, and that the object is the target for which the risk should be determined. In this case, the information indicating that the object is a risk determination target is registered. Otherwise, the information indicating that the object is not the risk determination target is registered. The height information indicates whether the height information on the object within a close range is clear in the objects specified by the grouped peak information.

[Grouping Processing]

Figure 33:
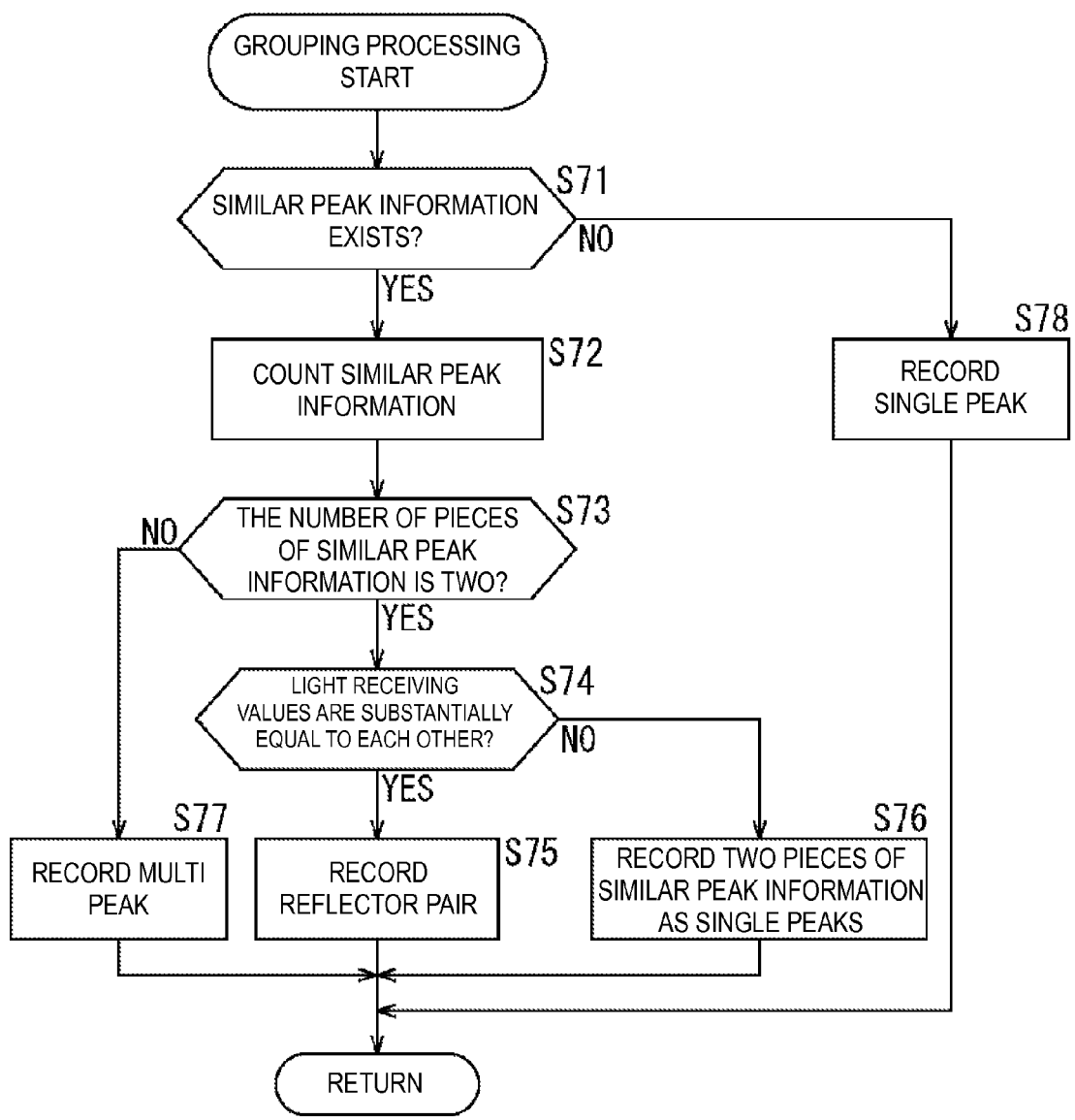
FIG. 33 is a flowchart illustrating grouping processing.

The grouping processing that is of the processing in Step S63 of the flowchart in FIG. 31 will be described below with reference a flowchart in FIG. 33.

In Step S71, the grouping part 233a searches similar peak information similar to the processing target peak information in the pieces of peak information stored in the peak storage parts 333-1 to 333-12, and determines whether the similar peak information exists. When the similar peak information similar to the processing target peak information exists in Step S71, the processing goes to Step S72.

In Step S72, the grouping part 233a registers the peak information searched as the similar peak information in the peak list, and counts the number of pieces of similar peak information.

In Step S73, the grouping part 233a determines whether the number of pieces of similar peak information is two. When the number of pieces of similar peak information is determined to be two, the processing goes to Step S74.

In Step S74, the grouping part 233a determines whether the maximum light receiving values of the two pieces of similar peak information similar to the processing target peak information are substantially identical to each other. When the maximum light receiving values of the two pieces of similar peak information similar to the processing target peak information are substantially identical to each other in Step S74, the processing goes to Step S75.

In Step S75, the grouping part 233a groups the similar peak information similar to the processing target peak information in the same peak group, and registers the similar peak information in the peak group list stored in the peak group list memory 233b. At this point, the grouping part 233a considers the object specified by the grouped peak information to be the reflected light of the reflector of the preceding vehicle detected in the monitoring area, and registers the reflector pair as the identification result information. In the vehicle, the reflectors are placed at symmetrical positions in the horizontal direction, for example, right and left end portions of a rear bumper (particularly, required to satisfy safety standards in Japanese regulations). In the case that the preceding vehicle is present in the monitoring area, frequently the light projected by the light projection part 51 is reflected from the reflector. Frequently the reflectors are placed at both ends of the rear bumper in a passenger car. Therefore, in the case that the two pieces of peak information exist within the close range in the directions close to each other, the light reflected from the reflector is considered to be received, the detected object is substantially considered to be the reflector pair indicating the vehicle provided with the two reflectors, and the detected object is registered as the identification information.

On the other hand, when the maximum light receiving values are not substantially identical to each other in Step S74, the grouping part 233a considers that the two pieces of similar peak information are not included in the same group, and individually registers the processing target peak information and the similar peak information in the peak group list as single groups in Step S75. That is, in the case that the maximum light receiving values of the two pieces of similar peak information differ from each other, the two pieces of similar peak information are considered to be the individual objects because of the high probability of detecting the different objects. For example, two motorbikes each of which is provided with one reflector are considered to run side by side, and the identification result is recorded as the single objects.

When the number of pieces similar peak information is not two in Step S73, the grouping part 233a considers at least three pieces of peak information to exist, and the processing target peak information and the pieces of similar peak information are registered in the peak group list as the same peak group in Step S77. At this point, the identification result is recorded as a multiple peak. For example, sometimes at least the three reflectors are placed in a large-size vehicle such as a truck. The grouping part 233a considers the at least the three pieces of peak information to be the large-size vehicle, and registers the identification result as the multiple peak.

When the similar peak information is determined not to exist in Step S71, the grouping part 233a registers the processing target peak information in the peak group list as the single peak group in Step S78. At this point, the information indicating the single object that is of the reflector of the motorbike is registered as the identification result.

Through the above pieces of processing, when the processing target peak information and the pieces of similar peak information are searched and, when determined to be the pieces of information specifying the same target object, the pieces of similar peak information can be registered in the peak group list as the same peak group, and the identification result of the object specified by the peak information on each peak group can be registered.

Figure 31:
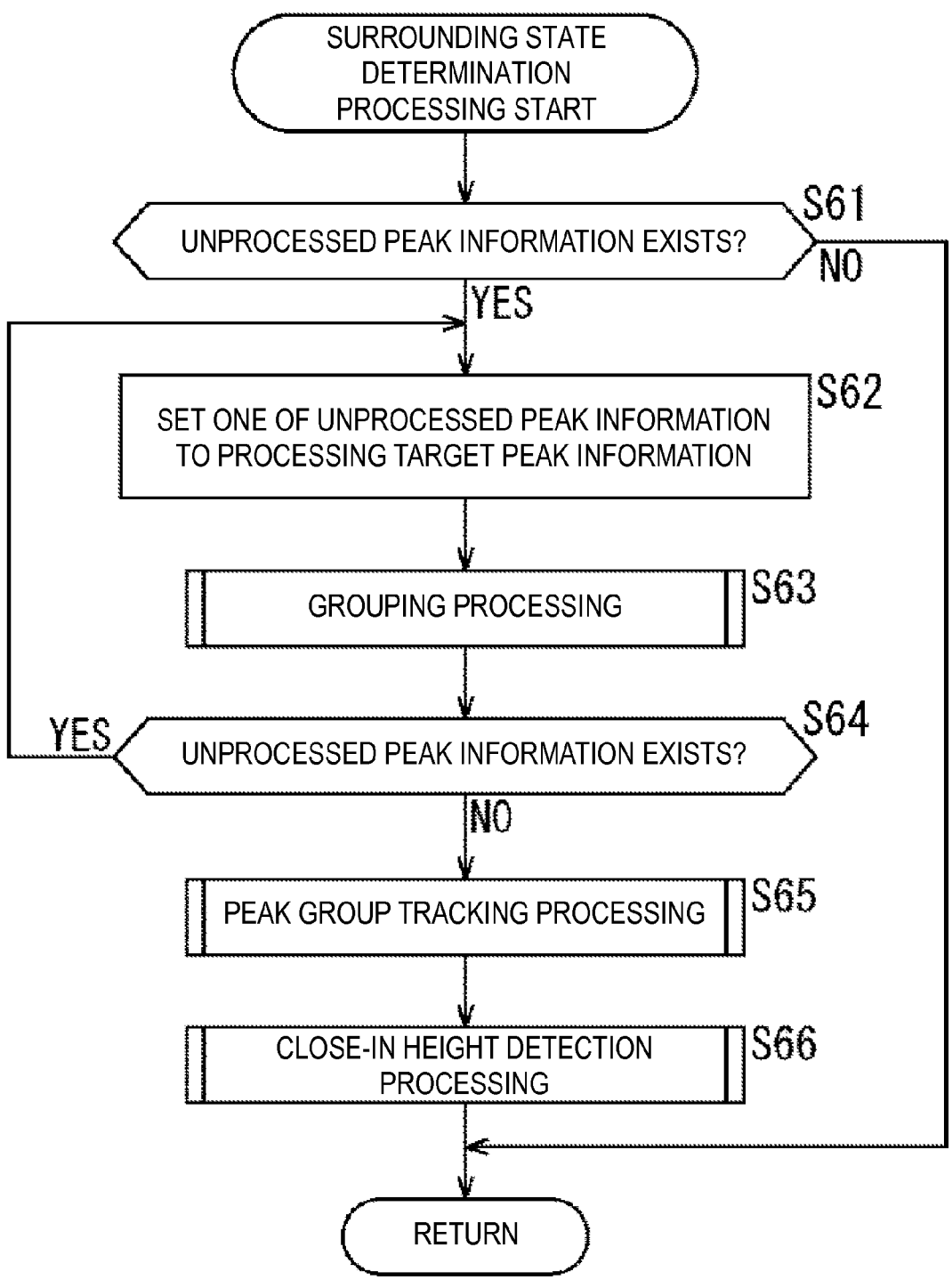
FIG. 31 is a flowchart illustrating surrounding state determination processing.

The description returns to the flowchart in FIG. 31.

Through the processing in Step S63, the grouping processing is performed, and the pieces of similar peak information similar to the processing target peak information are searched, grouped, and registered in the peak group list as the peak group. Then the processing goes to Step S64.

In Step S64, the grouping part 233a determines whether unprocessed peak information exists. As used herein, the unprocessed peak information means the peak information that is neither considered to be the processing target peak information nor to be the similar peak information. Accordingly, even if the peak information is not set to the processing target peak information, the peak information is determined to be the similar peak information similar to one of the pieces of processing target peak information, and the peak information belonging to one of the peak groups is determined to be the processed peak information. When the unprocessed peak information exists in Step S64, the processing returns to Step S62. That is, the pieces of processing in Steps S62 to S64 are repeated until the unprocessed peak information is determined not to exist. When the unprocessed peak information is determined not to exist in Step S64, namely, when all the pieces of peak information are classified into the groups, the processing goes to Step S65.

In Step S65, the surrounding state determination part 233 controls the tracking part 233c such that peak group tracking processing is performed, and such that the movement of each peak group is tracked by comparison to the information in preceding timing.

[Peak Group Tracking Processing]

Figure 34:
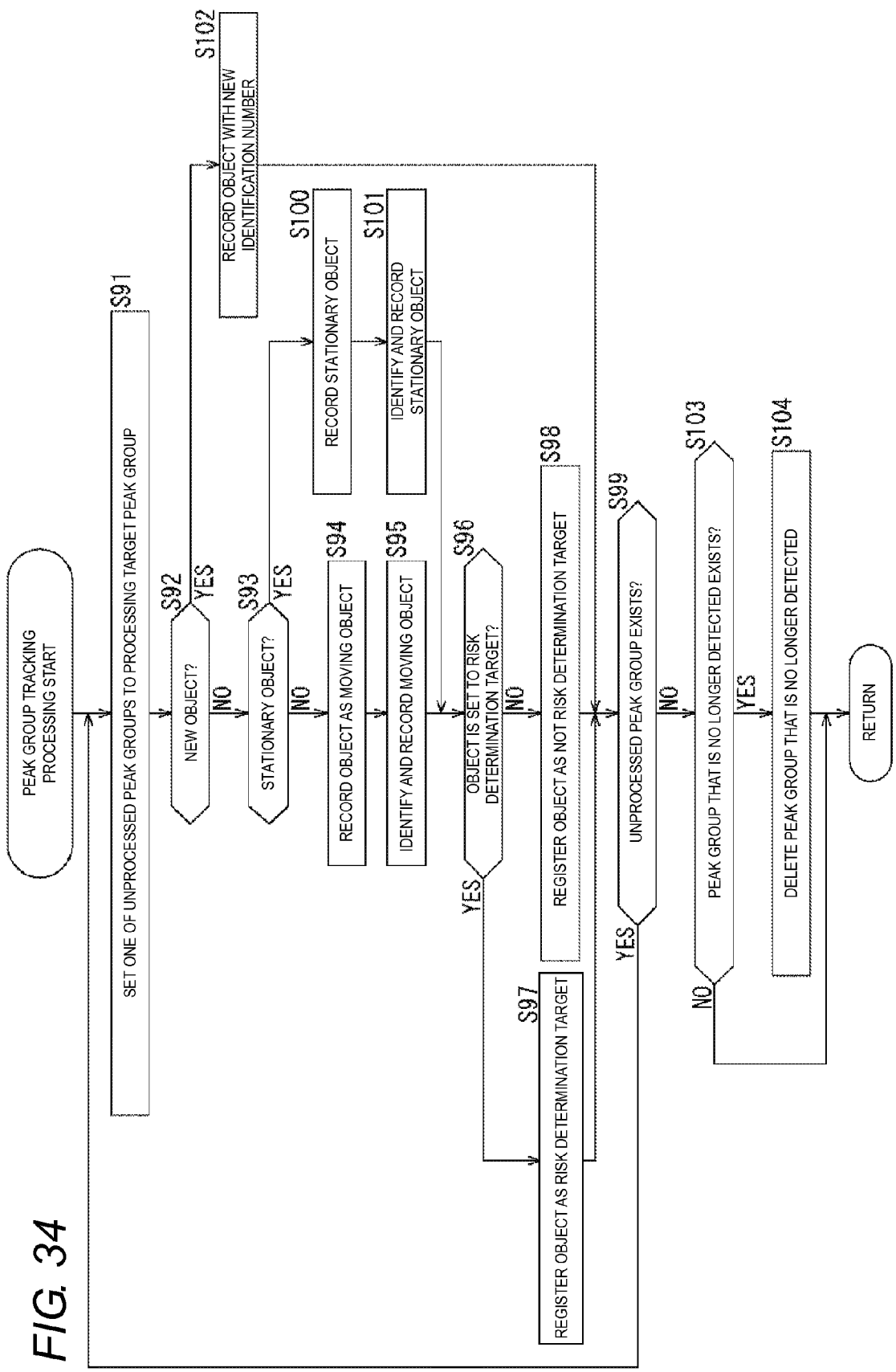
FIG. 34 is a flowchart illustrating peak group tracking processing.

The peak group tracking processing will be described below with reference a flowchart in FIG. 34.

In Step S91, the tracking part 233c sets one of unprocessed peak groups in the peak groups stored in the peak group list memory 233b to a processing target peak group that is the processing target.

In Step S92, the tracking part 233c searches the peak group specifying the object corresponding to the object specified by the processing target peak group from the peak group list of the preceding information GP. The tracking part 233c determines whether the processing target peak group is the peak group of the new object peak group that is not registered in the peak group of the preceding information GP based on whether the peak group specifying the object corresponding to the object specified by the processing target peak group exists.

In the peak groups included in the peak group list of the preceding information GP, the peak group in which the direction and distance of the object specified by the distance index count of the processing target peak group exist within the movable range in the period during which the current information GC is acquired from the preceding information GP is searched as the peak group specifying the same object from the direction and distance, which are specified by the distance index count included in the peak information, and the relative moving speed information. When the objects specified by the peak group included in the peak group list of the preceding information GP are determined not to move to the position of the object specified by the current processing target peak group, it is considered that the object specified by the processing target peak group does not exist in the timing of generating the preceding peak group but the new object enters the monitoring area. On the other hand, when the objects specified by the peak group included in the peak group list of the preceding information GP are determined to move to the position of the object specified by the current processing target peak group, it is considered that the object specified by the processing target peak group exists in the timing of generating the peak group included in the peak group list of the preceding information and is specified by the processing target peak group.

When the object specified by the processing target peak group is determined not to be the new object in Step S92, the processing goes to Step S93.

In Step S93, the tracking part 233c determines whether the object specified by the processing target peak group is the stationary object. The tracking part 233c obtains an amount of change in distance as a moving amount from the distance index counts in the pieces of peak information on the peak lists, which are included in the processing target peak group and the peak group included in the peak group list of the preceding information GP specifying the same object. The tracking part 233c compares the obtained moving amount to the moving amount measured by a motion sensor (not illustrated) of the vehicle 11, and determines whether the object is the stationary object based on whether the obtained moving amount is matched with the moving amount measured by the motion sensor. In the case that the object specified by the processing target peak group remains stationary, the moving amount of the vehicle 11 is matched with the moving amount obtained from the distance index counts in the pieces of peak information, which are included in the processing target peak group and the peak group of the preceding information GP. Accordingly, in this case, the object can be determined to be the stationary object. On the other hand, in the case that the moving amounts are not matched with each other, because the vehicle 11 is not matched with the object in the relative relationship, the object can be determined to be moving.

When the object specified by the current processing target peak group is determined not to be the stationary object in Step S93, the tracking part 233c registers the information indicating that the object is the moving object as the stationary object/moving object information on the processing target peak group registered in the peak group list memory 233b in Step S94.

In Step S95, the tracking part 233c identifies the object specified by the processing target peak group from the information indicating that the object is the moving object and the number of pieces of peak information included in the peak list registered in the peak group. For example, in the case that the two pieces of similar peak information exist with respect to the object specified by the processing target peak group, the tracking part 233c considers the object to be a moving passenger car, and records the object in the identification result. For example, in the case that at least the three pieces of similar peak information exist with respect to the object specified by the processing target peak group, the tracking part 233c considers the object to be the moving truck, and records the object in the identification result. For example, in the case that the one piece of similar peak information exists with respect to the object specified by the processing target peak group, the tracking part 233c considers the object to be the moving motorbike, and records the object in the identification result.

On the other hand, when the object specified by the processing target peak group is determined to be the stationary object in Step S93, the tracking part 233c registers the information indicating that the object is the stationary object as the stationary object/moving object information on the processing target peak group registered in the peak group list memory 233b in Step S100.

In Step S101, the tracking part 233c identifies the object specified by the processing target peak group from the information indicating that the object is the stationary object and the number of pieces of peak information included in the peak list registered in the peak group. For example, in the case that the two pieces of similar peak information exist with respect to the object specified by the processing target peak group, the tracking part 233c considers the object to be the stopping passenger car, and records the object in the identification result. For example, in the case that at least the three pieces of similar peak information exist with respect to the object specified by the processing target peak group, the tracking part 233c considers the object to be the stopping truck, and records the object in the identification result. For example, in the case that the one piece of similar peak information exists with respect to the object specified by the processing target peak group, the tracking part 233c considers the object to be the stopping motorbike, and records the object in the identification result.

In Step S96, the tracking part 233c determines whether the object specified by the processing target peak group should be the risk determination target. More particularly, the tracking part 233c determines whether the vehicle 11 is in danger such as the collision and the contact based on whether the object specified by the processing target peak group is located within a predetermined range in front of the vehicle 11 in the traveling direction and, with respect to the relative positional relationship, whether the vehicle 11 and the object is approaching in a speed higher than a predetermined speed, and the tracking part 233c considers the object to be the risk determination target when the vehicle 11 is determined to be in danger.

When the object specified by the processing target peak group is determined to be the risk determination target in Step S96, the tracking part 233c registers the information indicating that the object is the risk determination target as the risk determination target information on the processing target peak group registered in the peak group list memory 233b in Step S97.

On the other hand, when the object specified by the processing target peak group is determined not to be the risk determination target in Step S96, the tracking part 233c registers the information indicating that the object is not the risk determination target as the risk determination target information on the processing target peak group registered in the peak group list memory 233b in Step S98.

When the tracking part 233c determines that the object specified by the processing target peak group is the new object in Step S92, the processing goes to Step S102.

In Step S102, the tracking part 233c newly sets an identification number of the processing target peak group, and registers the identification number in the identification number information on the processing target peak group in the peak group list stored in the peak group list memory 233b.

In Step S99, the tracking part 233c determines whether the unprocessed peak group exists in the peak group list of the current information GC registered in the peak group list memory 233b. When the unprocessed peak group exists in Step S99, the processing returns to Step S91. That is, the pieces of processing in Steps S91 to S102 are repeated until the unprocessed peak group is determined not to exist.

When the unprocessed peak group does not exist in Step S99, the processing returns to Step S103.

In Step S103, the tracking part 233c searches whether one of the peak groups registered in the peak group list of the preceding information GP registered in the peak group list memory 233b does not correspond to the peak group registered in the current peak group list. When one of the peak groups registered in the peak group list of the preceding information GP registered in the peak group list memory 233b does not correspond to the peak group registered in the current peak group list, the tracking part 233c determines whether the object that is no longer detected exists. When one of the peak groups registered in the peak group list of the preceding information GP registered in the peak group list memory 233b does not correspond to the peak group registered in the current peak group list in Step S103, one of the peak groups registered in the peak group list, which does not correspond to the peak group registered in the peak group list of the current information GC, is deleted from the peak group list of the preceding information GP in Step S104.

When one of the peak groups registered in the peak group list of the preceding information GP registered in the peak group list memory 233b corresponds to the peak group registered in the current peak group list in Step S103, the processing in Step S104 is skipped.

Through the above pieces of processing, the moving state of the object specified by the peak group information registered in the peak group list of the current information GC can be tracked and reflected in the peak group list of the current information GC.

The description returns to the flowchart in FIG. 31.

When the peak group tracking processing is ended through the processing in Step S65, the processing goes to Step S66.

In Step S66, the surrounding state determination part 233 controls the height detector 233d such that close-in height detection processing is performed to detect and register the height information on the object specified by the peak information on each peak group of the peak group list registered in the peak group list memory 233b.

[Close-in Height Detection Processing]

Figure 35:
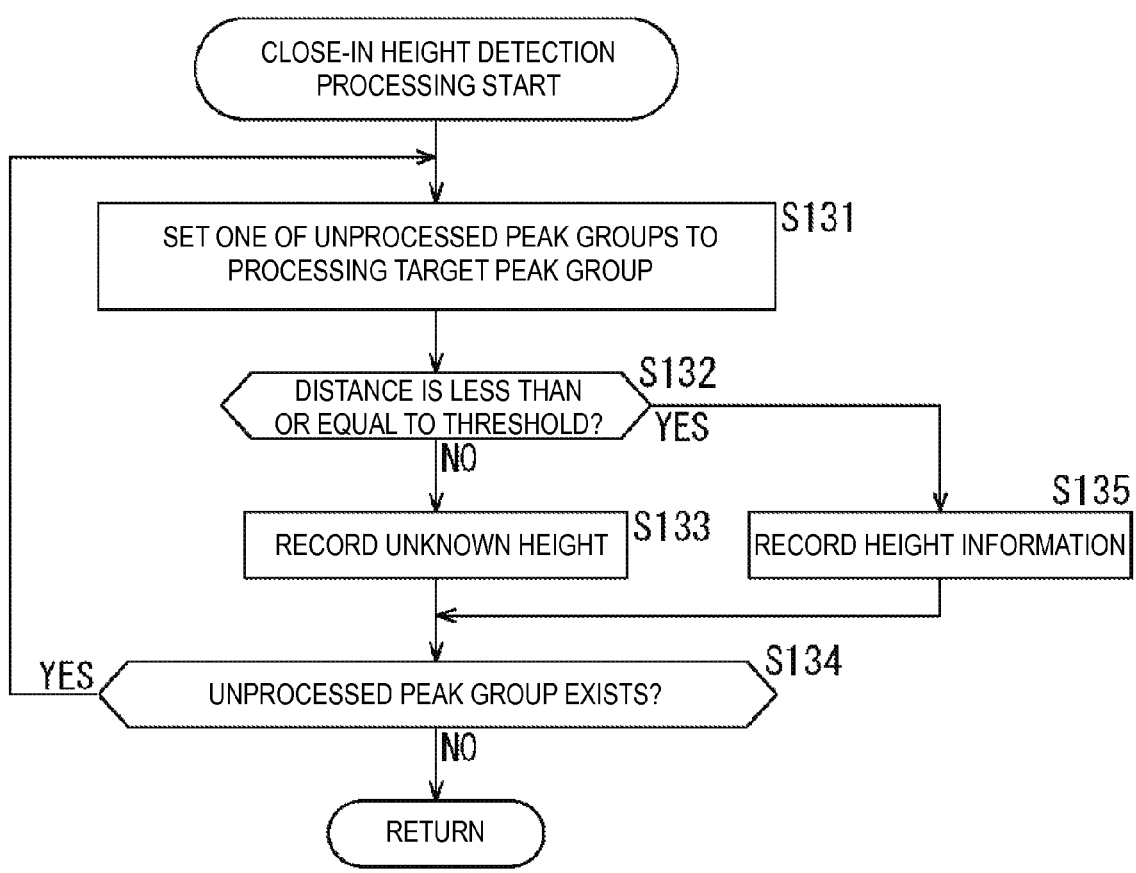
FIG. 35 is a flowchart illustrating close-in height detection processing.

The close-in height detection processing will be described below with reference a flowchart in FIG. 35.

In Step S131, the height detector 233d accesses the peak group list memory 233b to set one of the unprocessed peak group in the peak groups registered in the peak group list to the processing target peak group.

In Step S132, the height detector 233d determines whether the distance to the object specified based on the distance index count in the peak information included in the peak list of the processing target peak groups is less than or equal to a predetermined threshold considered to be the sufficiently close range. When the distance to the specified object is less than or equal to the predetermined threshold in Step S132, the processing goes to Step S135.

In Step S135, the height detector 233d considers the height information on the object specified based on the distance index count in the peak information included in the peak list of the processing target peak group to be specified, and registers the specified height in the height information of the processing target peak group.

On the other hand, when the distance to the specified object is greater than the predetermined threshold in Step S132, the processing goes to Step S133.

In Step S133, the height detector 233d considers the height information on the object specified based on the distance index count in the peak information included in the peak list of the processing target peak groups to be unknown, and registers the unknown height in the height information of the processing target peak group.

In Step S134, the height detector 233d accesses to the peak group list memory 233b to determine whether the unprocessed peak group exists in the peak groups registered in the peak group list. When the unprocessed peak group exists, the processing returns to Step S131. That is, the pieces of processing in Steps S131 to S135 are repeated until the unprocessed peak group does not exist by registering the height information with respect to all the peak groups registered in the peak group list.

When the unprocessed peak group is determined not to exist in Step S134, the processing is ended.

Through the above pieces of processing, in each peak group registered in the peak group list, whether the height of the specified object is specified can be determined, and reflected in the information on the peak group list. Even if the object in which the reflector is embedded in the road surface is detected in the monitoring area, because the height is unknown in the sufficiently far distance, the necessity of the collision avoidance or the determination of the object approach is eliminated based on the distance to the object and whether the height of the object is specified, and such a malfunction that the object is determined to be present to control the brake due to the reflector embedded in the road surface having no probability of the collision can be prevented. For the object having the height in the close range, the high probability of the collision can be recognized when the vehicle comes too close to the object, so that the brake can properly be controlled in order to avoid the collision. For example, a waterdrop that falls onto the vehicle by a splash of the vehicle traveling on the adjacent lane in rain weather can be detected in the close range. Therefore, such a false detection that the raindrop sensor 53 intensively detects the raindrop can be suppressed.

The description returns to the flowchart in FIG. 31.

When the unprocessed peak information does not exist, namely, when the object is not detected in the monitoring area in Step S61, the pieces of processing in Steps S62 to S66 are skipped, and the processing is ended without performing the surrounding state detection processing. In this case, the peak group list is not produced.

The peak group list is registered in the peak group list memory 233*b* through the surrounding state detection processing, so that the external notification determination part 234 can perform external notification determination processing based on the information on the peak group list to determine whether the external device is notified.

The laser radar device 22 includes the plurality of light receiving parts 52, the peak detector 332, and the peak storage part 333, and the laser radar device 22 can simultaneously detect the pieces of peak information reflected from the objects present in the plurality of directions by performing the above pieces of processing.

In the case that only one set of the light receiving part 52, the peak detector 332, and the peak storage part 333 can deal with each direction, the processing is sequentially performed with respect to each direction, and the time from when the light projection part 51 projects the light to when the peak detection is completed with respect to all the directions is lengthened because the repetitive processing is performed with respect to each direction.

Because the surrounding state detection processing is eliminated with respect to the direction in which the peak information is not detected, a processing amount can be reduced, and the surrounding state detection processing is preferentially performed with respect to the direction in which the peak information is detected. As a result, the risk determination can be made earlier.

The laser radar device 22 includes the plurality of light receiving parts 52, the peak detector 332, and the peak storage part 333, so that the laser radar device 22 can perform the pieces of processing in no particular order with respect to each direction. For example, in the processing in Step S61, the surrounding state determination part 233 can preferentially process the direction in which the high-risk object near the vehicle is detected. Therefore, the risk determination can be made earlier with respect to the high-risk object.

[External Notification Determination Processing]

Figure 36:
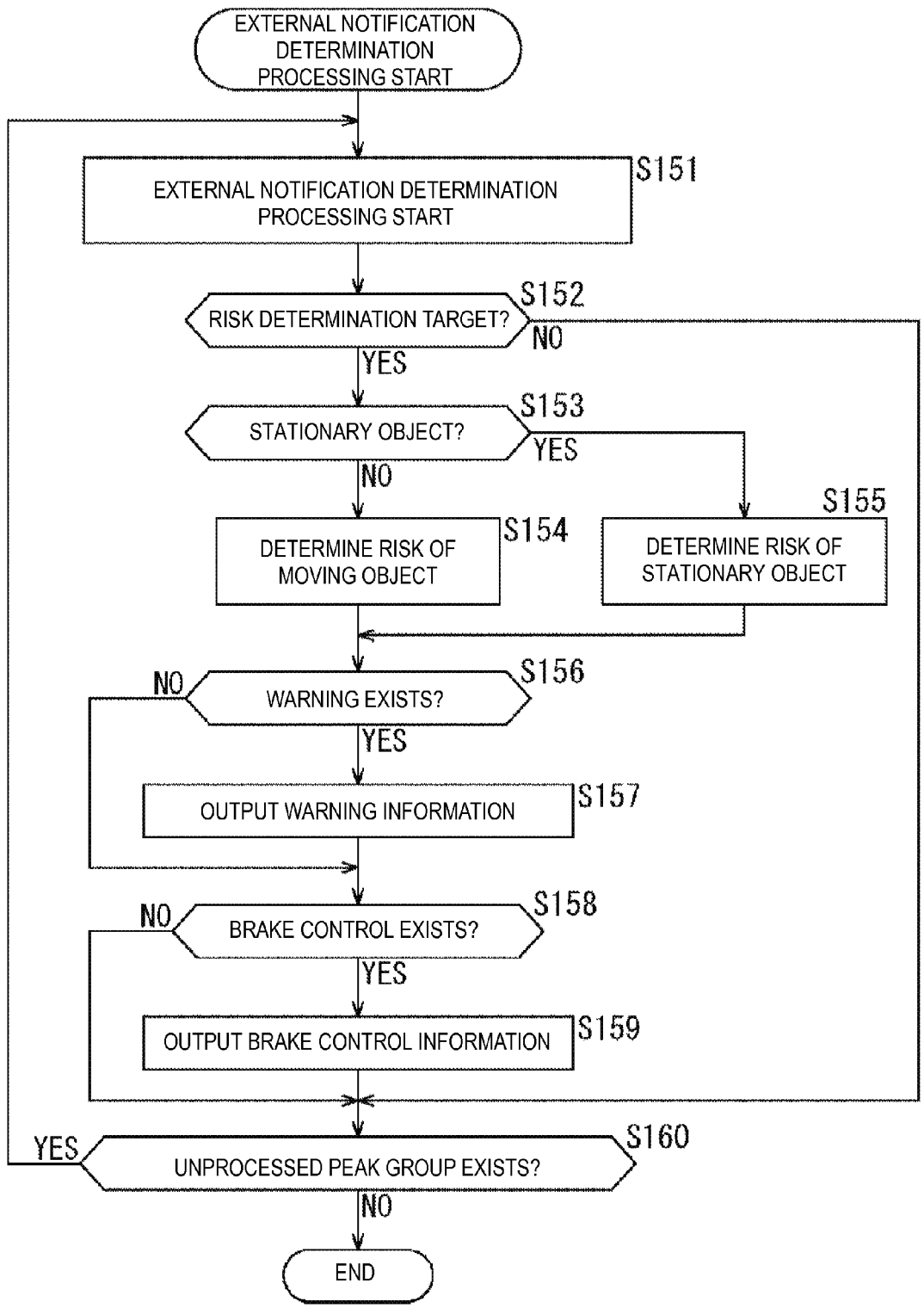
FIG. 36 is a flowchart illustrating external notification determination processing.

The external notification determination processing will be described below with reference a flowchart in FIG. 36.

In Step S151, the external notification determination part 234 accesses the peak group list memory 233*b* of the surrounding state determination part 233 to set the unprocessed peak group to a processing target peak group in the peak groups registered in the peak group list of the current information GC.

In Step S152, based on the risk determination target information on the processing target peak group, the external notification determination part 234 determines whether the object specified based on the peak information on the processing target peak group is the risk determination target. When the object is determined to be the risk determination target in Step S152, the processing goes to Step S153.

In Step S153, based on the stationary object/moving object information on the processing target peak group, the external notification determination part 234 determines whether the object specified based on the peak information on the processing target peak group is the stationary object. When the object is determined not to be the stationary object, namely, when the object is determined to be the moving object in Step S153, the processing goes to Step S154.

In Step S154, the external notification determination part 234 determines the risk of the object specified based on the peak information on the processing target peak group as the moving object. For the moving object, for example, when the object specified by the peak information included in the processing target peak group is the preceding vehicle that is detected as the moving object in the monitoring area, and when the vehicle travels by following the preceding vehicle, namely, the vehicle performs what is called automatic cruise, the risk is determined in order that the traveling is continued while the distance to the moving object is maintained. In such cases, the external notification determination part 234 determines the risk for the purpose of the brake control necessary for the vehicle following and the issuance of the warning associated with the brake control.

In one or more embodiments of the present invention, by way of example, the brake necessary for the following traveling is controlled, and the issuance of the warning associated with the brake control is controlled. The risk of the moving object may be determined for the purpose of the risk determination except the following traveling. For example, the risk of the moving object may be determined in order to control the seatbelt, the power train, the airbag, the door lock, the power seat, and a combination thereof.

On the other hand, when the object specified based on the peak information on the processing target peak group is determined to be the stationary object in Step S153, the processing goes to Step S155.

In Step S155, the external notification determination part 234 determines the risk on the assumption that the object specified by the peak information included in the processing target peak group is the stationary object. For the stationary object, for example, when the object specified by the peak information included in the processing target peak group is detected as the stationary object in the monitoring area, and when the collision with the stationary object is avoided, the risk is determined for the purpose of the avoidance of the collision with the stationary object and the issuance of the warning for the collision avoidance. In such cases, the external notification determination part 234 determines the risk for the purpose of the brake control necessary for the collision avoidance and the issuance of the warning associated with the brake control.

In Step S156, the external notification determination part 234 determines whether the warning previously set based on the risk exists with respect to the determined risk. When the warning previously set based on the risk is determined to exist with respect to the determined risk in Step S156, the external notification determination part 234 outputs the warning information to the result output part 235 in order to specify the warning to be issued in Step S157.

When the warning previously set based on the risk is determined not to exist with respect to the determined risk in Step S156, the processing in Step S157 is skipped.

In Step S158, the external notification determination part 234 determines whether a brake control level is set to the determined risk. That is, the brake control level is previously set according to the risk, and whether the brake control level is set to the risk that is of the determination result is determined in this case. When the brake control level is set to the determined risk in Step S158, the processing goes to Step S159.

In Step S159, the external notification determination part 234 outputs the brake control information to the result output part 235. The brake control information specifies a control level that is set according to the risk.

When the brake control level is not set to the determined risk in Step S158, the processing in Step S159 is skipped.

In Step S159, the external notification determination part 234 accesses the peak group list memory 233b of the surrounding state determination part 233 to determine whether the unprocessed peak group exists in the peak groups registered in the peak group list. When the unprocessed peak group is determined to exist in Step S159, the processing returns to Step S151. That is, the pieces of processing in Steps S151 to S160 are repeated until all the peak groups are subjected to the pieces of processing in Steps S152 to S159.

When the unprocessed peak group is determined not to exist in Step S160, the processing is ended.

Through the above pieces of processing, the risk is determined with respect to the objects specified based on all the pieces of peak information on the peak groups registered in the peak group list, and the type of the warning corresponding to the risk and the information on the brake control level can be output to the result output part 235.

[Result Output Processing]

Figure 37:
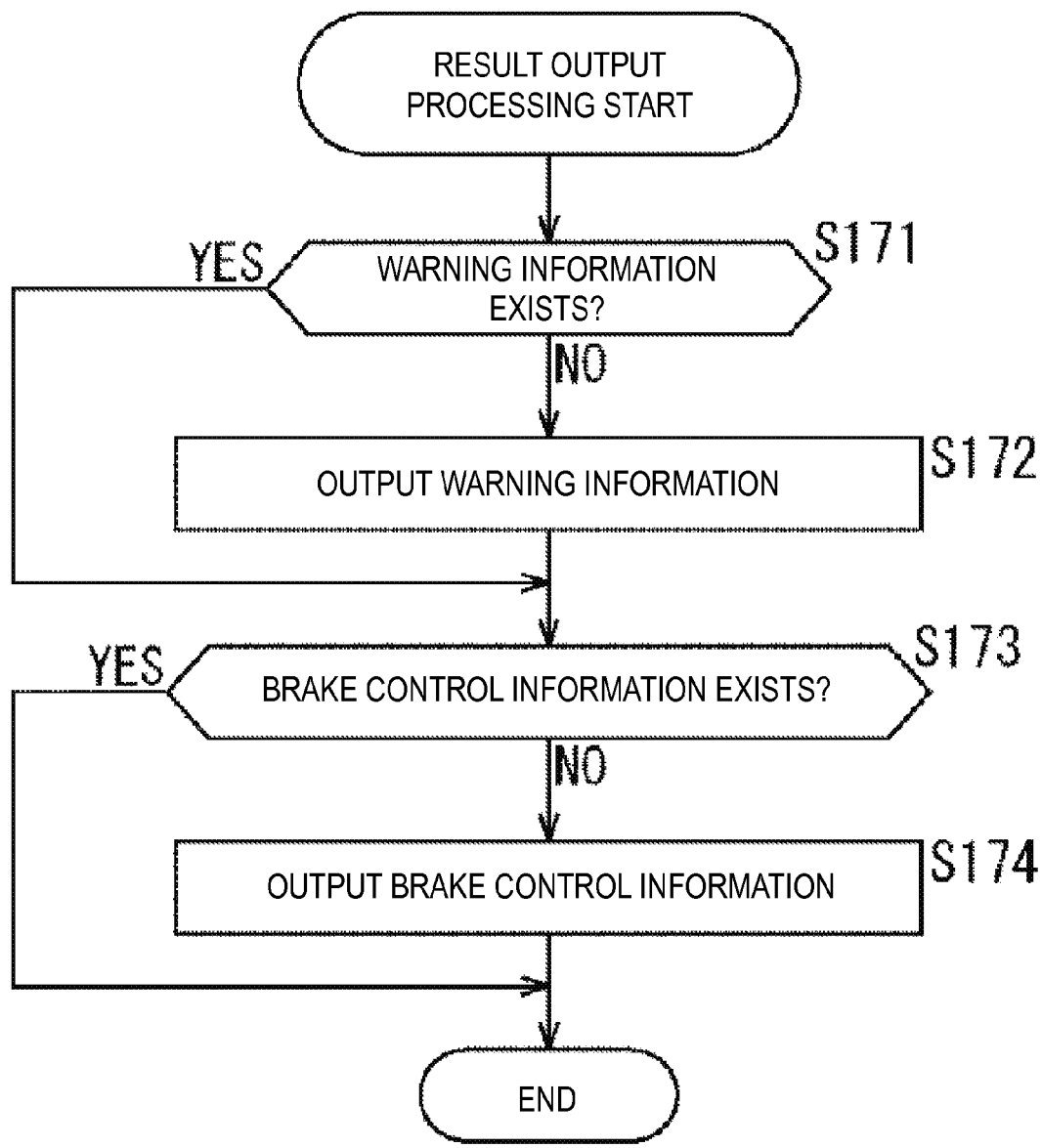
FIG. 37 is a flowchart illustrating result output processing.

The result output processing will be described below with reference a flowchart in FIG. 37.

In Step S171, the result output part 235 determines whether the warning information is supplied from the external notification determination part 234. For example, in the case that the warning information is output through the processing in Step S157 of FIG. 36, the warning information is determined to be supplied in Step S171, and the processing goes to Step S172.

In Step S172, the result output part 235 outputs the warning information specifying a type of the warning that should be output to the warning output device 201. As a result, the warning output device 201 issues the warning of the type specified by the warning information.

When the warning information is not supplied in Step S171, the processing in Step S172 is skipped.

In Step S173, the result output part 235 determines whether the brake control information is supplied from the external notification determination part 234. For example, in the case that the brake control information is output through the processing in Step S159 of FIG. 36, the brake control information is determined to be supplied in Step S173, and the processing goes to Step S174.

In Step S174, the result output part 235 outputs the brake control information specifying the brake control level to the brake control device 203. As a result, the brake control device 203 controls the brake at the brake control level specified by the brake control information.

When the brake control information is not supplied in Step S173, the processing in Step S174 is skipped.

Through the above pieces of processing, the result output part 235 can perform an alarm operation corresponding to the distance between the vehicle 11 and the object and the brake control operation based on the warning information corresponding to the determination result of the external notification determination part 234 and the brake control information. Therefore, the proper warning can be issued to the driver, and the brake can properly be operated even if the driver gets panics.

Summarizing the above, as indicated in fifth to eighth stages of FIG. 27, for example, the object sensing motion processing (FIG. 26) is performed in the period to the clock time t172 in the period from the timing of generating the distance index start signal at the clock time t82 to the timing of generating the distance index start signal at the clock time t83. In the period at the clock times t101 to t144, the peak information specifying the distance to the object in the monitoring area is measured in each direction through the light projection receiving processing.

Figure 32:
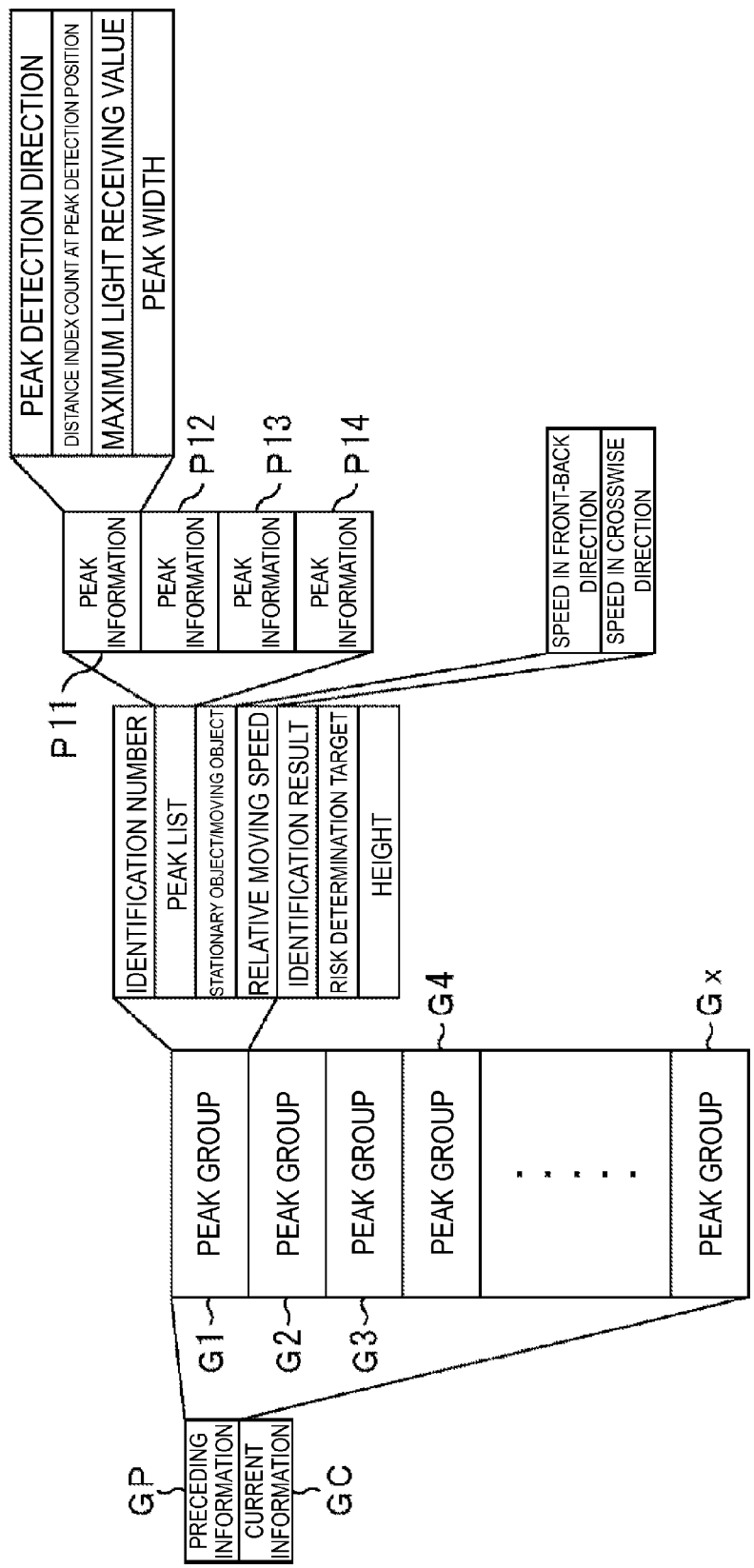
FIG. 32 is a diagram illustrating a configuration example of a peak group list.

As indicated in a ninth stage of FIG. 27, at clock times t151 (=t144) to t152, the grouping processing (FIG. 33) in the surrounding state determination processing (FIG. 31) is performed to analyze the peak information, whereby the pieces of similar peak information are grouped to generate the peak group list (FIG. 32).

As indicated in a tenth stage of FIG. 27, at clock times t161 (=t152) to t162, the peak group tracking processing (FIG. 34) is performed, the movement of the object specified by the peak information included in each peak group included in the peak group list of the current information GC is tracked by comparing the preceding information GP to the peak information included in each peak group, and the tracking result is reflected in the peak group list.

As indicated in the eleventh stage of FIG. 27, at clock times t171 (=t162) to t172, the close-in height detection processing (FIG. 35) is performed to detect the existence or nonexistence of the height in the close range of the object specified by the peak group, and the existence or nonexistence of the height is reflected in the peak group list.

As indicated in a twelfth stage of FIG. 27, at clock times t181 (=t172) to t182, the external notification determination processing (FIG. 36) is performed, and the external notification determination is made based on the information on each peak group in the peak group list.

As indicated in a thirteenth stage of FIG. 27, at clock times t191 (t181) to t192, the result output processing (FIG. 37) is performed, and the external notification processing is performed based on the determination result of the external notification determination processing.

Therefore, the pieces of light, which are projected to the monitoring area and reflected by the object, are simultaneously acquired to measure the distance to the object, so that the distance to the object can be measured at high speed in each direction. Because the distance to the object can be measured at high speed in each direction, various devices of the vehicle can be controlled at high speed based on the distance to the object. Therefore, the processing such as the following of the preceding vehicle and the avoidance of the collision with the preceding vehicle can properly be performed at high speed.

In one or more embodiments of the present invention, the laser radar device in which the laser beam is used is described by way of example. Alternatively, by detecting the object using information except the laser beam, the vehicle motion may be controlled at higher speed, or the warning may be issued. For example, a structure such a camera that captures an image may be provided in addition to the laser radar device, and the vehicle motion may be controlled or the warning may be issued based on the information of the image in which the monitoring area is captured.

The above sequence of pieces of processing can be performed by not only hardware but also software. In the case that the sequence of pieces of processing is performed by the software, a program constituting the software is installed from a recording medium onto a computer incorporated in the dedicated hardware or a general-purpose personal computer that can perform various functions by installing various programs.

Figure 38:
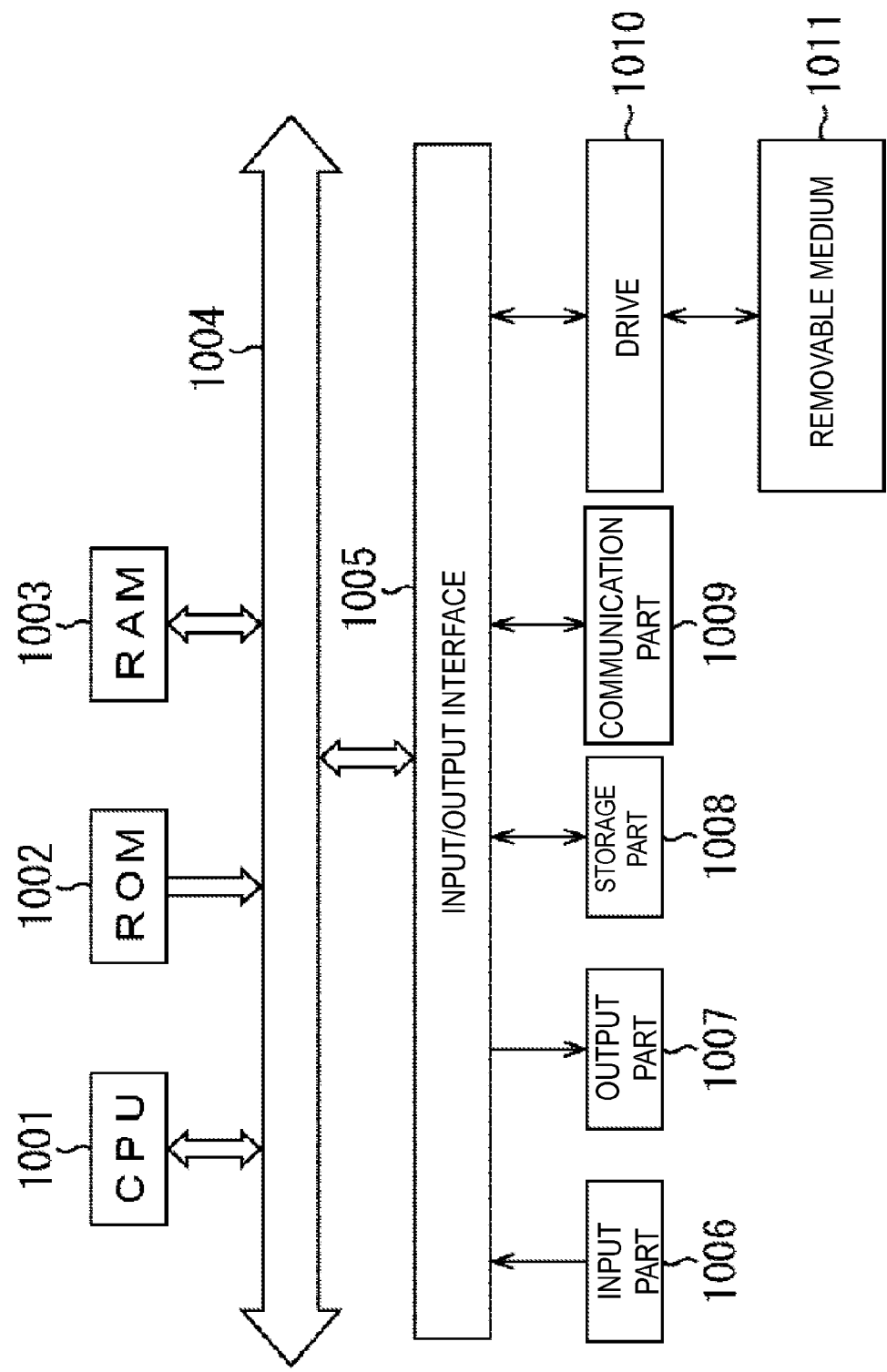
FIG. 38 is a diagram illustrating a configuration example of a general-purpose personal computer.

FIG. 38 illustrates a configuration example of the general-purpose personal computer. The personal computer is provided with a CPU (Central Processing Unit) 1001. An input/output interface 1005 is connected to the CPU 1001 through a bus 1004. A ROM (Read Only Memory) 1002 and a RAM (Random Access Memory) 1003 are connected to the bus 1004.

An input part 1006, an output part 1007, a storage part 1008, a communication part 1009, and a drive 1010 are connected to the input/output interface 1005. The input part 1006 is constructed with input devices, such as a keyboard and a mouse, through which a user inputs an input command. The output part 1007 outputs an image of a processing operation screen or a processing result to a display device. The storage part 1008 is constructed with a hard disk drive in which the program or various pieces of data are stored. The communication part 1009 is constructed with a LAN (Local Area Network) adaptor to perform communication processing through a network typified by the Internet. The drive 1010 reads and writes the data from and in a removable medium 1011 such as a magnetic disk (including a flexible disk), an optical disk (including a CD-ROM (Compact Disc-Read Only Memory) and a DVD (Digital Versatile Disc)), a magneto-optical disk (including an MD (Mini Disc)), and a semiconductor memory.

The CPU 1001 performs various pieces of processing according to a program stored in the ROM 1002 or a program that is read from the removable medium 1011 such as the magnetic disk, the optical disk, the magneto-optical disk, and the semiconductor memory, installed in the storage part 1008, and loaded from the storage part 1008 to the RAM 303. The data necessary for the CPU 1001 to perform various pieces of processing is also stored properly in the RAM 1003.

As used herein, the step describing the program recorded in the recording medium includes not only the processing performed in time series along the described sequence but also the processing that is not necessarily performed in time series but concurrently or individually performed.

As used herein, the system means the whole of the device constructed with a plurality of devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A laser radar device comprising:
a light projection part that projects light to a monitoring area outside a vehicle from a vehicle interior through a glass surface;
a light receiving part that is placed a given distance away from the light projection part in a substantially horizontal direction to receive reflected light from an object outside the vehicle in the light projected by the light projection part through the glass surface;
a measuring part that measures the distance to the object in the monitoring area based on timing when the light projection part projects the light and timing when the light receiving part receives the reflected light;
a sensor disposed between the light projection part and the light receiving part and comprising a raindrop sensor, wherein the light projection part, the light receiving part, and the sensor are substantially disposed in line with respect to a horizontal direction;
a light-projection shielding wall that shields the light projected to an outside of the monitoring area in the light projected by the light projection part;
a light-projection shielding bottom that shields the light projected to an outside of the monitoring area in the light projected by the light projection part;
a light-receiving shielding wall that shields reflected light that is projected by the light projection part and reflected from the outside of the monitoring area, in the reflected light; and
a light-receiving shielding bottom that shields reflected light reflected from the outside of the monitoring area, in the reflected light,
wherein the light-projection shielding wall is provided on a left side surface along a left end portion when the monitoring area is viewed from the light projection part, and a right side surface along a right end portion when the monitoring area is viewed from the light projection part,
wherein an end portion of the light-projection shielding wall constitutes an abutting surface substantially parallel to the glass surface, and the abutting surface of the light-projection shielding wall substantially abuts on the glass surface,
wherein the light-projection shielding bottom is provided along a surface of a lower-side end portion when the monitoring area is viewed from the light projection part, and has a surface inclined downward toward the monitoring area,
wherein an end portion of the light-projection bottom constitutes an abutting surface substantially parallel to the glass surface, and the abutting surface of the light-projection shielding bottom substantially abuts on the glass surface,
wherein the light-receiving shielding wall is provided on a left side surface along a left end portion when the monitoring area is viewed from the light receiving part and a right side surface along a right end portion when the monitoring area is viewed from the light receiving part,
wherein an end portion of the light-receiving shielding wall constitutes an abutting surface substantially parallel to the glass surface, and the abutting surface of the light-receiving shielding wall substantially abuts on the glass surface,
wherein the light-receiving shielding bottom is provided along a surface of a lower-side end portion when the monitoring area is viewed from the light receiving part, and has an inclined surface inclined downward toward the monitoring area, and
wherein an end portion of the light-receiving shielding bottom constitutes an abutting surface substantially parallel to the glass surface, and the abutting surface of the light-receiving shielding bottom substantially abuts on the glass surface,
wherein the raindrop sensor is disposed forward of the light projection part and the light receiving part, and
wherein the light projection part is disposed forward of the light receiving part.

\* \* \* \* \*